(12) United States Patent
Mukai et al.

(10) Patent No.: US 8,854,324 B2
(45) Date of Patent: Oct. 7, 2014

(54) INFORMATION PROCESSING CONTROL DEVICE

(75) Inventors: Yoshiyuki Mukai, Kanagawa (JP); Shunichi Kusano, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 203 days.

(21) Appl. No.: 13/405,483

(22) Filed: Feb. 27, 2012

(65) Prior Publication Data

US 2012/0293427 A1 Nov. 22, 2012

Related U.S. Application Data

(60) Provisional application No. 61/474,806, filed on Apr. 13, 2011.

(51) Int. Cl.
| | | |
|---|---|---|
| *G06F 3/041* | (2006.01) | |
| *G06F 3/0486* | (2013.01) | |
| *G06F 3/0484* | (2013.01) | |
| *G06F 3/0488* | (2013.01) | |

(52) U.S. Cl.
CPC .......... *G06F 3/04883* (2013.01); *G06F 3/0486* (2013.01); *G06F 2203/04806* (2013.01); *G06F 2203/04808* (2013.01); *G06F 3/0484* (2013.01)
USPC ........................................................ 345/173

(58) Field of Classification Search
None
See application file for complete search history.

(56) References Cited

U.S. PATENT DOCUMENTS

| | | | | |
|---|---|---|---|---|
| 5,555,363 | A * | 9/1996 | Tou et al. ....................... | 715/205 |
| 2006/0026536 | A1* | 2/2006 | Hotelling et al. ............. | 715/863 |
| 2006/0092170 | A1* | 5/2006 | Bathiche et al. .............. | 345/589 |
| 2006/0125803 | A1* | 6/2006 | Westerman et al. .......... | 345/173 |
| 2007/0247441 | A1* | 10/2007 | Kim et al. ..................... | 345/173 |
| 2009/0158149 | A1* | 6/2009 | Ko ................................. | 715/702 |
| 2009/0158215 | A1* | 6/2009 | Ha et al. ........................ | 715/834 |
| 2010/0259482 | A1* | 10/2010 | Ball .............................. | 345/168 |
| 2011/0041086 | A1* | 2/2011 | Kim et al. ..................... | 715/764 |
| 2011/0219323 | A1* | 9/2011 | Woo et al. ..................... | 715/769 |
| 2012/0117506 | A1* | 5/2012 | Koch et al. .................... | 715/773 |

FOREIGN PATENT DOCUMENTS

| | | |
|---|---|---|
| JP | 08-314917 | 11/1996 |
| JP | 2004-102455 | 4/2004 |
| JP | 2009-205304 | 9/2009 |

* cited by examiner

*Primary Examiner* — Nicholas Lee
(74) *Attorney, Agent, or Firm* — Oblon, Spivak, McClelland, Maier & Neustadt, L.L.P.

(57) ABSTRACT

An information processing device that includes a display, a touch panel that detects a gesture operation, a memory that stores a correlation between each of a plurality of effects that can be applied to an object displayed on the display and one of a plurality of gesture operations, and a processor that applies one of the plurality of effects that corresponds to the detected gesture operation to an object displayed on the display, and controls the display to display the object to which the one of the plurality effects is applied.

19 Claims, 30 Drawing Sheets

FIG. 4

| GESTURE OPERATION | DECORATION (OUTPUT) |
|---|---|
| PINCH-IN OPERATION IN VERTICAL DIRECTION | REDUCTION IN FONT SIZE |
| PINCH-OUT OPERATION IN VERTICAL DIRECTION | ENLARGEMENT OF FONT SIZE |
| DRAG OPERATION TO LEFT EDGE | LEFT-JUSTIFIED DISPLAY |
| DRAG OPERATION TO RIGHT EDGE | RIGHT-JUSTIFIED DISPLAY |
| DRAG OPERATION TO THE CENTER | CENTERING DISPLAY |
| FLICK OPERATION TO LEFT DIRECTION | LEFT SCROLL |
| FLICK OPERATION TO RIGHT DIRECTION | RIGHT SCROLL |
| Z-SHAPED FLICK OPERATION IN HORIZONTAL DIRECTION | BOTH-WAY SCROLL |
| DOUBLE CLICK OPERATION | BLINKING DISPLAY |
| PINCH-OUT OPERATION IN HORIZONTAL DIRECTION | BOLD-CHARACTER DISPLAY |
| PARALLEL SHIFT OPERATION IN RIGHT DIRECTION BY MULTI-TOUCH | ITALIC-CHARACTER DISPLAY |
| ROTATING OPERATION BY MULTI-TOUCH AND PINCH-IN OPERATION/PINCH-OUT OPERATION | CHANGE OF HUE AND SATURATION OF CHARACTER |
| SLIDE OPERATION IN RIGHT DIRECTION ON DEDICATED AREA | TRANSION TO CONTINUOUS INPUT MODE |
| SINGLE-TOUCH OPERATION AT A PORTION OTHER THAN SPECIFIED AREA | RELEASE OF RANGE SELECTION |

FIG. 5

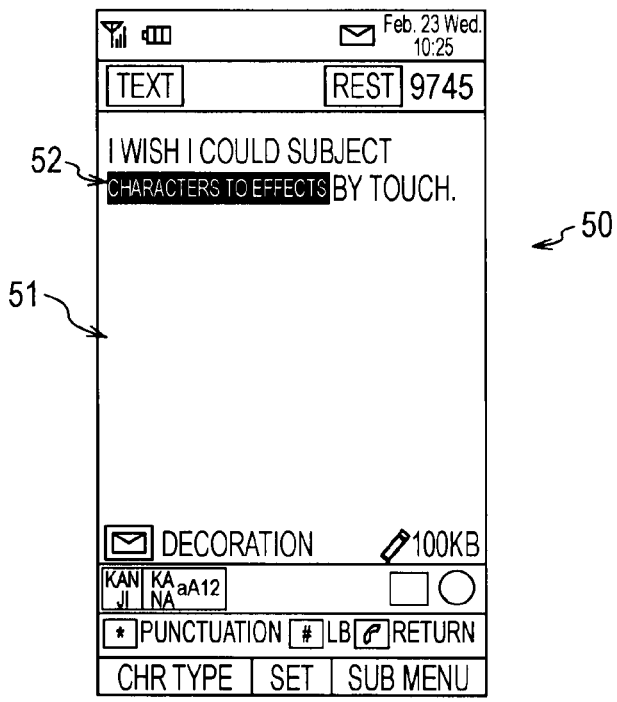

FIG. 20

| CASE | CONTENT OF EDITING | GESTURE OPERATION EXAMPLE | DECORATION EDITING RESULTS |
|---|---|---|---|
| CHARACTER, SYMBOL, ETC. | CONSECUTIVE COPY | LATERAL DIRECTION (POSITIVE) OPERATION → | CONSECUTIVE COPY INPUT IN ACCORDANCE WITH MOVEMENT EXAMPLE: [AAAAAAA] |
| CHARACTER, SYMBOL, ETC. | DELETION | LATERAL DIRECTION (NEGATIVE) OPERATION ← | DELETION IN ACCORDANCE WITH MOVEMENT |
| ALPHABET | CHANGE IN CAPITAL/SMALL CHARACTER | VERTICAL DIRECTION OPERATION | CONSECUTIVE INPUT OF CAPITAL/SMALL CHARACTER IN ACCORDANCE WITH MOVEMENT EXAMPLE: [ComeOOOOooon!] |
| CHARACTER, SYMBOL, ETC. | CHANGE IN SIZE | UPPER-RIGHT DIRECTION OPERATION | CONSECUTIVE INPUT WHILE CHANGING SIZE IN ACCORDANCE WITH MOVEMENT EXAMPLE: [U$_{mmmmmmm...}$] |
| SYMBOL | CHANGE IN SYMBOL | VERTICAL DIRECTION OPERATION | CONSECUTIVE INPUT WHILE CHANGING SYMBOL ITSELF IN ACCORDANCE WITH MOVEMENT EXAMPLE: [!!!???!!] |
| ALPHABET | CHANGE IN CHARACTER | UPPER-RIGHT DIRECTION OPERATION | CONSECUTIVE INPUT WHILE CHANGING CHARACTER ITSELF IN ACCORDANCE WITH MOVEMENT EXAMPLE: [ABCDEFGH] |
| NUMERIC | CHANGE IN NUMERIC | UPPER-RIGHT DIRECTION OPERATION | CONSECUTIVE INPUT WHILE CHANGING NUMERIC ITSELF IN ACCORDANCE WITH MOVEMENT EXAMPLE: [123456789] |

FIG. 42

| GESTURE OPERATION | DECORATION (OUTPUT) |
|---|---|
| PINCH-IN OPERATION | REDUCTION IN IMAGE SIZE |
| PINCH-OUT OPERATION | ENLARGEMENT OF IMAGE SIZE |
| DRAG OPERATION | MOVEMENT (OR COPY) OF IMAGE |
| ROTATING OPERATION BY MULTI-TOUCH AND PINCH-IN OPERATION/PINCH-OUT OPERATION | CHANGE OF HUE AND SATURATION OF IMAGE |
| SINGLE-TOUCH OPERATION AT A PORTION OTHER THAN THE SPECIFIED AREA | RELEASE OF RANGE SELECTION |

FIG. 43

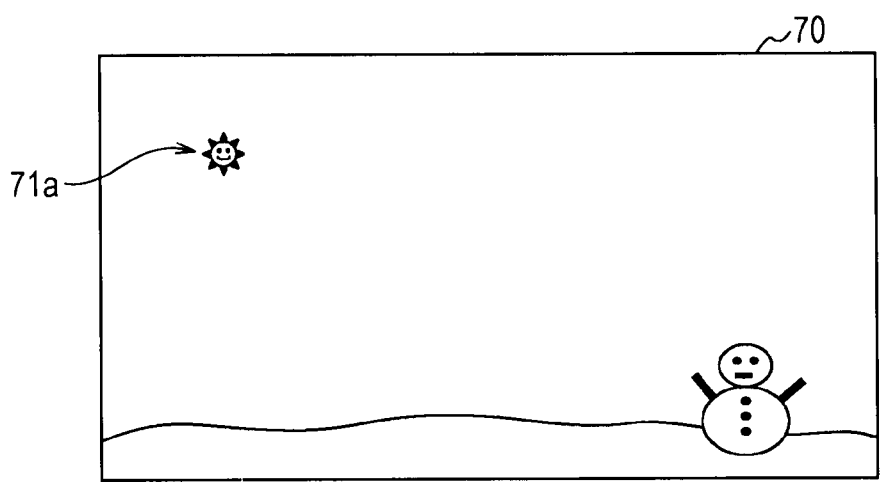

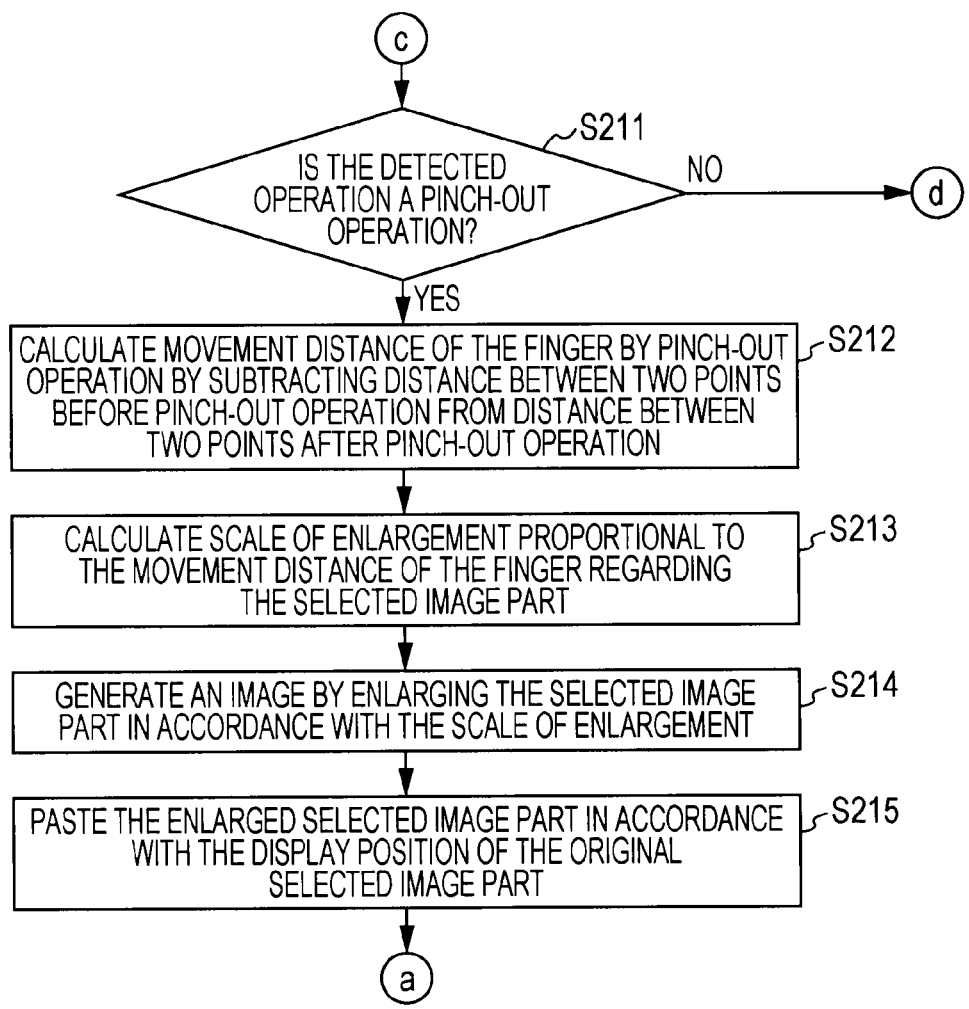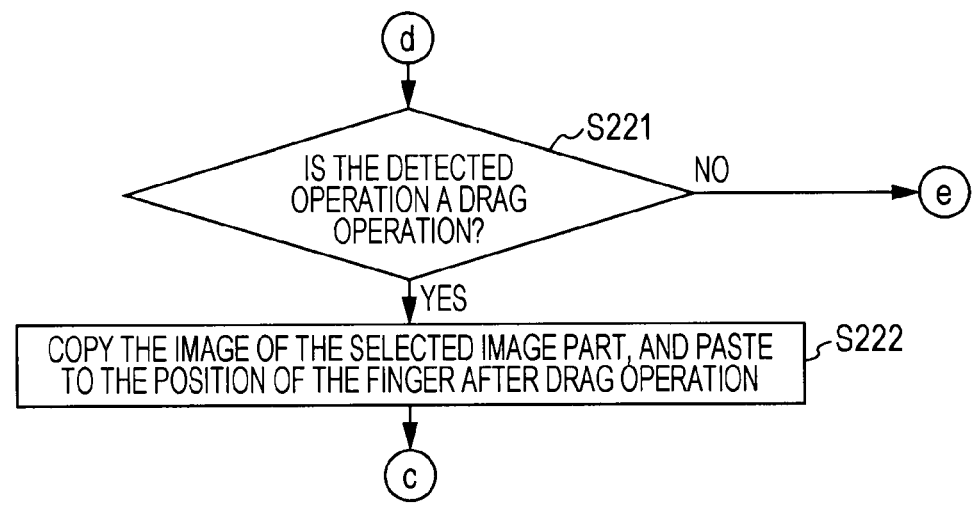

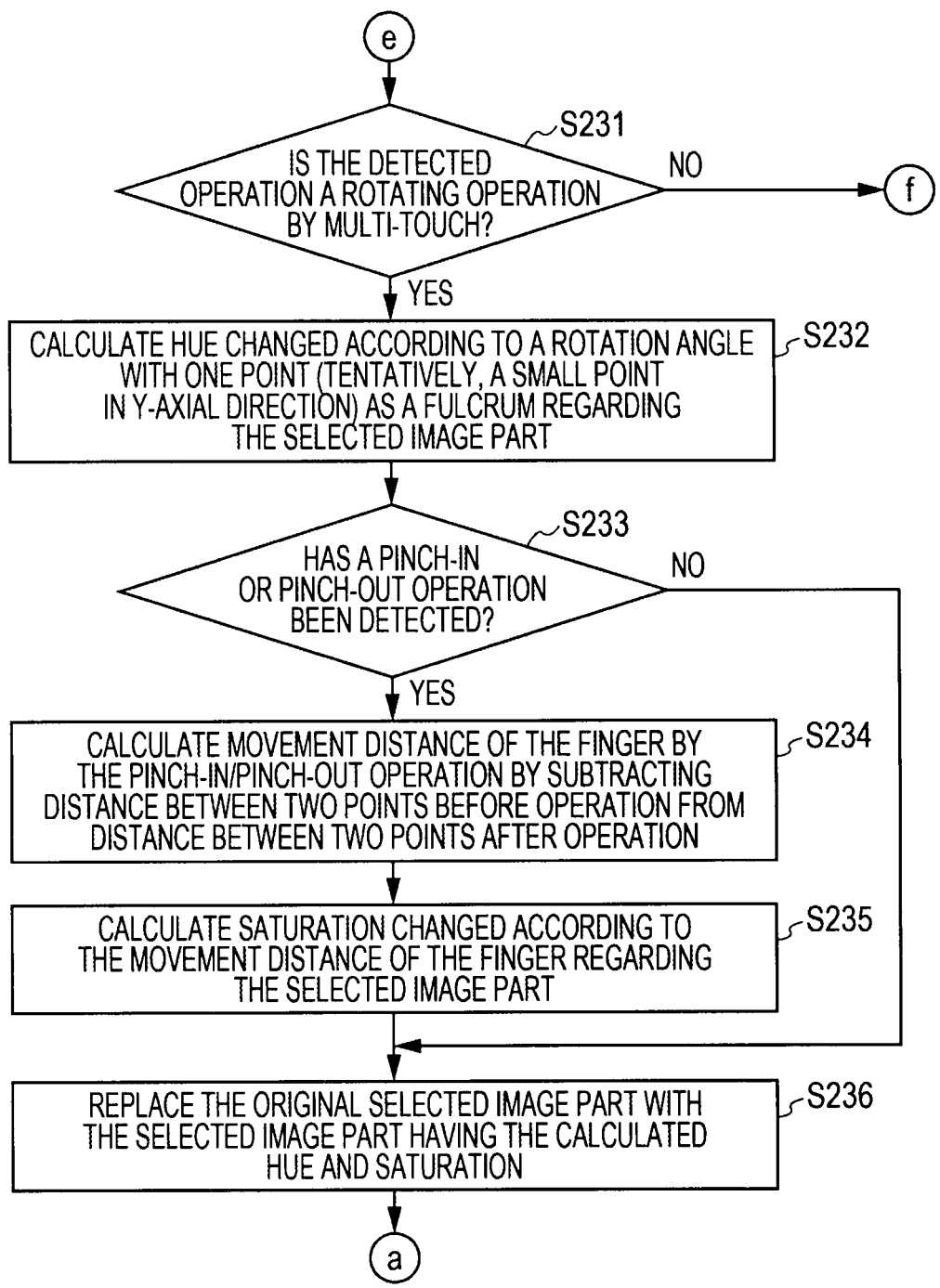

FIG. 51

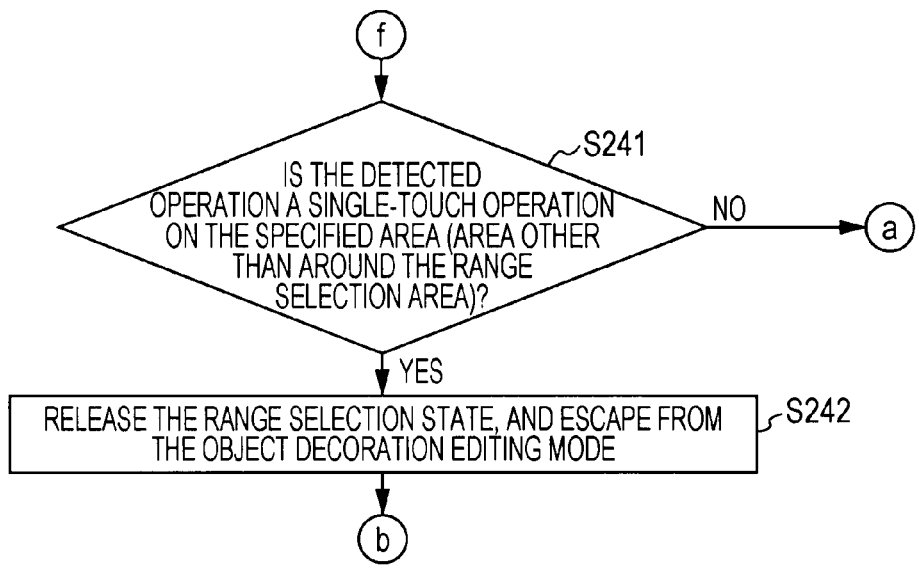

FIG. 52

| GESTURE OPERATION | DECORATION (OUTPUT) |
|---|---|
| PINCH-IN OPERATION IN VERTICAL DIRECTION | REDUCTION IN IMAGE SIZE |
| PINCH-OUT OPERATION IN VERTICAL DIRECTION | ENLARGEMENT OF IMAGE SIZE |
| DRAG OPERATION | MOVEMENT (OR COPY) OF IMAGE |
| FLICK OPERATION | SCROLLING OF IMAGE IN FLICK DIRECTION |
| BOTH-WAY FLICK OPERATION | BOTH-WAY SCROLLING OF IMAGE IN FLICK DIRECTION |
| DOUBLE CLICK OPERATION | BLINKING DISPLAY OF IMAGE |
| PINCH-OUT OPERATION IN HORIZONTAL DIRECTION | BLURRING DISPLAY OF IMAGE |
| PINCH-IN OPERATION IN HORIZONTAL DIRECTION | OUTLINE ENHANCEMENT DISPLAY OF IMAGE |
| PARALLEL SHIFT OPERATION IN RIGHT DIRECTION BY MULTI-TOUCH | RIGHT SLANTING INCLINED DISPLAY OF IMAGE |
| PARALLEL SHIFT OPERATION IN LEFT DIRECTION BY MULTI-TOUCH | LEFT SLANTING INCLINED DISPLAY OF IMAGE |
| ROTATING OPERATION BY MULTI-TOUCH AND PINCH-IN OPERATION/PINCH-OUT OPERATION | CHANGE OF HUE AND SATURATION OF IMAGE |
| SINGLE-TOUCH OPERATION ON SPECIFIED AREA | RELEASE OF RANGE SELECTION |

INFORMATION PROCESSING CONTROL DEVICE

CROSS REFERENCE TO RELATED APPLICATION

The present application claims the benefit of the earlier filing date of U.S. Provisional Patent Application Ser. No. 61/474,806 filed on Apr. 13, 2011, the entire contents of which is incorporated herein by reference.

BACKGROUND

1. Technical Field

The present disclosure relates to an information processing control device including a touch panel, whereby instructions at the time of subjecting a selected object such as a desired character string or the like to desired decoration, editing, or the like can be given by a user's operations onto the touch panel thereof.

2. Description of Related Art

In recent years, an information processing device in which a touch panel including a transparent touch detection surface (touch screen) is disposed, for example, so as to cover generally the entire screen of a display screen has been commercialized. With this touch panel, there can be detected the contact position, the number of contact points, contact duration, the movement direction and movement speed of the finger or the like in a contact state, movement path, and so forth at the time of the user's finger or the like coming into contact with the touch detection surface thereof. Note that, with the following description, an operation wherein the user contacts a finger or the like onto the touch detection surface of the touch panel, an operation for moving a finger or the like in a state in contact, and so forth will be referred to as gesture operations collectively.

With a conventional information processing device including such a touch panel, for example, in the event that a desired character string displayed within the display screen is subjected to decoration, for example, such as changing the color, size, style, or the like, the user operates this information processing control device in accordance with the following procedures.

First, the user operates the information processing device to activate, for example, a text editor (including HTML (Hyper Text Markup Language) editors and mailers), and then to specify a desired character string using range selection or the like. Here, the range selection is performed by a gesture operation or the like, for example, such that a finger or the like is slid in a state in contact with the touch panel corresponding to the display position of the desired character string. That is to say, upon detecting a slide gesture operation on the touch panel, the information processing device determines that the character string displayed on the position corresponding to the slide path on the touch panel by the gesture operation thereof has been selected by the user.

Next, the user operates the information processing device to specify decoration content to be subjected as to the character string specified by the range selection or the like. Here, specification of the decoration content is performed by the user selecting a desired menu item or icon out of a list of multiple menu items corresponding to various types of decoration content, or a list of multiple icons corresponding to various types of decoration content, or the like. Specifically, the information processing device in this case displays a list of menu items and items on the display screen, and upon detecting a gesture operation wherein above the touch panel correspond to these display positions is touched by a finger or the like over a short period of time, determines that the decoration content corresponding to the menu item or icon displayed on the touch position in the gesture operation has been selected by the user.

Thus, the information processing device subjects the desired character string specified by the range selection to decoration according to the decoration content specified by selection of the menu item or icon, and displays this on the display screen.

SUMMARY

Incidentally, with the conventional information processing device including a touch panel, in the event of subjecting a desired character string within the display screen to decoration, the user has to specify, as described above, a desired decoration content by an operation such as selecting a desired menu item or the like from a list such as menu items corresponding to various decoration contents.

In the event of specifying a desired decoration content using a list such as such menu items, the user has to perform a task wherein the user confirms, according to these respective menu items, which decoration content can be specified by his/her sight, and also confirms the display position of a menu item or the like corresponding to the desired decoration content thereof, and accurately touches on the display position thereof. Specifically, the user has to perform various tasks such as a confirmation task of the decoration content, a confirmation task of the display position of a menu item corresponding to the decoration content thereof, and accurately touching on this display position, and accordingly, his/her burden is large.

Accordingly, regarding an information processing device including a touch panel on a display screen, at the time of a selected object such as a desired character string displayed on the display screen to desired decoration, the inventor recognizes the necessity of greatly reducing the user's burden by reducing his/her tasks, and further the necessity of performing improvement so as to subject a character string or the like to decoration in a more intuitive manner by taking advantage of the properties of the device called a touch panel.

According to a first exemplary embodiment, the disclosure is directed to an information processing device that includes a display, a touch panel that detects a gesture operation, a memory that stores a correlation between each of a plurality of effects that can be applied to an object displayed on the display and one of a plurality of gesture operations, and a processor that applies one of the plurality of effects that corresponds to the detected gesture operation to an object displayed on the display, and controls the display to display the object to which the one of the plurality effects is applied.

According to another exemplary embodiment, the disclosure is directed to a method performed by an information processing apparatus. The method includes storing, in a memory of the information processing apparatus, a correlation between each of a plurality of effects applied to an object displayed on a display and one of a plurality of gesture operations, detecting, by a touch panel of the information processing apparatus, a gesture operation, applying, by a processor of the information processing apparatus, one of the plurality of effects that corresponds to the detected gesture operation to an object displayed on the display, and controlling, by the processor, the display to display the object to which the one of the plurality effects is applied.

According to another exemplary embodiment, the disclosure is directed to a non-transitory computer-readable medium including computer-program instructions, which when executed by an information processing apparatus, cause the information processing apparatus to perform a method. The method comprising storing a correlation between each of a plurality of effects applied to an object displayed on a display and one of a plurality of gesture operations, detecting a gesture operation at a touch panel of the information processing apparatus, applying one of the plurality of effects that corresponds to the detected gesture operation to an object displayed on the display, and controlling the display to display the object to which the one of the plurality effects is applied.

Thus, according to an embodiment of the present invention, in the event of desiring to subject the user's desired selected object on the screen to signal processing such as the user's desired decoration or the like, it is sufficient for the user to perform a gesture operation correlated with the desired decoration thereof, and accordingly, the user does not have to perform a conventional troublesome task such as selection of a menu or icon, or the like. Thus, according to an embodiment of the present invention, the user can subject a desired object such as a character string or the like to desired decoration or the like by a very small task and also small burden equivalent to simply performing a gesture operation correlated with desired decoration or the like. Also, according to an embodiment of the present invention, the properties of the device called a touch panel can be taken advantage of, and accordingly, the user can subject an object such as a character string or the like to decoration or the like using a more intuitive task.

BRIEF DESCRIPTION OF DRAWINGS

FIG. 4 is a diagram illustrating correlation between a gesture operation that the personal digital assistant according to the present embodiment can detect on a specified area, and a decoration content to be subjected as to a selected object according the gesture operation thereof when changing to an object editing decoration mode at the time of the document creation and editing mode.

FIG. 5 is a diagram illustrating a state in which, in the object edging decoration mode at the time of the document creation and editing mode, a pinch-in operation in the vertical direction has been performed on the specified area, whereby the selected character string within the character display area has been displayed with the font size being reduced.

FIG. 20 is a diagram illustrating correlation between a gesture operation that the personal digital assistant according to the present embodiment can detect on a dedicated area, and the content of editing to be subjected as to the selected object according to the gesture operation thereof when changing to the object editing decoration mode at the time of the document creation and editing mode.

FIG. 42 is a diagram illustrating correlation between a gesture operation that the personal digital assistant according to the present embodiment can detect on the specified area, and a decoration and editing content to be subjected as to a selected object according the gesture operation thereof when changing to the object editing decoration mode at the time of the image editing mode.

FIG. 43 is a diagram illustrating a state in which, in the object edging decoration mode at the time of the image editing mode, a pinch-in operation has been performed on the specified area, whereby the selected image part within the image display area has been displayed with reduction.

FIG. 48 is a flowchart illustrating a processing flow when the personal digital assistant according to the present embodiment displays the selected image part with enlargement in response to a pinch-out operation on the specified area in the object edging decoration mode at the time of the image editing mode.

FIG. 49 is a flowchart illustrating a processing flow when the personal digital assistant according to the present embodiment displays the selected image part with copy in response to a drag operation on the specified area in the object edging decoration mode at the time of the image editing mode.

FIG. 50 is a flowchart illustrating a processing flow when the personal digital assistant according to the present embodiment changes and displays the hue and saturation of the selected image part in response to a rotating operation by multi-touch on the specified area in the object edging decoration mode at the time of the image editing mode.

FIG. 51 is a flowchart illustrating a processing flow when the personal digital assistant according to the present embodiment releases the range selection of an image part in response to a single-touch operation on an area other than the specified area in the object edging decoration mode at the time of the image editing mode, so as to return to the normal image editing mode.

FIG. 52 is a diagram illustrating another example of correlation between a gesture operation that the personal digital assistant according to the present embodiment can detect on the specified area, and a decoration and editing content to be subjected as to a selected object according the gesture operation thereof when changing to the object editing decoration mode at the time of the image editing mode.

DETAILED DESCRIPTION

An embodiment of the present disclosure will be described below with reference to the appended drawings.

[General Configuration of Personal Digital Assistant]

Figure 1:
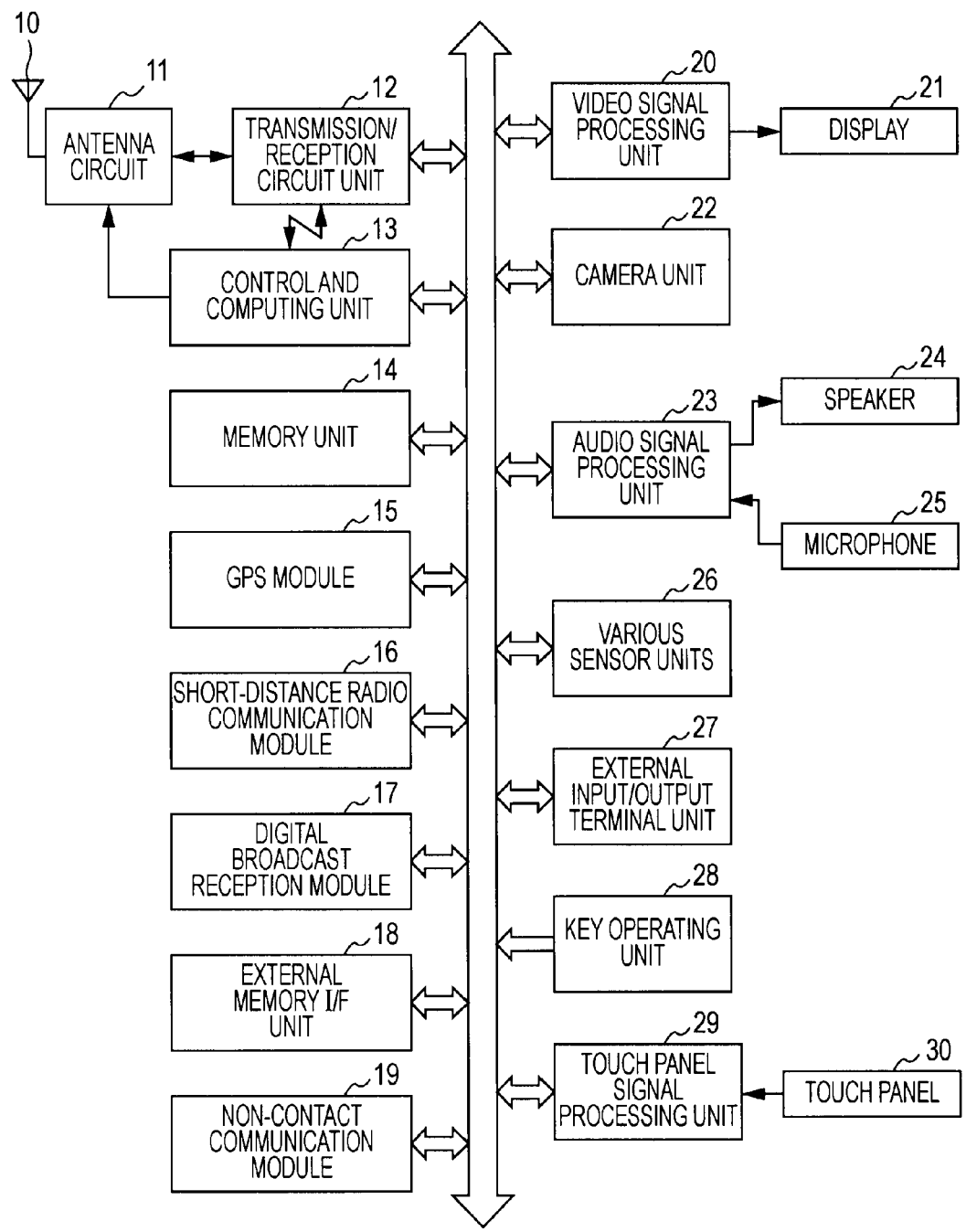
FIG. 1 is a block diagram illustrating a schematic internal configuration example of a personal digital assistant according to an embodiment of the present disclosure.

FIG. 1 illustrates a schematic internal configuration example of a personal digital assistant serving as an example of an information processing control device according to the present embodiment. Note that the personal digital assistant according to the present embodiment is made up of, for example, a high-performance portable telephone terminal, tablet terminal, or the like, on which a touch panel having a transparent touch detection surface is disposed so as to cover generally the entire screen of a display screen.

In FIG. 1, a communication antenna 10 is, for example, a built-in antenna, and performs transmission/reception of a phone call or e-mail via a portable telephone network or public wireless communication network, downloading of various types of application programs including a later-described information processing control program according to the present embodiment and so forth, and transmission/reception of signal waves for connecting to the Internet or the like. An antenna circuit 11 is made up of an antenna switcher, a matching circuit, a filter circuit, and so forth, and a transmission/reception circuit unit 12 performs frequency conversion, modulation, demodulation, and so forth of transmission/reception signals via a portable phone network or public wireless communication network.

A speaker 24 is a speaker provided to the personal digital assistant according to the present embodiment, and is used for playback of music, output of reception audio, output of ringer tone (ringtone), and so forth. A microphone 25 is used for collection of external audio, collection of transmission audio, and so forth. An audio signal processing unit 23 is configured of an amplifier circuit for the speaker 24, an amplifier circuit for the microphone 25, a decompression decoding circuit for subjecting compressed encoded audio data to decompression decoding supplied from a control and computing unit 13, a digital/analog conversion circuit for converting this digital audio data after decompression decoding, an analog/digital conversion circuit for converting the analog audio signal input from the microphone 25, a compression coding circuit for subjecting this digital audio data to compression coding, and so forth.

A video signal processing unit 20 is configured of a decompression decoding circuit for subjecting the compressed encoded video data supplied from the control and computing unit 13, a display panel driving circuit for displaying this digital video after decompression decoding, the digital broadcast video received at a digital broadcast reception module 17, and so forth on a display panel 21, and so forth. Also, in the event of the present embodiment, this video signal processing unit 20 also generates video signals for displaying the desktop image, various types of menu images, character input image, photo image, synthesized image, virtual key or virtual button image, or the like supplied form the control and computing unit 13, and displays these images on the display panel 21.

A key operating unit 28 is configured of hard keys provided onto the casing of the personal digital assistant according to the present embodiment, and peripheral circuits thereof. This key operating unit 28 converts operation input of a hard key by the user into an electrical signal, amplifies and subjects the operation input signal to analog/digital conversion, and transmits the operation input data after analog/digital conversion thereof to the control and computing unit 13.

An external memory I/F unit 18 is configured of a slot for external memory which external memory made up of a semiconductor storage medium, or the like is mounted on/detached from, an interface circuit for communication with external memory data, and so forth. The information processing control device according to the present embodiment is configured so as to obtain various types of data, and various application programs via a storage medium such as external memory inserted into this external memory I/F unit 18. Note that, with the personal digital assistant according to the present embodiment, various application programs to be obtained via this external memory include an information processing control program according to the present embodiment for this personal digital assistant executing information processing for subjecting a selected object such as the user's desired character string displayed on the display screen to desired decoration, which will be described later, and so forth.

An external input/output terminal unit 27 is configured of a connector for cable connection and an interface circuit for external data communication at the time of performing data communication via a cable for example, or a charging terminal at the time of charging internal battery via a power cable or the like and an interface circuit for charging thereof, or the like. The information processing control device according to the present embodiment is configured so as to obtain various types of data and various application programs from an external device connected to this external input/output terminal unit 27. Note that, with the present embodiment, various application programs to be obtained via this external input/output terminal unit 27 include the information processing control program according to the present embodiment, and so forth. Also, the information processing control program according to the present embodiment may be recorded in a disc-form recording medium, a recording medium other than this, or the like, for example. In this case, for example, according to a recording media playback device included in a personal computer or the like, the information processing control program read out from this recording medium may be supplied to the external input/output terminal 27. It goes without saying that an arrangement may be made wherein the recording media playback device is directly connected to the external input/output terminal 27, and the information processing control program read out at the playback device thereof is supplied to the personal digital assistant according to the present embodiment.

A short-distance radio communication module 16 is configured of a communication antenna for short-distance radio waves such as a wireless LAN, Bluetooth (registered trademark) or the like, and a short-distance radio communication circuit. Various application programs including the information processing control program according to the present embodiment may be obtained via this short-distance radio communication module 16.

The digital broadcast reception module 17 is configured of an antenna for reception such as a so-called distal television broadcast, digital radio broadcast, and so forth, and a tuner thereof. This digital broadcast reception module 17 is configured so as to receive not a digital broadcast of only one channel but also digital broadcasts of multiple channels at the same time. Also, this digital broadcast reception module 17 is configured so as to also receive data multiplexed to a digital broadcast. Note that an arrangement may be made wherein the digital broadcast data received at this digital broadcast reception module 17 is compressed by the control and computing unit 13, and then stored (i.e., recorded) in the memory unit 14 or the like. Also, various application programs including the information processing control program according to the present embodiment may be broadcasted as one piece of this display broadcast data. In this case, the information processing control program is extracted from the digital broadcast data received at the digital broadcast reception module 17, and taken into the personal digital assistant according to the present embodiment.

A non-contact communication module 19 performs non-contact communication used for so-called RFID (Radio Frequency-Identification: electric wave method recognition), a non-contact IC card, and so forth, by way of a non-contact communication antenna. Various application programs including the information processing control program according to the present embodiment may be obtained via this non-contact communication module 19.

A GPS (Global Positioning System) module 15 includes a GPS antenna, and uses the GPS signal from a GPS geodetic satellite to obtain the latitude and longitude of the current position of the own terminal. The GPS data (information representing latitude and longitude) obtained by the this GPS module 15 is transmitted to the control and computing unit 13. Thus, the control and computing unit 13 can know the current position, movement, and so forth of the own terminal.

A camera unit 22 is configured of an imaging device, an optical system, and so forth for taking a still image or moving image, and peripheral circuits thereof, a light driving circuit for emitting fill light for taking an image, and so forth. Still image data and moving image data at the time of taking an image by this camera unit 22 are transmitted to the video signal processing unit 20 as preview image data. Thus, a preview video is displayed on the display panel 21 at the time of this camera shooting. Also, in the event of recording the still image data or moving image data taken at the camera unit 22, this taken still image data or moving image data is transmitted to the control and computing unit 13, compressed, and then stored in the memory unit 14 or external memory connected to the external memory I/F unit 18.

Various sensor units 26 are configured of sensors for various detections such as a terminal state detection sensor for detecting the state of the personal digital assistant according to the present embodiment, and peripheral circuits thereof. Examples of the various sensor units 26 include an inclination sensor, an acceleration sensor, an azimuth sensor, a temperature sensor, a humidity sensor, and an illuminance sensor. The detections signals by the various sensor units 26 are transmitted to the control and computing unit 13. Thus, the control and computing unit 13 can know the state of this personal digital assistant (inclination, acceleration, azimuth, temperature, humidity, illuminance, etc.).

A touch panel 30 is an input operation having a detection surface where operation input by the user can be detected, and is configured of a transparent touch sensor screen sensor which is disposed on generally the entire screen of the display panel 21. A touch panel signal processing unit 29 calculates, based on the coordinate data supplied from the touch panel 30, the contact position at the time of the user's finger or the like coming into contact with the touch panel 30, contact duration, contact time interval, movement direction, movement speed, and movement path of the finger or the like in the contact state, and transmits the calculated data thereof to the control and computing unit 104 as touch panel detection data. Note that the touch panel 30 and touch panel signal processing unit 29 can handle so-called multi-touch, and are configured so as detect not only the number of multiple contact points but also contact duration, contact time interval, movement direction, movement speed, movement path, and so forth for each contact point.

The memory unit 14 is configured of built-in memory provided to the inside of this terminal, a detachable card-shaped memory, and so forth. As for the detachable card-shaped memory, a card in which so-called SIM (Subscriber Identity Module) information and so forth are stored can be taken as an example. The built-in memory is made up of ROM (Read Only Memory) and RAM (Random Access Memory). The ROM stores various application programs including a text editor, HTML editor, mailer, image editor, and the information processing control program according to the present embodiment, and so forth in addition to an OS (Operating System), a control program for the control and computing unit 13 controlling each unit, various types of initial setting values, dictionary data, character prediction conversion dictionary data, and various types of sound data. This ROM includes NAND-type flash memory or rewritable ROM such as EEPROM (Electrically Erasable Programmable Read-Only Memory), whereby e-mail data, phone book and mail-address book data, still image and moving image content data, and additionally various types of the user's setting values can be stored. The RAM stores data according to need as a work region or buffer region when the control and computing unit 13 performs various types of data processing.

The control and computing unit 13 is configured of a CPU (Central Processing Unit), and controls each unit such as the transmission/reception circuit unit 12, video signal processing unit 20, audio signal processing unit 23, GPS module 15, non-contact communication module 19, short distance radio communication module 16, digital broadcast reception module 17, external memory I/F unit 18, camera unit 22, various sensor units 26, external input/output terminal unit 27, key operating unit 28, touch panel signal processing unit 29, and so forth, and performs various types of computation according to need. Also, the control and computing unit 13 executes various application programs including a control program stored in the memory unit 14, the text editor, HTML editor, mailer, image editor, and the information processing control program according to the present embodiment. Also, with the present embodiment, the control and computing unit 13 executes the information processing control program according to the present embodiment, thereby serving as a decoration editing control unit for executing the user's desired decoration or editing or the like as to the user's desired selected object out of character strings and images displayed on the screen of the display 21 while cooperating with an editing program, for example, such as the text editor, HTML editor, mailer, image editor, or the like in response to the user's operation as to the touch panel 30, which will be described later. Note that the flow of operation control of this personal digital assistant when the control and computing unit 13, i.e., the information processing control program according to the present embodiment executes decoration, editing, or the like as to the selected object while cooperating with the editing program will be described later.

Additionally, the personal digital assistant according to the present embodiment also naturally includes each component provided to a common personal digital assistant such as a clock unit configured to measure time and point-in-time, a power management IC configured to control a battery for supplying power to each unit and power thereof.

[Decoration Editing Control Operation as to Selected Object According to Gesture Operation]

With the personal digital assistant according to the present embodiment, the control and computing unit 13 executes the information processing control program stored in the memory unit 14, thereby enabling decoration or the like according to the user's operation as to the touch panel to be subjected as to the user's desired selected object on the display screen in cooperation with an editing program.

Specifically, the control and computing unit 13 of the personal digital assistant executes the information processing control program according to the present embodiment, thereby serving as a correlation table control unit which generates or stores a later-described correlation table in which multiple information processes (e.g., process of decoration etc.) that can be subjected as to an object displayed on the screen of the display panel 21, and multiple gesture operations are correlated respectively. Also, the control and computing unit 13 executes the information processing control program according to the present embodiment, thereby serving as a detection area control unit which sets, at the time of a desired object being selected by the user on the screen of the display panel 21, multiple gesture operations correlated with the correlation table as each information process that can be subjected as to the selected object to a gesture operation that can be detected on a specific detection area on the touch screen surface of the touch panel 30. Further, the control and computing unit 13 executes the information processing control program according to the present embodiment, thereby serving as a processing control unit which subjects, at the time of any of the multiple gesture operations being detected on the specified detection area, the selected object to an information process correlated with the detected gesture operation, and displays on the screen.

[Decoration Editing Control Operation Example as to Selected Object at Time of Sentence Creation and Editing]

Hereafter, description will be made regarding the operation of the personal digital assistant according to the present embodiment at the time of taking a character or character string that the user has selected out of character strings displayed on the display as the selected object, and subjecting the selected object thereof to the user's desired decoration in the event that the operation mode of the personal digital assistant is in the sentence creation and editing mode, with reference to FIG. 2 through FIG. 22.

Figure 2:
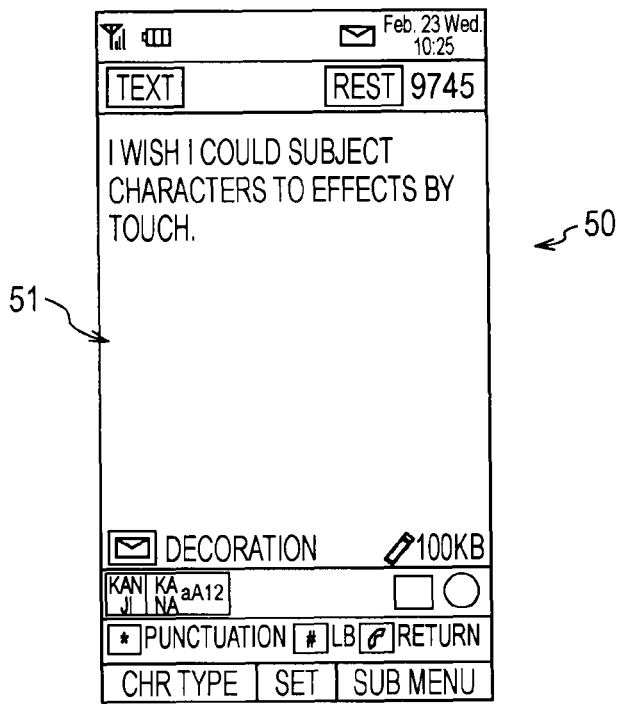
FIG. 2 is a diagram giving an example wherein the personal digital assistant according to the present embodiment is in a document creation and editing mode, a lateral-writing sentence is displayed on a character display area of a display screen, and the sentence thereof is in a state of being created or an editable state.
Figure 3:
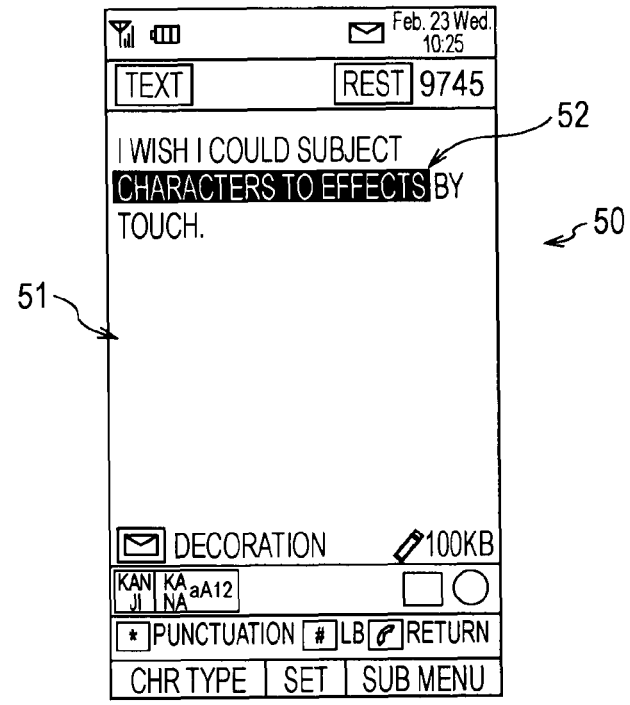
FIG. 3 is a diagram illustrating a state in which a user has selected a desired character string from the sentence on the character display area of the display screen at the personal digital assistant according the present embodiment, whereby this desired character string has been taken as a selected latter string.

In the event that the personal digital assistant according to the present embodiment is in the sentence creation and editing mode, as shown in FIG. 2 for example, let us say that a lateral-writing sentence where each character is arrayed in the lateral direction of the screen is displayed on a character display area 51 of the display screen 50, and the lateral-writing sentence thereof is in a state of being created or an editable state. Note that as for the sentence creation and editing mode, there can be conceived an operation mode in a state in which an editing program such as a text editor, HTML editor, mailer, or the like is being executed, for example. In a state in which the sentence shown in FIG. 2 is displayed, as shown in FIG. 3 for example, let us say that the user has performed a slide gesture operation in a position on the touch panel corresponding to the display position of a desired character string, and also equivalent to the length worth of the desired character string.

At this time, the personal digital assistant according to the present embodiment recognizes each character of a character string 52 of which the range selection has been performed by this slide gesture operation (hereafter, referred to as selected character string 52 as appropriate) as the selected object, and also changes the operation mode of the own terminal to the object decoration editing mode according to the present embodiment in the sentence creation and editing mode.

The personal digital assistant which has changed to the object decoration editing mode sets the area of the selected character string 52 by the slide gesture operation and an adjacent area thereof as a specified area. Note that, of this specified area, the adjacent area may be an area determined beforehand with the area of the selected character string 52 as the center, an area in the place and with the size determined by this terminal, or an area in the place and with the size arbitrarily set by the user. Also, the personal digital assistant at this time correlates a gesture operation as to the touch panel on the specified area with decoration content such as shown in the correlation table in FIG. 4, for example.

Specifically, the correlation table shown in FIG. 4 represents correlation between a gesture operation that the personal digital assistant according to the present embodiment can detect in the specified area, a gesture operation that the personal digital assistant according to the present embodiment can detect as a gesture operation beginning from the specified area, and decoration content to be subjected as to the selected object when these gesture operations are performed. Note that this correlation table in FIG. 4 may be loaded to the RAM of the memory unit 14 by activation of the information processing control program according to the present embodiment for example, may be prepared on the rewritable ROM of the memory unit 14 separately from the information processing control program, or may be prepared in a server or the like on a predetermined network on the Internet and obtained by the personal digital assistant according to the present embodiment as appropriate for example.

With this correlation table shown in FIG. 4, "PINCH-IN OPERATION IN VERTICAL DIRECTION" is taken as a gesture operation such that in a state in which two fingers are in contact with on the touch panel, as to the alignment direction of each character within the character string within the character display area 51, one finger approaches from above, and the other finger approaches from below, thereby moving the two fingers in a direction where distance between the two fingers is narrowed down, for example. In the event that this pinch-in operation in the vertical direction has been detected on the specified area after transition has been made to the object decoration editing mode, the personal digital assistant according to the present embodiment reduces the font size of each character of the selected character string by a value corresponding to the movement distance of the two fingers according to this pinch-in operation in the vertical direction.

Thus, the sentence displayed within the character display area 51 as shown in FIG. 3 becomes a sentence obtained by reducing the font size of each character of the selected character string 52 by a value corresponding to the movement distance of the two fingers according to the pinch-in operation in the vertical direction, as shown in FIG. 5.

Note that the movement distance of the two fingers by the pinch-in operation in the vertical direction can be obtained by measuring the distance between the two contact points according to the two fingers on the touch panel before and after the pinch-in operation in the vertical direction, and calculating the difference between the distances measured before and after the pinch-in operation in the vertical direction, for example. More specifically, the movement distance of the two fingers according to the pinch-in operation in the vertical direction can be obtained by subtracting the distance between the two contact points on the touch panel before the pinch-in operation in the vertical direction from the distance between the two contact points on the touch panel after the pinch-in operation in the vertical direction. Also, the font size after reduction of the selected character string 52 can be obtained by subtracting a value proportional to the movement distance of the two fingers according to the pinch-in operation in the vertical direction from the font size before reduction in each character of the selected character string 52. For example, in the event that an HTML editor is taken as an example, the reduced display of the selected character string 52 can be performed by decorating the selected character string 52 using a <font> tag for specifying the font size after reduction.

With the correlation table in FIG. 4, "PINCH-OUT OPERATION IN VERTICAL DIRECTION" is taken as a gesture operation such that in a state in which two fingers are in contact with on the touch panel, as to the alignment direction of each character within the character string within the character display area 51, one finger separates upward, and the other finger separates downward, thereby moving the two fingers in a direction where distance between the two fingers is widened, for example. In the event that the pinch-out operation in the vertical direction has been detected on the specified area after transition has been made to the object decoration editing mode, the personal digital assistant according to the present embodiment increases the font size of each character of the selected character string by a value corresponding to the movement distance of the two fingers according to this pinch-out operation in the vertical direction.

Figure 6:
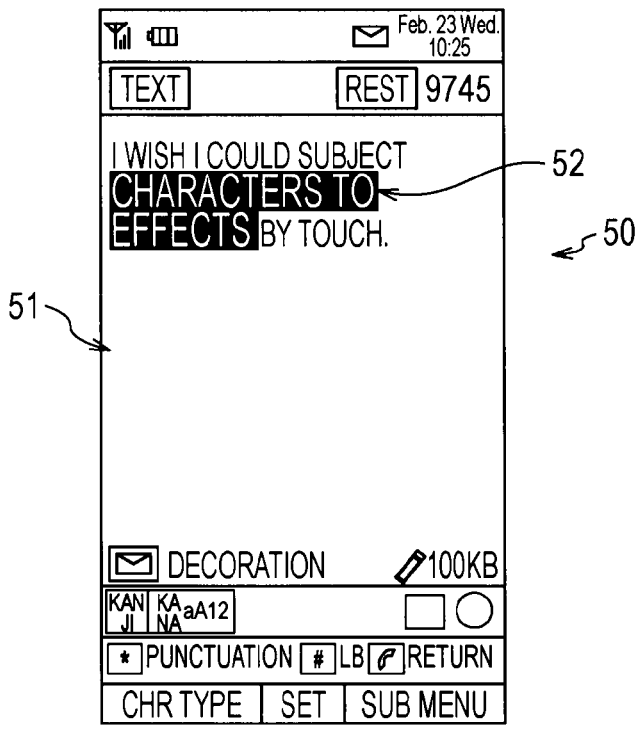
FIG. 6 is a diagram illustrating a state in which, in the object edging decoration mode at the time of the document creation and editing mode, a pinch-out operation in the vertical direction has been performed on the specified area, whereby the selected character string within the character display area has been displayed with the font size being enlarged.

Thus, the sentence displayed within the character display area 51 as shown in FIG. 3 becomes a sentence obtained by increasing the font size of each character of the selected character string 52 by a value corresponding to the movement distance of the two fingers according to the pinch-out operation in the vertical direction, as shown in FIG. 6.

Note that the movement distance of the two fingers by the pinch-out operation in the vertical direction can be obtained by measuring the distance between the two contact points according to the two fingers on the touch panel before and after the pinch-out operation in the vertical direction, and calculating the difference between the distances measured before and after the pinch-out operation in the vertical direction, as an example. More specifically, the movement distance of the two fingers according to the pinch-out operation in the vertical direction can be obtained by subtracting the distance between the two contact points on the touch panel before the pinch-out operation in the vertical direction from the distance between the two contact points on the touch panel after the pinch-out operation in the vertical direction. Also, the font size after enlargement of the selected character string 52 can be obtained by adding a value proportional to the movement distance of the two fingers according to the pinch-out operation in the vertical direction from the font size before enlargement in each character of the selected character string 52. For example, in the event that an HTML editor is taken as an example, the enlarged display of the selected character string 52 can be performed by decorating the selected character string 52 using a <font> tag for specifying the font size after enlargement.

With the correlation table shown in FIG. 4, "DRAG OPERATION TO LEFT EDGE" is taken as a gesture operation such that one finger is in contact with on the touch panel within the specified area, and the finger thereof is moved generally in parallel with the alignment direction of each character within the character string within the character display area 51 and also in the left edge direction of the display screen 50, for example. In the event that the drag operation to the left edge has been detected wherein the finger thereof is moved in the left edge direction of the display screen 50 after transition has been made to the object decoration editing mode and the user's finger has started contact within the specified area, the personal digital assistant according to the present embodiment justifies the selected character string 52 to the left edge within the character display area 51.

Also, at this time, in the event that other character strings or the like are displayed on the left side as to the selected character string 52, the personal digital assistant according to the present embodiment inserts a line break after a character displayed the nearest to the left side of the selected character string 52 (i.e., before this selected character string) to move the selected character string 52 to the next row, and then justifies the selected character string 52 to the left edge within the character display area 51. Also, in the event that other characters and so forth are displayed on the right side as to the selected character string 52, the personal digital assistant according to the present embodiment inserts a line break before a character displayed the nearest to the right side of the selected character string 52 (i.e., after this selected character string) to move the character strings and so forth displayed on the right side of the selected character string 52 to the next row.

Figure 7:
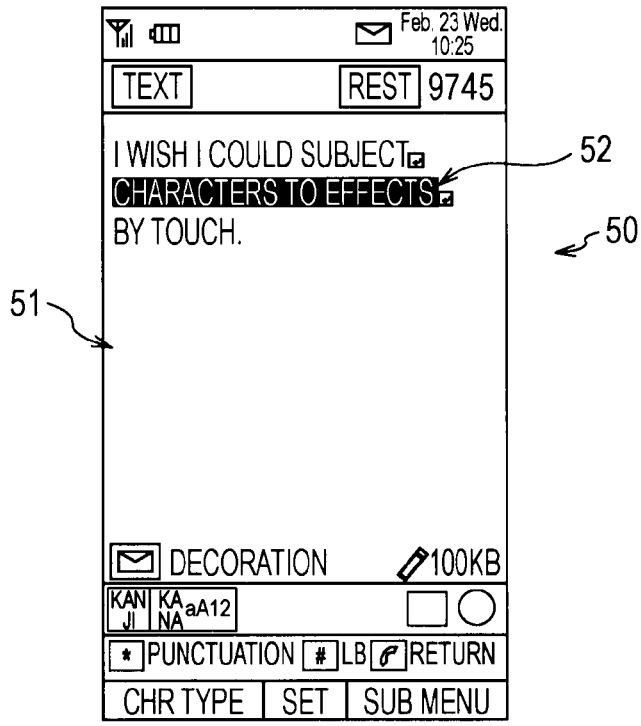
FIG. 7 is a diagram illustrating a state in which, in the object edging decoration mode at the time of the document creation and editing mode, a drag operation beginning from the specified area toward the left edge of the display screen has been performed, whereby the selected character string within the character display area has been displayed with left justification.

Thus, the sentence displayed within the character display area 51 as shown in FIG. 3 is, as shown in FIG. 7, a sentence wherein the selected character string 52 is displayed with left justification, and also, a line break is inserted before and after this selected character string 52. Note that, for example, in the event that an HTML editor is taken as an example, the left-justified display of the selected character string 52 can be performed by decorating the selected character string 52 using a <div align="left"> tag.

With the correlation table in FIG. 4, "DRAG OPERATION TO RIGHT EDGE" is taken as a gesture operation such that one finger is in contact with on the touch panel within the specified area, and the finger thereof is moved generally in parallel with the alignment direction of each character within the character string within the character display area 51 and also in the right edge direction of the display screen 50, for example. In the event that the drag operation to the right edge has been detected wherein the finger thereof is moved in the right edge direction of the display screen 50 after transition has been made to the object decoration editing mode and the user's finger has started contact within the specified area, the personal digital assistant according to the present embodiment justifies the selected character string 52 to the right edge within the character display area 51.

Note that, at this time as well, in the same way as with the case of the drag operation to the left edge, in the event that other characters and so forth are displayed on the left side as to the selected character string 52, or in the event that other characters and so forth are displayed on the right side as to the selected character string 52, the personal digital assistant according to the present embodiment inserts, for example, a line break after a character displayed the nearest to the left side of the selected character string 52 (i.e., before this selected character string) or before a character displayed the nearest to the right side of the selected character string 52 (i.e., after this selected character string).

Figure 8:
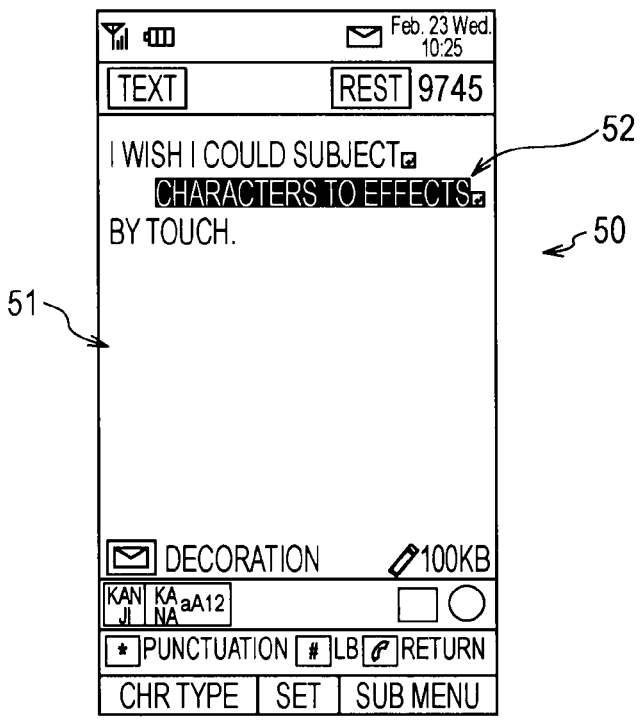
FIG. 8 is a diagram illustrating a state in which, in the object edging decoration mode at the time of the document creation and editing mode, a drag operation beginning from the specified area toward the right edge of the display screen has been performed, whereby the selected character string within the character display area has been displayed with right justification.

Thus, the sentence displayed within the character display area 51 as shown in FIG. 3 is, as shown in FIG. 8, a sentence wherein the selected character string 52 is displayed with right justification, and also, a line break is inserted before and after this selected character string 52. Note that, for example, in the event that an HTML editor is taken as an example, the right-justified display of the selected character string 52 can be performed by decorating the selected character string 52 using a <div align="right"> tag.

With the correlation table in FIG. 4, "DRAG OPERATION TO THE CENTER" is taken as a gesture operation such that one finger is in contact with on the touch panel within the specified area, and the finger thereof is moved generally in parallel with the alignment direction of each character within the character string within the character display area 51 and also generally to the center of the display screen 50, for example. In the event that the drag operation to the center has been detected wherein the finger thereof is moved in the center direction of the display screen 50 after transition has been made to the object decoration editing mode and the user's finger has started contact within the specified area, the personal digital assistant according to the present embodiment disposes the selected character string 52 to the center within the character display area 51.

Note that, at this time as well, in the same way as with the case of the drag operation to the left edge or right edge, in the event that other characters and so forth are displayed on the left side as to the selected character string 52, or in the event that other characters and so forth are displayed on the right side as to the selected character string 52, the personal digital assistant according to the present embodiment inserts, for example, a line break after a character displayed the nearest to the left side of the selected character string 52 (i.e., before this selected character string) or before a character displayed the nearest to the right side of the selected character string 52 (i.e., after this selected character string).

Figure 9:
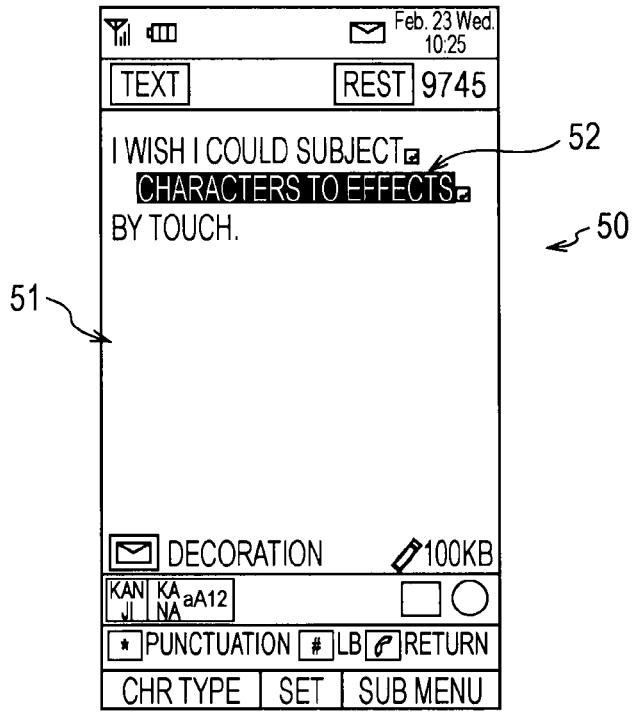
FIG. 9 is a diagram illustrating a state in which, in the object edging decoration mode at the time of the document creation and editing mode, a drag operation beginning from the specified area toward the center of the display screen has been performed, whereby the selected character string within the character display area has been displayed with centering.

Thus, the sentence displayed within the character display area 51 as shown in FIG. 3 is, as shown in FIG. 9, a sentence wherein the selected character string 52 is displayed with centering, and also, a line break is inserted before and after this selected character string 52. Note that, for example, in the event that an HTML editor is taken as an example, the centering display of the selected character string 52 can be performed by decorating the selected character string 52 using a <div align="center"> tag.

With the correlation table in FIG. 4, "FLICK OPERATION TO LEFT DIRECTION" is taken as a gesture operation such that one finger is in contact with on the touch panel, and the finger thereof is flicked generally in parallel with the alignment direction of each character within the character string within the character display area 51 and also generally toward the left direction of the display screen 50 (i.e., a gesture operation such that the finger in contact is gradually separated from the touch panel while being moved to the left direction by short distance), for example. In the event that the flick operation to the left direction has been detected on the specified area after transition has been made to the object decoration editing mode, the personal digital assistant according to the present embodiment scrolls the selected character string 52 to the left direction within the character display area 51.

Note that, at this time as well, in the same way as with the case of the drag operation to the left edge, in the event that other characters and so forth are displayed on the left side or the right side as to the selected character string 52, the personal digital assistant according to the present embodiment inserts, for example, a line break after a character displayed the nearest to the left side of the selected character string 52 or before a character displayed the nearest to the right side of the selected character string 52.

Figure 10:
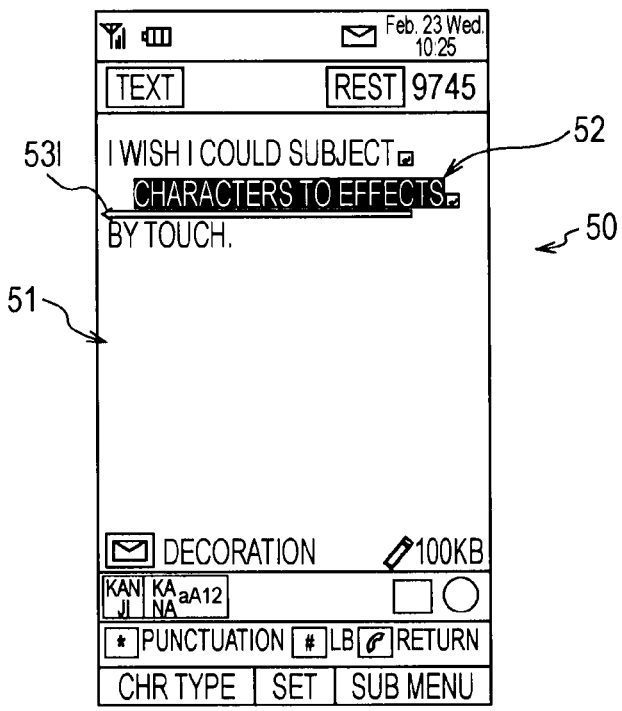
FIG. 10 is a diagram illustrating a state in which, in the object edging decoration mode at the time of the document creation and editing mode, a flick operation in the left direction has been performed on the specified area, whereby the selected character string within the character display area has been displayed with left scrolling.

Thus, the sentence displayed within the character display area 51 as shown in FIG. 3 is, as shown in FIG. 10, a sentence wherein the selected character string 52 is displayed with scroll in the left direction shown by an arrow 531 in the drawing, and also, a line break is inserted before and after this selected character string 52. Note that the arrow 531 in FIG. 10 is drawn for describing the scroll direction of the selected character string 52, and is not actually displayed on the screen. Also, for example, in the event that an HTML editor is taken as an example, the scroll display in the left direction of the selected character string 52 can be performed by decorating the selected character string 52 using a <marquee direction="left"> tag.

With the correlation table in FIG. 4, "FLICK OPERATION TO RIGHT DIRECTION" is taken as a gesture operation such that one finger is in contact with on the touch panel, and the finger thereof is flicked generally in parallel with the alignment direction of each character within the character string within the character display area 51 and also generally toward the right direction of the display screen 50 (i.e., a gesture operation such that the finger in contact is gradually separated from the touch panel while being moved to the right direction by short distance), for example. In the event that the flick operation to the left direction has been detected on the specified area after transition has been made to the object decoration editing mode, the personal digital assistant according to the present embodiment scrolls the selected character string 52 to the right direction within the character display area 51.

Note that, at this time as well, in the same way as with the case of the flick operation to the left direction, in the event that other characters and so forth are displayed on the left side or the right side as to the selected character string 52, the personal digital assistant according to the present embodiment inserts, for example, a line break after a character displayed the nearest to the left side of the selected character string 52 or before a character displayed the nearest to the right side of the selected character string 52.

Figure 11:
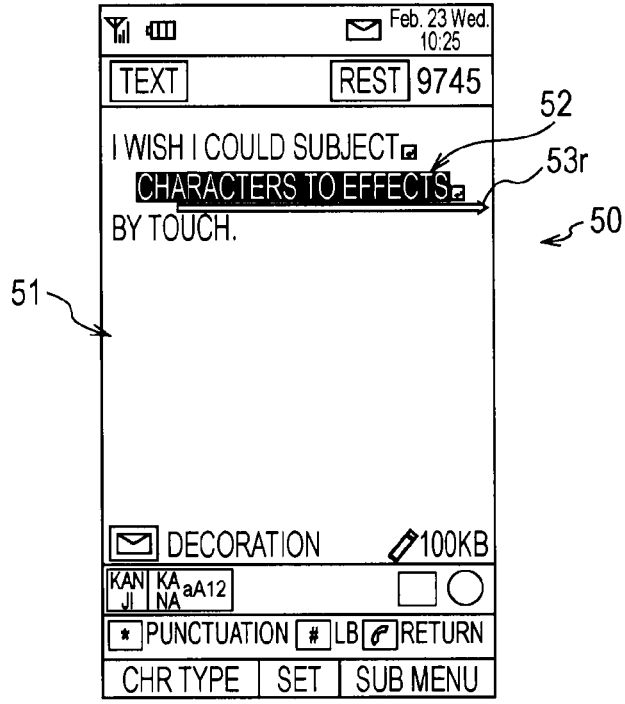
FIG. 11 is a diagram illustrating a state in which, in the object edging decoration mode at the time of the document creation and editing mode, a flick operation in the right direction has been performed on the specified area, whereby the selected character string within the character display area has been displayed with right scrolling.

Thus, the sentence displayed within the character display area 51 as shown in FIG. 3 is, as shown in FIG. 11, a sentence wherein the selected character string 52 is displayed with scroll in the right direction shown by an arrow 53r in the drawing, and also, a line break is inserted before and after this selected character string 52. Note that the arrow 53r in FIG. 11 is drawn for describing the scroll direction of the selected character string 52, and is not actually displayed on the screen. Also, for example, in the event that an HTML editor is taken as an example, the scroll display in the right direction of the selected character string 52 can be performed by decorating the selected character string 52 using a <marquee direction="right"> tag.

With the correlation table in FIG. 4, "Z-SHAPED FLICK OPERATION IN HORIZONTAL DIRECTION" is taken as a gesture operation such that one finger is in contact with on the touch panel, the finger is then moved generally in parallel with the alignment direction of each character within the character string within the character display area 51 and also generally toward the right direction of the display screen 50, this finger is moved toward somewhat the lower side in the left direction, and further the finger thereof is flicked toward the right direction (i.e., a flick gesture operation such that the finger is moved in a Z shape), for example. In the event that the Z-shaped flick operation to the horizontal direction has been detected on the specified area after transition has been made to the object decoration editing mode, the personal digital assistant according to the present embodiment scrolls the selected character string 52 to both way of the horizontal direction within the character display area 51.

Note that, at this time as well, in the same way as with the case of the flick operation to the left direction or the right direction, in the event that other characters and so forth are displayed on the left side or the right side as to the selected character string 52, the personal digital assistant according to the present embodiment inserts, for example, a line break after a character displayed the nearest to the left side of the selected character string 52 or before a character displayed the nearest to the right side of the selected character string 52.

Figure 12:
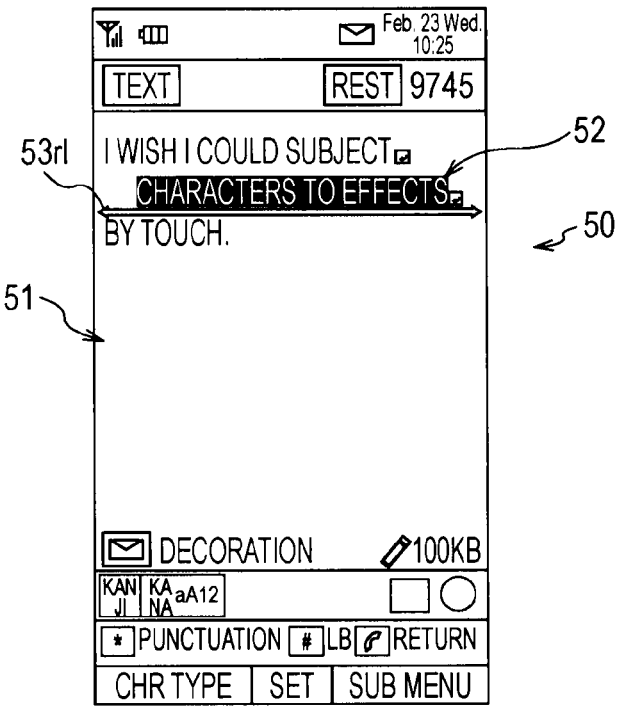
FIG. 12 is a diagram illustrating a state in which, in the object edging decoration mode at the time of the document creation and editing mode, a Z-shaped flick operation in the horizontal direction has been performed on the specified area, whereby the selected character string within the character display area has been displayed with both-way scrolling.

Thus, the sentence displayed within the character display area 51 as shown in FIG. 3 is, as shown in FIG. 12, a sentence wherein the selected character string 52 is displayed with both-way scroll in the horizontal direction shown by an arrow 53r1 in the drawing, and also, a line break is inserted before and after this selected character string 52. Note that the arrow 53r1 in FIG. 12 is drawn for describing the both-way scroll direction of the selected character string 52, and is not actually displayed on the screen. Also, for example, in the event that an HTML editor is taken as an example, the both-way scroll display in the horizontal direction of the selected character string 52 can be performed by decorating the selected character string 52 using a <marquee behavior="alternate"> tag.

With the correlation table in FIG. 4, "DOUBLE CLICK OPERATION" is taken as a gesture operation such that an operation is repeated twice wherein one finger is in contact with on the touch panel over a short amount of time and then separated therefrom. In the event that the double click operation has been detected on the specified area after transition has been made to the object decoration editing mode, the personal digital assistant according to the present embodiment blinks the selected character string 52.

Figure 13:
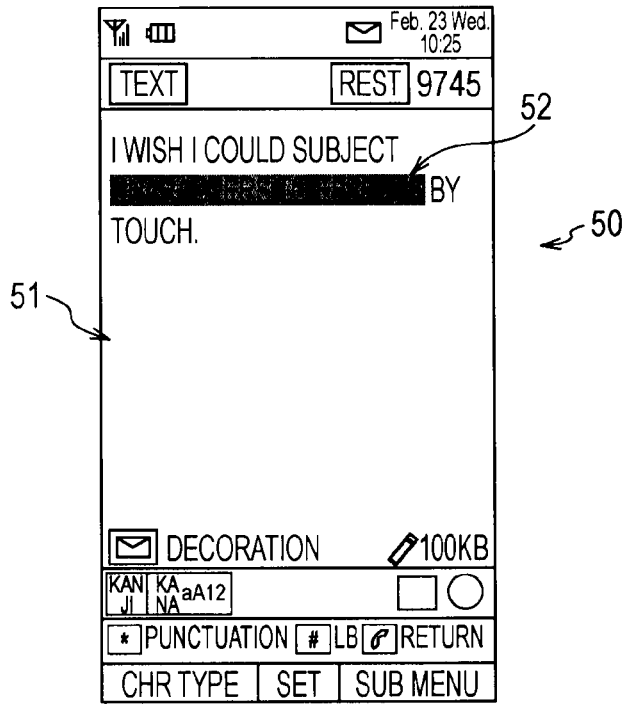
FIG. 13 is a diagram illustrating a state in which, in the object edging decoration mode at the time of the document creation and editing mode, a double click operation has been performed on the specified area, whereby the selected character string within the character display area has been displayed with blinking.

Thus, the sentence displayed within the character display area 51 as shown in FIG. 3 is, as shown in FIG. 13, a sentence wherein the selected character string 52 is displayed with blinking. Note that, for example, in the event that an HTML editor is taken as an example, the blinking display of the selected character string 52 can be performed by decorating the selected character string 52 using a <blink> tag.

With the correlation table in FIG. 4, "PINCH-OUT OPERATION IN HORIZONTAL DIRECTION" is taken as a gesture operation such that in a state in which two fingers are in contact with on the touch panel, generally in parallel with the alignment direction of each character within the character string within the character display area 51, the two fingers are moved so that one finger is separated in the right direction of the display screen 50, and the other finger is separated in the left direction, thereby moving the two fingers in a direction where the interval between the two fingers is widened. In the event that the pinch-out operation in the horizontal direction has been detected on the specified area after transition has been made to the object decoration editing mode, the personal digital assistant according to the present embodiment changes each character of the selected character string to a bold character.

Figure 14:
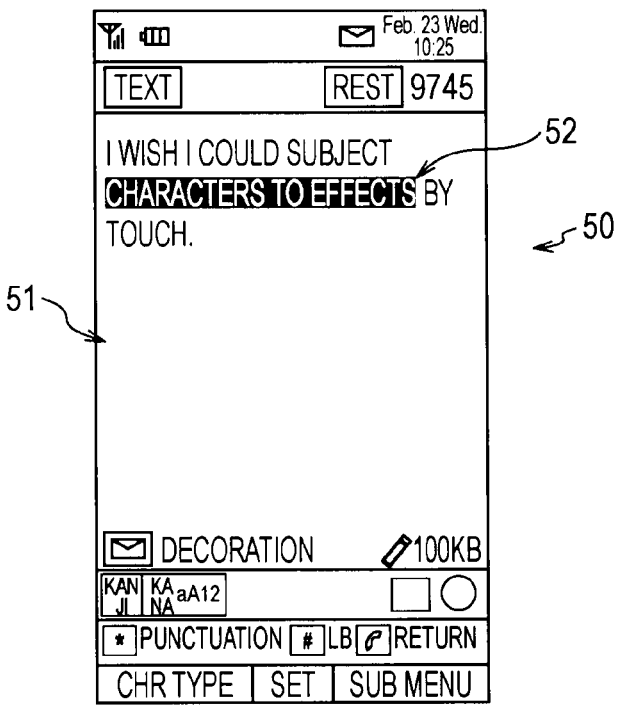
FIG. 14 is a diagram illustrating a state in which, in the object edging decoration mode at the time of the document creation and editing mode, a pinch-out operation in the horizontal direction has been performed on the specified area, whereby the selected character string within the character display area has been displayed with bold characters.

Thus, the sentence displayed within the character display area 51 as shown in FIG. 3 is, as shown in FIG. 14, a sentence wherein only each character of the selected character string 52 is changed to a bold character. Note that, for example, in the event that an HTML editor is taken as an example, the bold-character display of the selected character string 52 can be performed by decorating each character of the selected character string 52 using a <b> tag.

Also, according to "PINCH-IN OPERATION IN HORIZONTAL DIRECTION", the personal digital assistant according to the present embodiment can also change each character of the selected character string to a thin character. The pinch-in operation in the horizontal direction is taken as a gesture operation such that in a state in which two fingers are in contact with on the touch panel, generally in parallel with the alignment direction of each character within the character string within the character display area 51, the two fingers are moved so that one finger approaches from the right direction of the display screen 50, and the other finger approaches from the left direction, thereby moving the two fingers in a direction where the interval between the two fingers is narrowed down. In the event that the pinch-in operation in the horizontal direction has been detected on the specified area after transition has been made to the object decoration editing mode, the personal digital assistant according to the present embodiment changes each character of the selected character string to a thin character.

With the correlation table in FIG. 4, "PARALLEL MOVEMENT OPERATION IN RIGHT DIRECTION BY MULTI-TOUCH" is taken as a gesture operation such that in a state in which two fingers are in contact with on the touch panel, while the interval of the two fingers is generally kept, the two fingers are moved generally in parallel with the alignment direction of each character within the character string within the character display area 51, and also toward the right direction of the display screen 50. In the event that the parallel movement operation in the right direction by multi-touch has been detected on the specified area after transition has been made to the object decoration editing mode, the personal digital assistant according to the present embodiment changes each character of the selected character string to an italic character.

Figure 15:
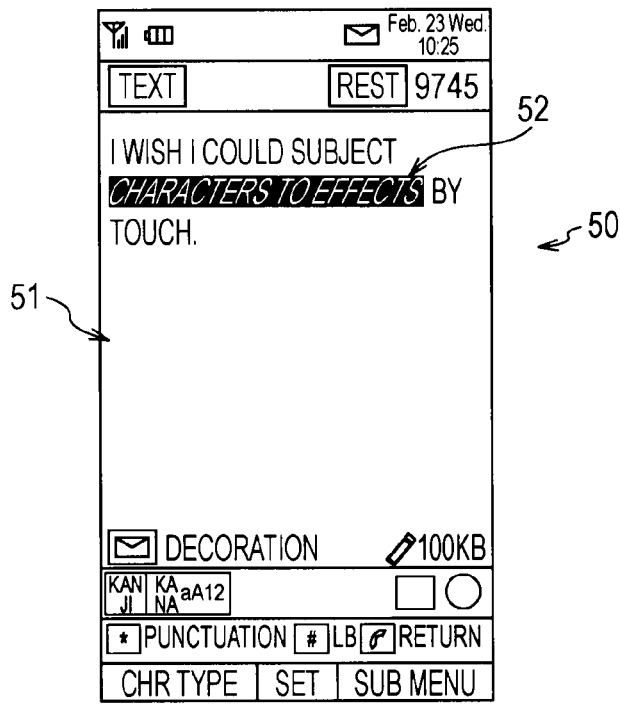
FIG. 15 is a diagram illustrating a state in which, in the object edging decoration mode at the time of the document creation and editing mode, a parallel movement operation in the horizontal direction has been performed on the specified area by multi-touch, whereby the selected character string within the character display area has been displayed in italics.

Thus, the sentence displayed within the character display area 51 as shown in FIG. 3 is, as shown in FIG. 15, a sentence wherein only the characters of the selected character string 52 are changed to italics. Note that, for example, in the event that an HTML editor is taken as an example, the italic-character display of the selected character string 52 can be performed by decorating each character of the selected character string 52 using a <i> tag.

With the correlation table in FIG. 4, "ROTATING OPERATION BY MULTI-TOUCH AND PINCH-IN OPERATION/PINCH-OUT OPERATION" is taken as a gesture operation combined, in a state in which two fingers are in contact with on the touch panel, from an operation such that one finger is taken as the rotation center, and the other finger is rotated and moved, and an operation such that distance between the one finger serving as the rotation center and the other finger which rotates and moves is changed. In the event that the rotating operation by multi-touch has been detected on the specified area after transition has been made to the object decoration editing mode, the personal digital assistant according to the present embodiment sets the hue of each character of the selected character string to a value according to the rotation angle of the rotating operation. Also, in the event that the pinch-in operation or pinch-out operation has been detected along with the detection of the rotating operation, the personal digital assistant according to the present embodiment sets the saturation of each character of the selected character string according to the movement distance of the two fingers by the pinch-in operation or pinch-out operation.

Figure 16:
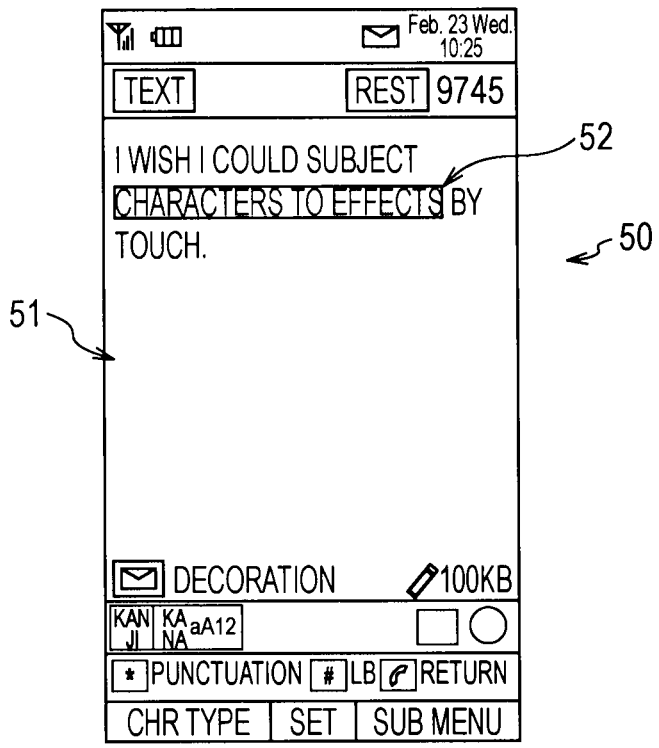
FIG. 16 is a diagram illustrating a state in which, in the object edging decoration mode at the time of the document creation and editing mode, a rotating operation and a pinch-in operation/pinch-out operation have been performed on the specified area by multi-touch, whereby the hue and saturation of the selected character string within the character display area have been changed.

Thus, the sentence displayed within the character display area 51 as shown in FIG. 3 is, as shown in FIG. 16, a sentence wherein only each character of the selected character string 52 is set to the hue according to the rotation angle by the rotating operation, and also set to the saturation according to the movement distance of the two fingers by the pinch-in operation or pinch-out operation. Note that, for example, in the event that an HTML editor is taken as an example, the display of the selected character string 52 can be performed by decorating the selected character string 52 using a <font> tag for specifying the hue and saturation.

Figure 17:
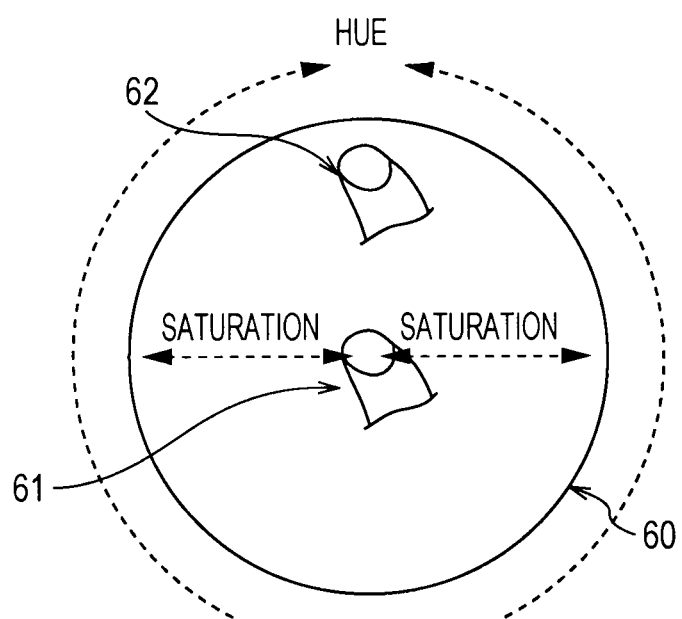
FIG. 17 is a diagram illustrating a circular region representing the hue and saturation of HSV space to be set at the time of a rotating operation and a pinch-in operation/pinch-out operation being performed on the specified area by multi-touch in the object edging decoration mode at the time of the document creation and editing mode.
Figure 18:
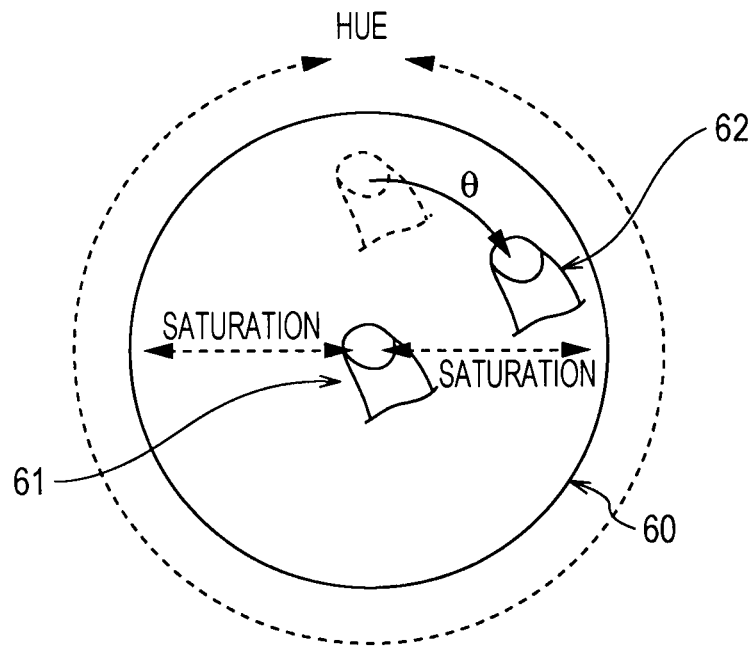
FIG. 18 is a diagram used for correlated description between the rotating angle and hue at the time of a rotating operation and a pinch-in operation/pinch-out operation being performed on the specified area by multi-touch in the object edging decoration mode at the time of the document creation and editing mode.
Figure 19:
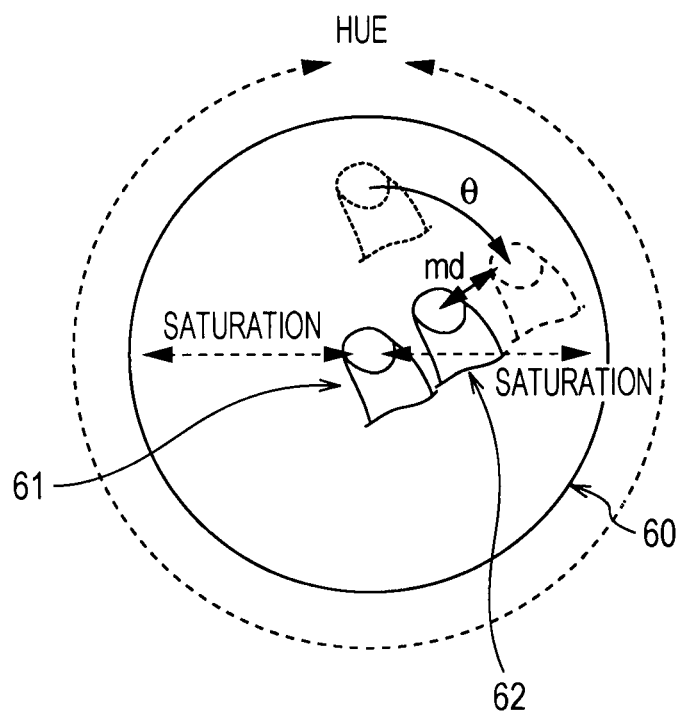
FIG. 19 is a diagram used for correlated description between the movement distance and saturation at the time of a rotating operation and a pinch-in operation/pinch-out operation being performed on the specified area by multi-touch in the object edging decoration mode at the time of the document creation and editing mode.

Now, with the present embodiment, hue according to the rotation angle, and saturation according to the movement distance of the two fingers can be obtained using a circular region 60 representing hue and saturation in so-called HSV (Hue Saturation Value) space shown in FIG. 17 through FIG. 19. For example, with the circular region 60 representing the hue and saturation of the HSV space, the hue can be obtained as the values of R (Red), G (Green), and B (Blue) according to an angle made up of a line segment connecting from the center of this circular region 60 to a desired position in the circumference direction for example, and the Y axis of the X-Y coordinate axes for example. Also, with the circular region 60 representing the hue and saturation of the HSV space, the saturation can be obtained as the values of R (Red), G (Green), and B (Blue) according to the length of a line segment connecting from the center of this circular region 60 to a desired position in the circumference direction for example.

Therefore, at the time of detecting that the rotating operation has been performed by multi-touch on the specified area, the personal digital assistant according to the present embodiment sets, as shown in FIG. 17, a contact point where the one finger 61 is in contact with on the touch panel at the time of the rotating operation (i.e., rotation center) as the center of the circular region 60 of the HSV space.

Then, the personal digital assistant according to the present embodiment calculates, as shown in FIG. 18, the R, G and B values of the hue based on an angle θ made up of a line segment connecting from a contact point where the other finger 62 which rotates and moves is in contact with on the touch panel to the contact point by the one finger 61 (the center of the circular region 60), and the Y axis.

Also, in the event that the pinch-in operation or pinch-out operation has been detected along with the detection of the rotating operation, the personal digital assistant according to the present embodiment calculates, as shown in FIG. 19, the R, G and B values of the saturation based on change in the length of a line segment connecting the contact point by the other finger 62 to the contact point by the one finger 61 (movement distance md of the other finger). Note that the movement distance md of the other finger 62 can be obtained by subtracting distance between the two fingers before the pinch-in operation from distance between the two fingers after the pinch-in operation, or by subtracting distance between the two fingers after the pinch-out operation from distance between the two fingers before the pinch-out operation.

Also, the finger serving as the rotation center may not necessarily be fixed to one location, and even in the event that while the two fingers are mutually moved, and relatively rotated, distance between the two fingers is changed, the hue and saturation can be obtained. In this case, when the two fingers are in contact with on the touch panel by the multi-touch, of two contact points by the two fingers, a contact point of which the coordinate value in the Y-axial direction is smaller is taken as the center of the circular region, and then when the two fingers are relatively rotated, the hue can be obtained based on an angle made up of a line segment connecting the two contact points, and the Y axis, and also the saturation can be obtained based on change in the length of the line segment connecting the two contact points.

With the correlation table in FIG. 4, "SINGLE-TOUCH OPERATION AT A PORTION OTHER THAN SPECIFIC AREA" is taken as a gesture operation such that, with an area other than the specified area, one finger is in contact with on the touch panel only for a short time, and immediately separated therefrom, for example. In the event that the single touch operation has been detected at a portion other than the specified area after transition has been made to the object decoration editing mode, the personal digital assistant according to the present embodiment releases the range selection of the selected character string, and also returns the operation mode of this terminal from the object decoration editing mode to the normal sentence creation and editing mode.

With the present embodiment, at the time of the object decoration editing mode, in addition to various types of decoration based on the correlation table in FIG. 4, various types of editing or the like based on the correlation table shown in FIG. 20 can be performed, for example.

Figure 21:
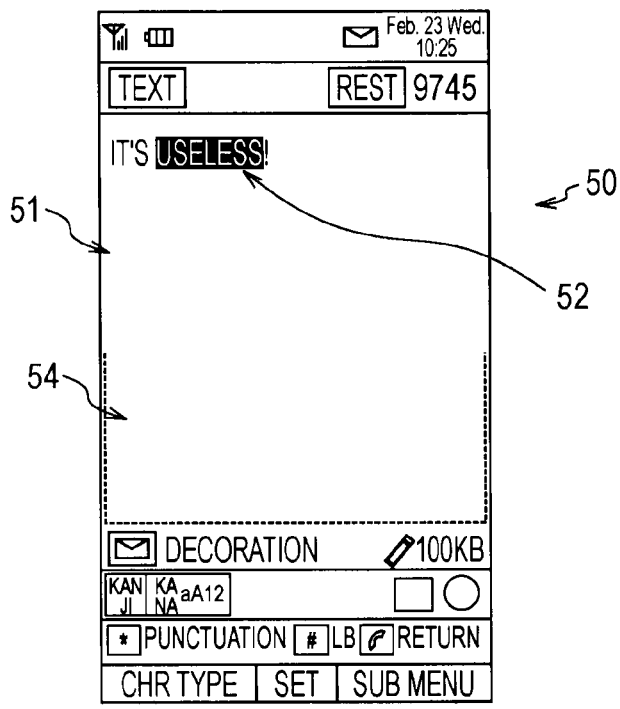
FIG. 21 is a diagram illustrating a state after the user has specified a desired character string as a selected character string out of a lateral-writing sentence displayed on the character display area of the display screen before a gesture operation as to the dedicated area is performed.
Figure 22:
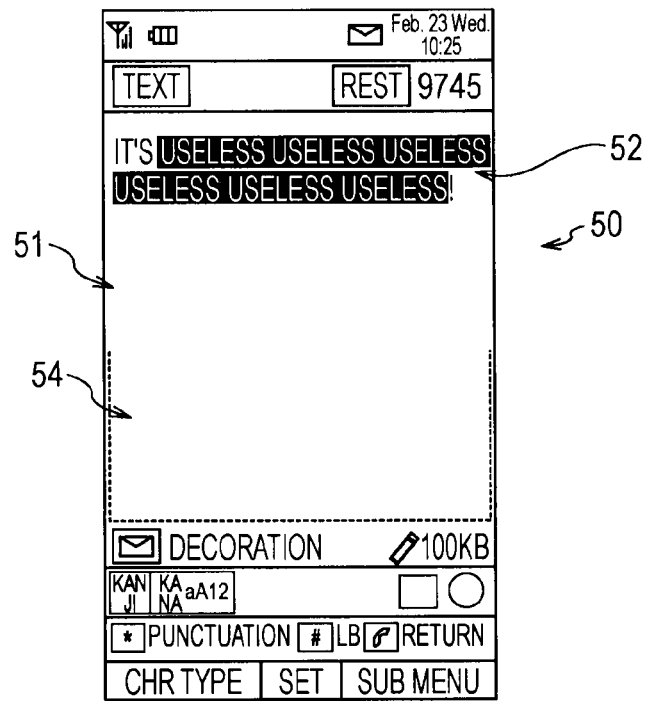
FIG. 22 is a diagram illustrating a state in which, in the object edging decoration mode at the time of the document creation and editing mode, a lateral-direction (positive) operation has been performed on the dedicated area, whereby the selected character string within the character display area has been copied and consecutively input.

The editing or the like based on this correlation table in FIG. 20 are performed according to a gesture operation as to the dedicated area prepared on the touch panel, for example. Note that, with the personal digital assistant according to the present embodiment, transition to the object decoration editing mode based on this correlation table in FIG. 20 is executed at the time of a predetermined gesture operation being performed on a predetermined dedicated area 54 such as shown in FIG. 21 or FIG. 22 as an example. As an example, the personal digital assistant according to the present embodiment changes to the object decoration editing mode based on this correlation table in FIG. 20 at the time of the slide gesture operation in the right direction having been detected on the dedicated area 54.

The correlation table in FIG. 20 shows correlation between each gesture operation that can be detected on the predetermined dedicated area 54 such as shown in FIG. 21 or FIG. 22, and an editing content to be subjected as to the selected object (selected character string 52) at the time of such each gesture operation being performed. Note that the dedicated area 54 exemplified in FIG. 21 and FIG. 22 is merely an example, and may be provided to another location, or may have a size or shape different from the example in the drawing. Also, the example in FIG. 21 illustrates a state before a gesture operation as to the dedicated area 54 is performed, and after the user has specified a desired character string of the lateral-writing sentence displayed on the character display area 51 of the display screen 50 as the selected character string 52.

Also, the personal digital assistant according to the present embodiment is configured, as shown in the correlation table in FIG. 20, so as to change the correlation between a gesture operation as to the dedicated area and the content of the editing or the like according to the character type of the selected character string 52 as appropriate. Note that as for character types, alphabetic characters, numeric characters, symbols, and so forth can be given.

Hereafter, the correlation table in FIG. 20 will be described.

In the event that the character type of the selected character string 52 is characters or symbols, "LATERAL DIRECTION (POSITIVE) OPERATION" of the correlation table shown in FIG. 20 is taken as a gesture operation such that on the dedicated area 54, for example, in a state in which a finger is in contact with on the touch panel, the finger is slid and moved in the X-axial direction (the lateral direction of the display screen) of the X-Y coordinates and also in a predetermined positive direction (the right direction in this example), and the movement distance at this time is equal to or greater than a certain value in the X-axial direction (lateral direction), and is less than a certain value in the Y-axial direction (the longitudinal direction of the display screen). Note that the certain value in the movement distance in the X-axial direction, and the certain value in the movement distance in the Y-axial direction are different values, for example. In this way, in the event of detecting that the lateral direction (positive) operation has been performed on the dedicated area 54, the personal digital assistant according to the present embodiment consecutively copies and pastes the selected character string 52 behind the selected character string 52 by the number according to the movement distance by the finger according to this lateral direction (positive) operation.

Thus, the sentence displayed within the character display area 51 of the display screen 50 as shown in FIG. 21 is, as shown in FIG. 22, a sentence wherein behind the selected character string 52, this selected character string 52 is consecutively input by the number according to the movement distance of the finger at the time of the lateral direction (positive) operation. Note that Kanji has been given as the character types in FIG. 21 and FIG. 22, but the character type in this case may be Hiragana characters, alphabetic characters, or otherwise the characters, numeric characters, various symbols of other languages.

In the event that the character type of the selected character string is characters or symbols, "LATERAL DIRECTION (NEGATIVE) OPERATION" of the correlation table shown in FIG. 20 is taken as a gesture operation such that on the dedicated area, for example, in a state in which a finger is in contact with on the touch panel, the finger is slid and moved in the X-axial direction (lateral direction) of the X-Y coordinates and also in the opposite direction (the left direction in this example) of the predetermined positive direction. In this way, in the event of detecting that the lateral direction (negative) operation has been performed on the dedicated area 54, when there are copied and consecutively input selected character strings 52 behind the selected character string 52 as shown in FIG. 21, the personal digital assistant according to the present embodiment deletes the copied and consecutively input selected character strings 52 by the number according to the movement distance of the finger by the lateral (negative) operation. Note that, in the case of this example, the character type may be any of Kanji, Hiragana characters, alphabetic characters, numeric characters, symbols, and so forth.

In the event that the character type of the selected character string is alphabetic, "VERTICAL DIRECTION OPERATION" of the correlation table shown in FIG. 20 is taken as a gesture operation such that on the dedicated area, for example, in a state in which a finger is in contact with on the touch panel, the finger is slid and moved in the X-axial direction of the X-Y coordinates and also in a predetermined positive direction (right direction), and the movement distance at this time is equal to or greater than a certain value in the X-axial direction, and also equal to or greater than a certain value in a positive direction (upward direction) in the Y-axial direction, and further equal to or greater than a certain value in a negative direction (downward direction) in the Y-axial direction. In this way, in the event that the character type of the selected character string is alphabetic, upon detecting that the vertical direction operation has been performed on the dedicated area, the personal digital assistant according to the present embodiment takes the character type of the selected character string as small characters while the movement distance of the positive direction (upward direction) in the Y-axial direction is less than the certain value, and copies and consecutively pastes the characters by the number according to the movement distance in the X-axial direction, and takes the character type of the selected character string as capital characters while the movement distance of the positive direction (upward direction) in the Y-axial direction is equal to or greater than the certain value, and consecutively pastes the characters by the number according to the movement distance in the X-axial direction. Note that, with this example, alphabetic is given as the character type, but this character type may be characters of other languages as long as there are capital characters and small characters.

In the event that the character type of the selected character string is characters or symbols, "UPPER-RIGHT DIRECTION OPERATION" of the correlation table shown in FIG. 20 is taken as a gesture operation such that on the dedicated area, for example, in a state in which a finger is in contact with on the touch panel, the finger is slid and moved in the X-axial direction of the X-Y coordinates and also in a predetermined positive direction (right direction), and the movement distance at this time is equal to or greater than a certain value in the X-axial direction, and also equal to or greater than a certain value in the positive direction (upward direction) in the Y-axial direction. In this way, in the event that the character type of the selected character string is characters or symbols, upon detecting that the upper-right direction operation has been performed on the dedicated area, the personal digital assistant according to the present embodiment copies and consecutively pastes the character or symbol by the number according to the movement distance in the X-axial direction while gradually increasing the size of a character or symbol of the selected character string according to the movement distance in the positive direction (upward direction) in the Y-axial direction. Note that, in the case of this example, the character type may be any of Kanji, Hiragana characters, alphabetic characters, numeric characters, symbols, and so forth.

In the event that the character type of the selected character string is symbolic, "VERTICAL DIRECTION OPERATION" of the correlation table shown in FIG. 20 is taken as a gesture operation such that on the dedicated area, for example, in a state in which a finger is in contact with on the touch panel, the finger is slid and moved in the X-axial direction of the X-Y coordinates and also in a predetermined positive direction (right direction), and the movement distance at this time is equal to or greater than a certain value in the X-axial direction, and also equal to or greater than a certain value in the positive direction (upward direction) in the Y-axial direction. In this way, in the event that the character type of the selected character string is symbolic, upon detecting that the vertical direction operation has been performed on the dedicated area, the personal digital assistant according to the present embodiment copies and consecutively pastes a symbol of the selected character string by the number according to the movement distance in the X-axial direction while the movement distance in the positive direction (upward direction) in the Y-axial direction is less than the certain value, and consecutively pastes another symbol by the number according to the movement distance in the X-axial direction while the movement distance in the positive direction (upward direction) in the Y-axial direction is equal to or greater than the certain value.

In the event that the character type of the selected character string is alphabetic, "UPPER-RIGHT DIRECTION OPERATION" of the correlation table shown in FIG. 20 is taken as a gesture operation such that on the dedicated area, for example, in a state in which a finger is in contact with on the touch panel, the finger is slid and moved in the X-axial direction of the X-Y coordinates and also in a predetermined positive direction (right direction), and the movement distance at this time is equal to or greater than a certain value in the X-axial direction, and also equal to or greater than a certain value in the positive direction (upward direction) in the Y-axial direction. In this way, in the event that the character type of the selected character string is alphabetic, upon detecting that the upper-right direction operation has been performed on the dedicated area, while sequentially changing a character of the selected character string to each character in the alphabetical order as an example according to the movement distance in the positive (upward direction) in the Y-axial direction, the personal digital assistant according to the present embodiment consecutively pastes the character by the number according to the movement distance in the X-axial direction. Note that, with this example, alphabetic is given as the character type, but this character type may be characters of other languages as long as each character can be aligned in a predetermined order such as the alphabetic order (e.g., Hiragana to be arrayed in the order of the Japanese syllabary, etc.).

In the event that the character type of the selected character string is numeric, "UPPER-RIGHT DIRECTION OPERATION" of the correlation table shown in FIG. 20 is taken as a gesture operation such that on the dedicated area, for example, in a state in which a finger is in contact with on the touch panel, the finger is slid and moved in the X-axial direction of the X-Y coordinates and also in a predetermined positive direction (right direction), and the movement distance at this time is equal to or greater than a certain value in the X-axial direction, and also equal to or greater than a certain value in the positive direction (upward direction) in the Y-axial direction. In this way, in the event that the character type of the selected character string is numeric, upon detecting that the upper-right direction operation has been performed on the dedicated area, while sequentially changing a numeric character of the selected character string to an ascending numeric character as an example according to the movement distance in the positive (upward direction) in the Y-axial direction, the personal digital assistant according to the present embodiment consecutively pastes the character by the number according to the movement distance in the X-axial direction.

[Processing Flow at Time of Execution of Character Decoration and Editing by Information Processing Control Program According to Present Embodiment]

Hereafter, description will be made regarding a flowchart at the time of the personal digital assistant according to the present embodiment executing the information processing control program to perform processing such as decoration of characters, consecutive input editing, or the like as described above. Note that the information processing program according to the present embodiment may be prepared at the time of shipping of the portable information terminal from the factory, or may be separately acquired via the aforementioned wires communication, external input/output terminal, or various types of storage media such as external memory or disc-form storage media or the like.

FIG. 23 through FIG. 39 illustrate a processing flow at the time of the control and computing unit 13 of the personal digital assistant according to the present embodiment executing the information processing control program according to the present embodiment. Note that the information processing control program in this case may be activated according to instructions from the user, or may automatically be activated according to activation of an editor.

Figure 23:
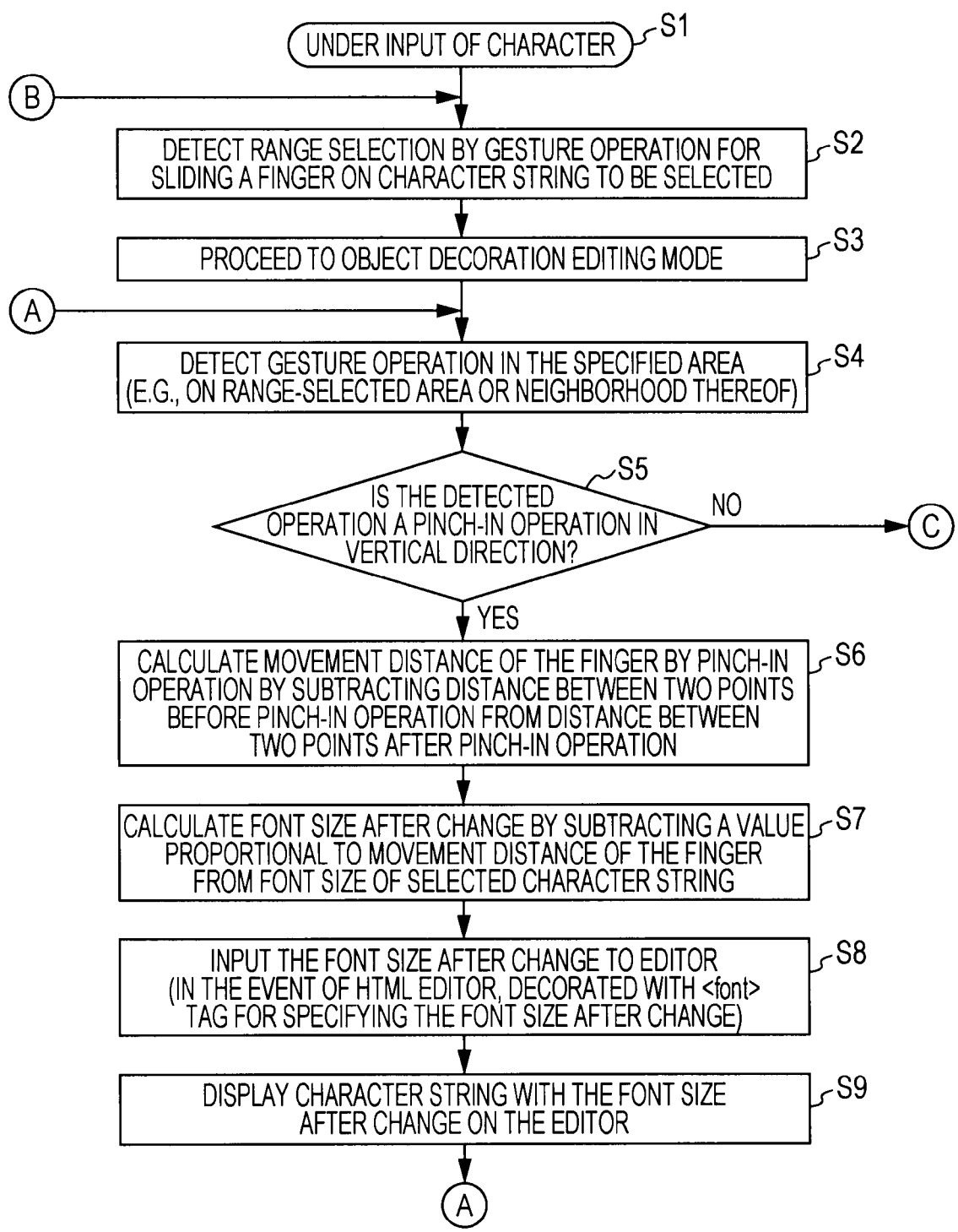
FIG. 23 is a flowchart illustrating a processing flow when the personal digital assistant according to the present embodiment displays the selected character string by reducing the font size in response to a pinch-in operation in the vertical direction on the specified area in the object edging decoration mode at the time of the document creation and editing mode.

With the flowchart in FIG. 23, let us say that as step S1 the personal digital assistant according to the present embodiment has already activated various editors, for example, such as the above-described HTML editor, and is in the sentence creation and editing mode.

In the event that the sentence creation and editing mode has been set, as step S2 upon detecting that a user's desired character string within a sentence on the character display area 51 of the display screen 50 has been selected as shown in the above-described FIG. 3 by range selection through the slide gesture operation on the touch panel 30, the control and computing unit 13 advances the processing to processing in step S3.

Upon proceeding to the processing in step S3, the control and computing unit 13 changes the operation mode of this terminal to the object decoration editing mode in the sentence creation and editing mode.

Upon proceeding to the object decoration editing mode, the control and computing unit 13 sets the selected character string 52 according to the range selection, and an adjacent area thereof on the touch panel 30 as the above-described specified area. The control and computing unit 13 then sets the specified area on the touch panel 30 as an area for detecting each gesture operation described in the correlation table in the above-described FIG. 4, and becomes an input waiting state of a gesture operation as to this specified area by the user.

Next, upon detecting a gesture operation on the specified area, as processing in step S5 the control and computing unit 13 determines whether or not the gesture operation thereof is the pinch-in operation in the vertical direction set to the correlation table in the above-described FIG. 4. In the event that determination is made in the determination processing in step S5 that the gesture operation is the pinch-in operation in the vertical direction, the control and computing unit 13 advances the processing to step S6, and in the event that determination is made that the gesture operation is not the pinch-in operation in the vertical direction, advances the processing to step S11 in FIG. 24.

Upon proceeding to step S6 after determination is made in step S5 that the gesture operation is the pinch-in operation in the vertical direction, the control and computing unit 13 subtracts distance between two contact points on the touch panel by two fingers before this pinch-in operation in the vertical direction from distance between the two contact points on the touch panel by the two fingers after this pinch-in operation in the vertical direction, thereby calculating the movement distance of the two fingers by this pinch-in operation in the vertical direction.

Next, the control and computing unit 13 advances the processing to step S7, and subtracts a value proportional to the movement distance of the two fingers by the pinch-in operation in the vertical direction from the font size before reduction of each character of the selected character string 52, thereby calculating the font size after reduction of the selected character string.

As processing in step S8, the control and computing unit 13 inputs the font size after reduction of the selected character string 52 to the editor. As an example, in the event of an HTML editor, the control and computing unit 13 decorates the selected character string 52 using the tag of <font> which specifies the font size after reduction.

Subsequently, as processing in step S9 the control and computing unit 13 controls the video signal processing unit 20 via the editor to display the selected character string 52 having the font size after reduction on the screen of the display 21 as shown in the above-described FIG. 5.

After the processing in step S9, the control and computing unit 13 returns the processing to step S4.

Figure 24:
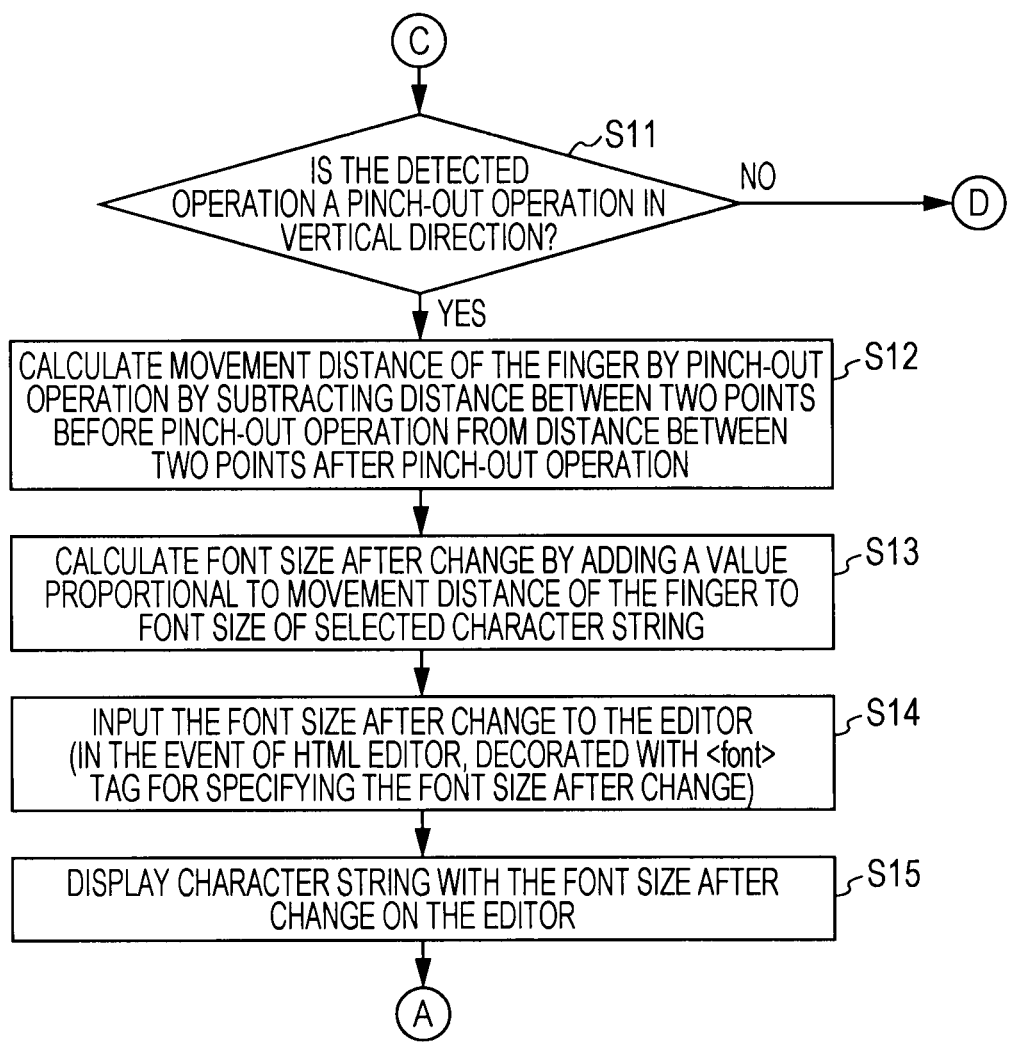
FIG. 24 is a flowchart illustrating a processing flow when the personal digital assistant according to the present embodiment displays the selected character string by enlarging the font size in response to a pinch-out operation in the vertical direction on the specified area in the object edging decoration mode at the time of the document creation and editing mode.

Also, upon proceeding to processing in step S11 in FIG. 24 after determination is made in step S5 that the gesture operation is not the pinch-in operation in the vertical direction, the control and computing unit 13 determines whether or not the gesture operation detected on the specified area is the pinch-out operation in the vertical direction set to the correlation table in the above-described FIG. 4. In the event that determination is made in the determination processing in step S11 that the detected gesture operation is the pinch-out operation in the vertical direction, the control and computing unit 13 advances the processing to step S12, and in the event that determination is made that the detected gesture operation is not the pinch-out operation in the vertical direction, advances the processing to step S21 in FIG. 25.

Upon proceeding to step S12 after determination is made that the detected gesture is the pinch-out operation in the vertical direction, the control and computing unit 13 subtracts distance between two contact points on the touch panel by two fingers before this pinch-out operation in the vertical direction from distance between the two contact points on the touch panel by the two fingers after this pinch-out operation in the vertical direction, thereby calculating the movement distance of the two fingers by this pinch-out operation in the vertical direction.

Next, the control and computing unit 13 advances the processing to step S13, and adds a value proportional to the movement distance of the two fingers by the pinch-out operation in the vertical direction to the font size before reduction of each character of the selected character string 52, thereby calculating the font size after enlargement of the selected character string 52.

As processing in step S14, the control and computing unit 13 inputs the font size after enlargement of the selected character string 52 to the editor. As an example, in the event of an HTML editor, the control and computing unit 13 decorates the selected character string 52 using the tag of <font> which specifies the font size after enlargement.

Subsequently, as processing in step S15 the control and computing unit 13 controls the video signal processing unit 20 via the editor to display the selected character string 52 having the font size after enlargement on the screen of the display 21 as shown in the above-described FIG. 6.

After the processing in step S15, the control and computing unit 13 returns the processing to step S4 in FIG. 23.

Figure 25:
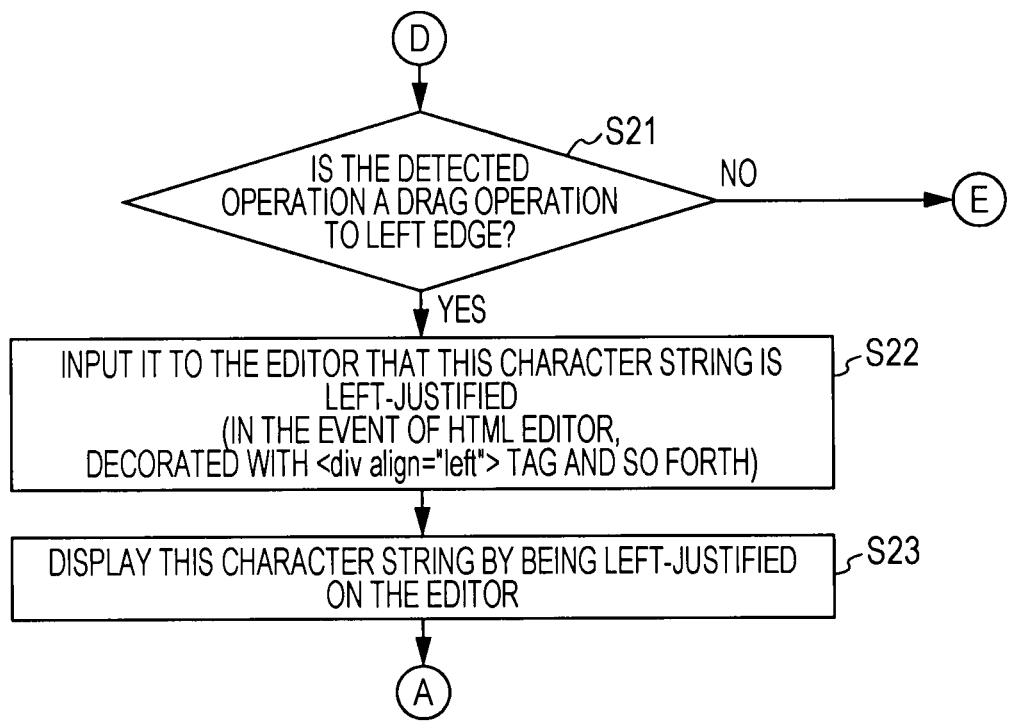
FIG. 25 is a flowchart illustrating a processing flow when the personal digital assistant according to the present embodiment displays the selected character string by left justification in response to a drag operation to the left edge from the specified area in the object edging decoration mode at the time of the document creation and editing mode.

Also, upon proceeding to processing in step S21 in FIG. 25 after determination is made in step S11 that the gesture operation is not the pinch-out operation in the vertical direction, the control and computing unit 13 determines whether or not the gesture operation detected on the specified area is the drag operation to the left edge set to the correlation table in the above-described FIG. 4. In the event that determination is made in the determination processing in step S21 that the detected gesture operation is the drag operation to the left edge, the control and computing unit 13 advances the processing to step S22, and in the event that determination is made that the detected gesture operation is not the drag operation to the left edge, advances the processing to step S31 in FIG. 26.

Upon proceeding to step S22 after determination is made in step S21 that the gesture operation is the drag operation to the left edge, the control and computing unit 13 inputs it to the editor that this selected character string 52 is left-justified. As an example, in the event of an HTML editor, the control and computing unit 13 decorates the selected character string 52 using the tag of <div align="left">. Note that at the time of this left-justified display, in the event that other characters and so forth are displayed on the left side of the selected character string 52, or other characters and so forth are displayed on the right side of the selected character string 52, the control and computing unit 13 inputs a line break for dividing the row of the selected character string 52 displayed with left justification, and the other characters, to the editor.

Subsequently, as processing in step S23 the control and computing unit 13 controls the video signal processing unit 20 via the editor to display the left-justified selected character string 52 on the screen of the display 21 as shown in the above-described FIG. 7.

After the processing in step S23, the control and computing unit 13 returns the processing to step S4 in FIG. 23.

Figure 26:
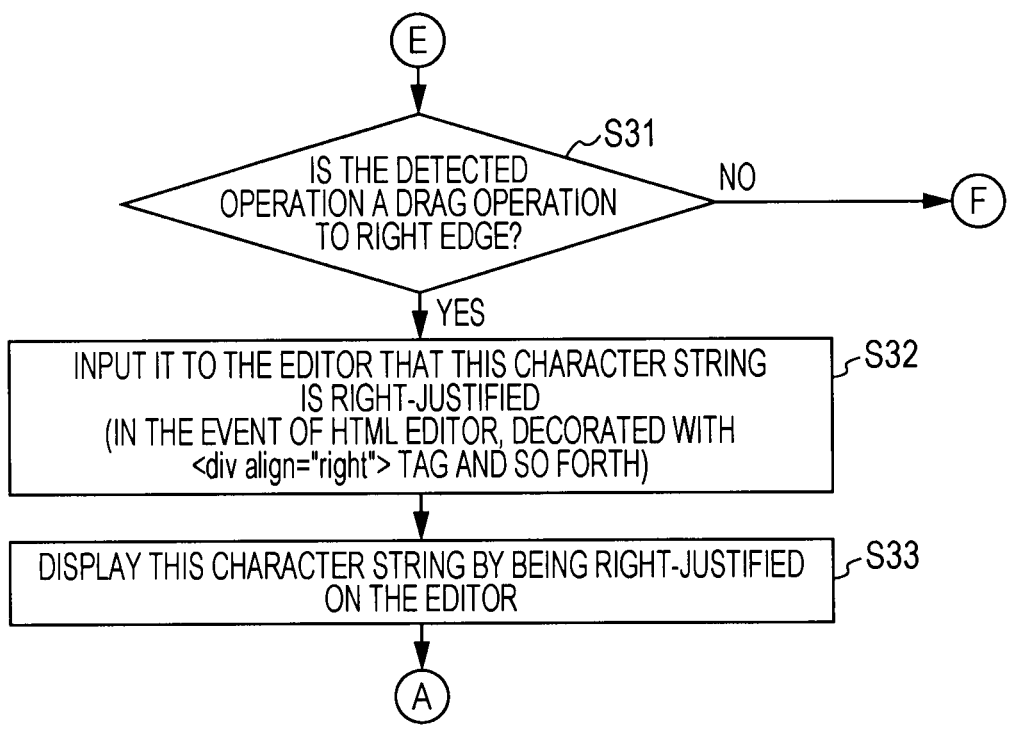
FIG. 26 is a flowchart illustrating a processing flow when the personal digital assistant according to the present embodiment displays the selected character string by right justification in response to a drag operation to the right edge from the specified area in the object edging decoration mode at the time of the document creation and editing mode.

Also, upon proceeding to processing in step S31 in FIG. 26 after determination is made in step S21 that the gesture operation is not the drag operation to the left edge, the control and computing unit 13 determines whether or not the gesture operation detected on the specified area is the drag operation to the right edge set to the correlation table in the above-described FIG. 4. In the event that determination is made in the determination processing in step S31 that the detected gesture operation is the drag operation to the right edge, the control and computing unit 13 advances the processing to step S32, and in the event that determination is made that the detected gesture operation is not the drag operation to the right edge, advances the processing to step S41 in FIG. 27.

Upon proceeding to step S32 after determination is made in step S31 that the gesture operation is the drag operation to the right edge, the control and computing unit 13 inputs it to the editor that this selected character string is right-justified. As an example, in the event of an HTML editor, the control and computing unit 13 decorates the selected character string 52 using the tag of <div align="right">. Note that at the time of this right-justified display, in the event that other characters and so forth are displayed on the left side of the selected character string 52, or other characters and so forth are displayed on the right side of the selected character string 52, the control and computing unit 13 inputs a line break for dividing the row of the selected character string 52 displayed with right justification, and the other characters, to the editor.

Subsequently, as processing in step S33 the control and computing unit 13 controls the video signal processing unit 20 via the editor to display the right-justified selected character string 52 on the screen of the display 21 as shown in the above-described FIG. 8.

After the processing in step S33, the control and computing unit 13 returns the processing to step S4 in FIG. 23.

Figure 27:
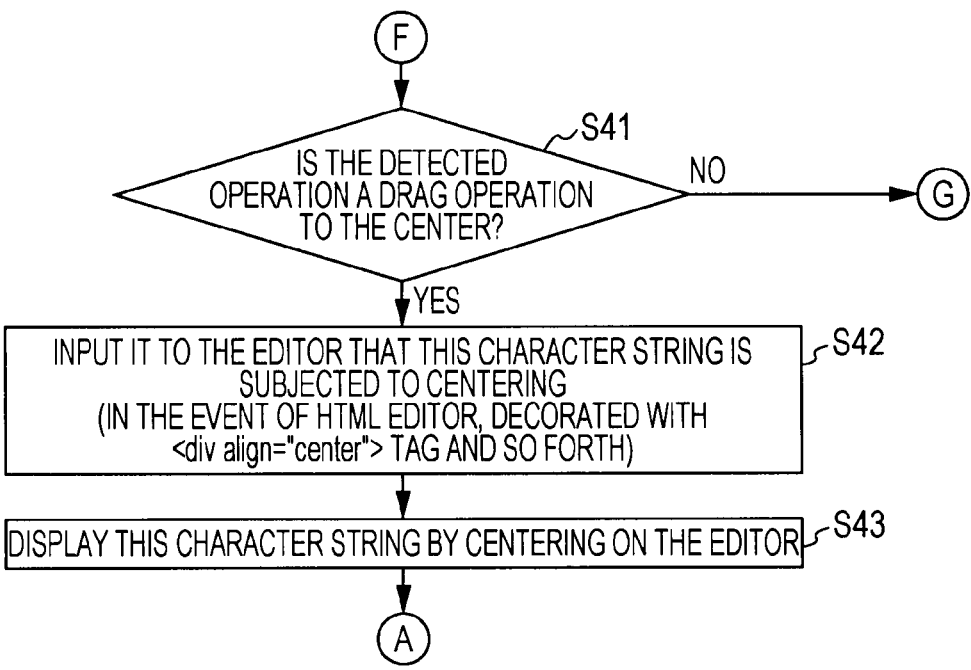
FIG. 27 is a flowchart illustrating a processing flow when the personal digital assistant according to the present embodiment displays the selected character string by centering in response to a drag operation to the center from the specified area in the object edging decoration mode at the time of the document creation and editing mode.

Also, upon proceeding to processing in step S41 in FIG. 27 after determination is made in step S31 that the gesture operation is not the drag operation to the right edge, the control and computing unit 13 determines whether or not the gesture operation detected on the specified area is the drag operation to the center set to the correlation table in the above-described FIG. 4. In the event that determination is made in the determination processing in step S41 that the detected gesture operation is the drag operation to the center, the control and computing unit 13 advances the processing to step S42, and in the event that determination is made that the detected gesture operation is not the drag operation to the center, advances the processing to step S51 in FIG. 28.

Upon proceeding to step S42 after determination is made in step S41 that the gesture operation is the drag operation to the center, the control and computing unit 13 inputs it to the editor that this selected character string 52 is subjected to centering. As an example, in the event of an HTML editor, the control and computing unit 13 decorates the selected character string 52 using the tag of <div align="center">. Note that at the time of this centering display, in the event that other characters and so forth are displayed on the left side of the selected character string 52, or other characters and so forth are displayed on the right side of the selected character string 52, the control and computing unit 13 inputs a line break for dividing the row of the selected character string 52 displayed with centering, and the other characters, to the editor.

Subsequently, as processing in step S43 the control and computing unit 13 controls the video signal processing unit 20 via the editor to display the selected character string 52 subjected to centering on the screen of the display 21 as shown in the above-described FIG. 9.

After the processing in step S43, the control and computing unit 13 returns the processing to step S4 in FIG. 23.

Figure 28:
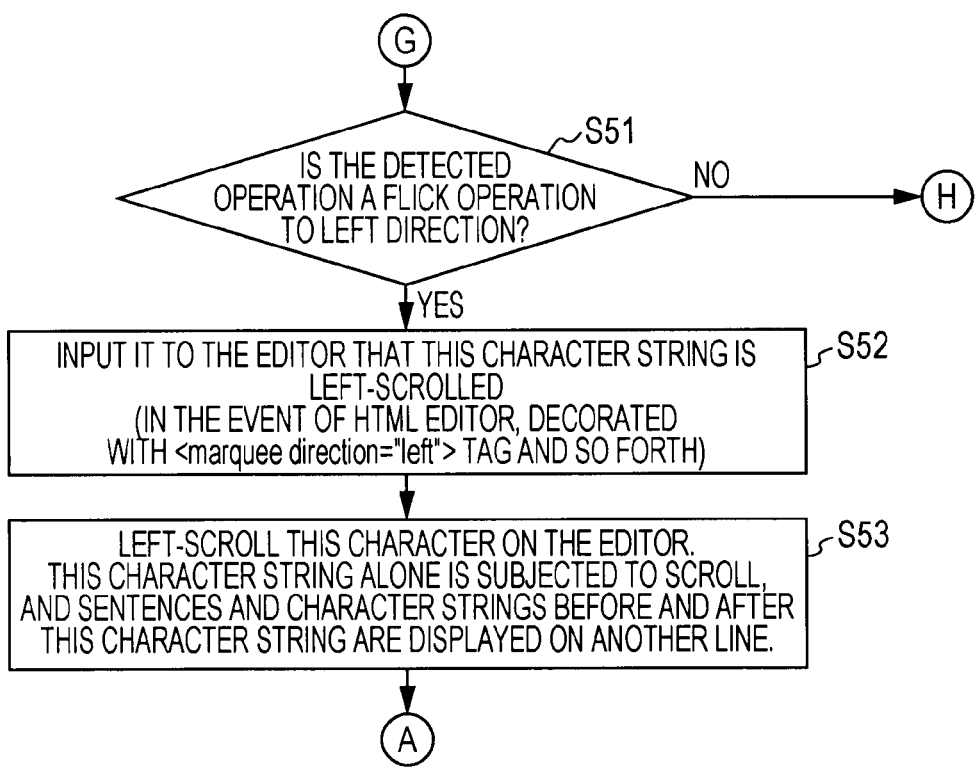
FIG. 28 is a flowchart illustrating a processing flow when the personal digital assistant according to the present embodiment displays the selected character string by left scrolling in response to a flick operation in the left direction on the specified area in the object edging decoration mode at the time of the document creation and editing mode.

Also, upon proceeding to processing in step S51 in FIG. 28 after determination is made in step S41 that the gesture operation is not the drag operation to the right edge, the control and computing unit 13 determines whether or not the gesture operation detected on the specified area is the flick operation to the left direction set to the correlation table in the above-described FIG. 4. In the event that determination is made in the determination processing in step S51 that the detected gesture operation is the flick operation to the left direction, the control and computing unit 13 advances the processing to step S52, and in the event that determination is made that the detected gesture operation is not the flick operation to the left direction, advances the processing to step S61 in FIG. 29.

Upon proceeding to step S52 after determination is made in step S51 that the gesture operation is the flick operation to the left direction, the control and computing unit 13 inputs it to the editor that this selected character string 52 is left-scrolled. As an example, in the event of an HTML editor, the control and computing unit 13 decorates the selected character string 52 using the tag of <marquee direction="left">. Note that at the time of this left-scrolled display, in the event that other characters and so forth are displayed on the left side of the selected character string 52, or other characters and so forth are displayed on the right side of the selected character string 52, the control and computing unit 13 inputs a line break for dividing the row of the selected character string 52 to be displayed with left scroll, and the other characters, to the editor, as described above.

Subsequently, as processing in step S53, the control and computing unit 13 controls the video signal processing unit 20 via the editor to display the selected character string 52 to be left-scrolled on the screen of the display 21 as shown in the above-described FIG. 10.

After the processing in step S53, the control and computing unit 13 returns the processing to step S4 in FIG. 23.

Figure 29:
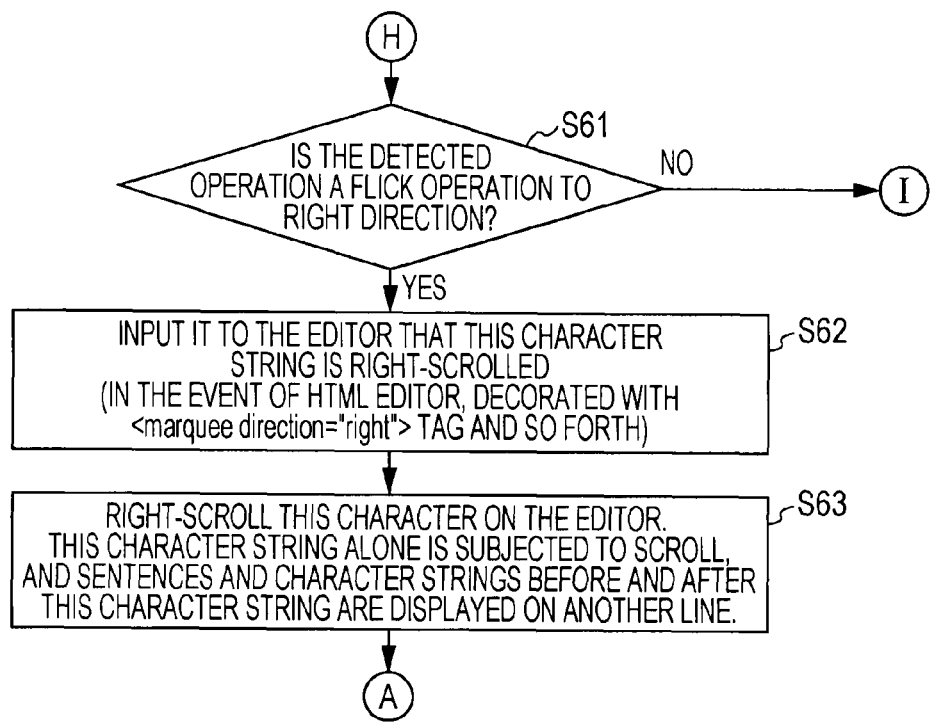
FIG. 29 is a flowchart illustrating a processing flow when the personal digital assistant according to the present embodiment displays the selected character string by right scrolling in response to a flick operation in the right direction on the specified area in the object edging decoration mode at the time of the document creation and editing mode.

Also, upon proceeding to processing in step S61 in FIG. 29 after determination is made in step S51 that the gesture operation is not the flick operation to the left direction, the control and computing unit 13 determines whether or not the gesture operation detected on the specified area is the flick operation to the right direction set to the correlation table in the above-described FIG. 4. In the event that determination is made in the determination processing in step S61 that the detected gesture operation is the flick operation to the right direction, the control and computing unit 13 advances the processing to step S62, and in the event that determination is made that the detected gesture operation is not the flick operation to the right direction, advances the processing to step S71 in FIG. 30.

Upon proceeding to step S62 after determination is made in step S61 that the gesture operation is the flick operation to the right direction, the control and computing unit 13 inputs it to the editor that this selected character string 52 is right-scrolled. As an example, in the event of an HTML editor, the control and computing unit 13 decorates the selected character string 52 using the tag of <marquee direction="right">. Note that at the time of this right-scrolled display, in the event that other characters and so forth are displayed on the left side of the selected character string 52, or other characters and so forth are displayed on the right side of the selected character string 52, the control and computing unit 13 inputs a line break for dividing the row of the selected character string 52 to be displayed with right scroll, and the other characters, to the editor.

Subsequently, as processing in step S63, the control and computing unit 13 controls the video signal processing unit 20 via the editor to display the selected character string 52 to be right-scrolled on the screen of the display 21 as shown in the above-described FIG. 11.

After the processing in step S63, the control and computing unit 13 returns the processing to step S4 in FIG. 23.

Figure 30:
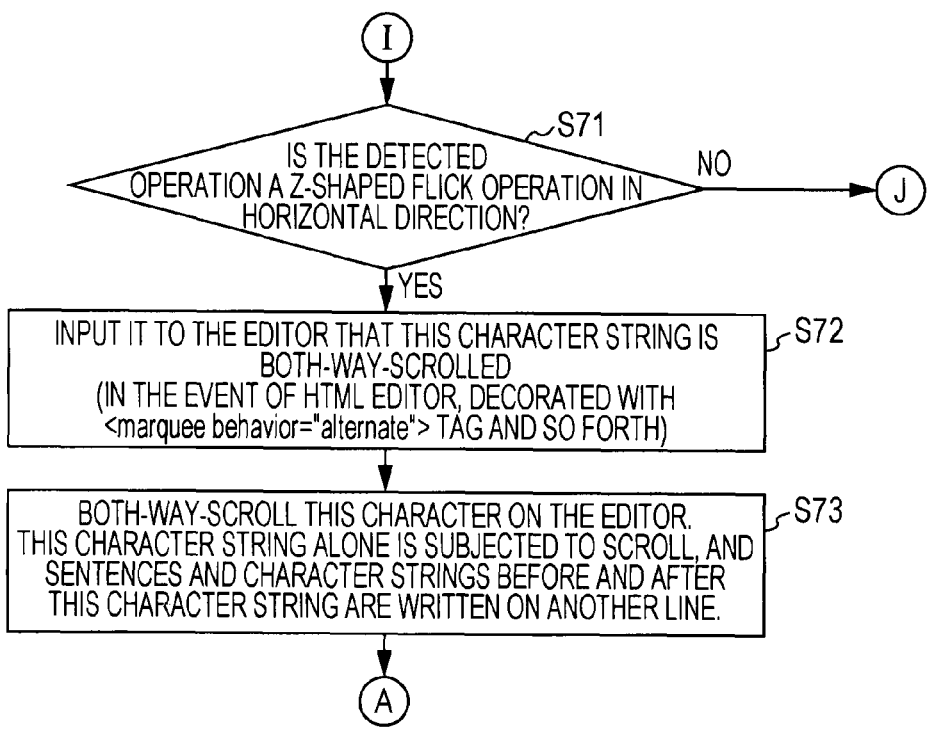
FIG. 30 is a flowchart illustrating a processing flow when the personal digital assistant according to the present embodiment displays the selected character string by both-way scrolling in response to a Z-shaped flick operation in the horizontal direction on the specified area in the object edging decoration mode at the time of the document creation and editing mode.

Also, upon proceeding to processing in step S71 in FIG. 30 after determination is made in step S61 that the gesture operation is not the flick operation to the right direction, the control and computing unit 13 determines whether or not the gesture operation detected on the specified area is the Z-shaped flick operation in the horizontal direction set to the correlation table in the above-described FIG. 4. In the event that determination is made in the determination processing in step S71 that the detected gesture operation is the Z-shaped flick operation in the horizontal direction, the control and computing unit 13 advances the processing to step S72, and in the event that determination is made that the detected gesture operation is not the Z-shaped flick operation in the horizontal direction, advances the processing to step S81 in FIG. 31.

Upon proceeding to step S72 after determination is made in step S71 that the gesture operation is the Z-shaped flick operation in the horizontal direction, the control and computing unit 13 inputs it to the editor that this selected character string 52 is both-way-scrolled. As an example, in the event of an HTML editor, the control and computing unit 13 decorates the selected character string 52 using the tag of <marquee behavior="alternate">. Note that at the time of this right-scrolled display, in the event that other characters and so forth are displayed on the left side of the selected character string 52, or other characters and so forth are displayed on the right side of the selected character string 52, the control and computing unit 13 inputs a line break for dividing the row of the selected character string 52 to be displayed with both-way scroll, and the other characters, to the editor.

Subsequently, as processing in step S73 the control and computing unit 13 controls the video signal processing unit 20 via the editor to display the selected character string 52 to be both-way-scrolled on the screen of the display 21 as shown in the above-described FIG. 12.

After the processing in step S73, the control and computing unit 13 returns the processing to step S4 in FIG. 23.

Figure 31:
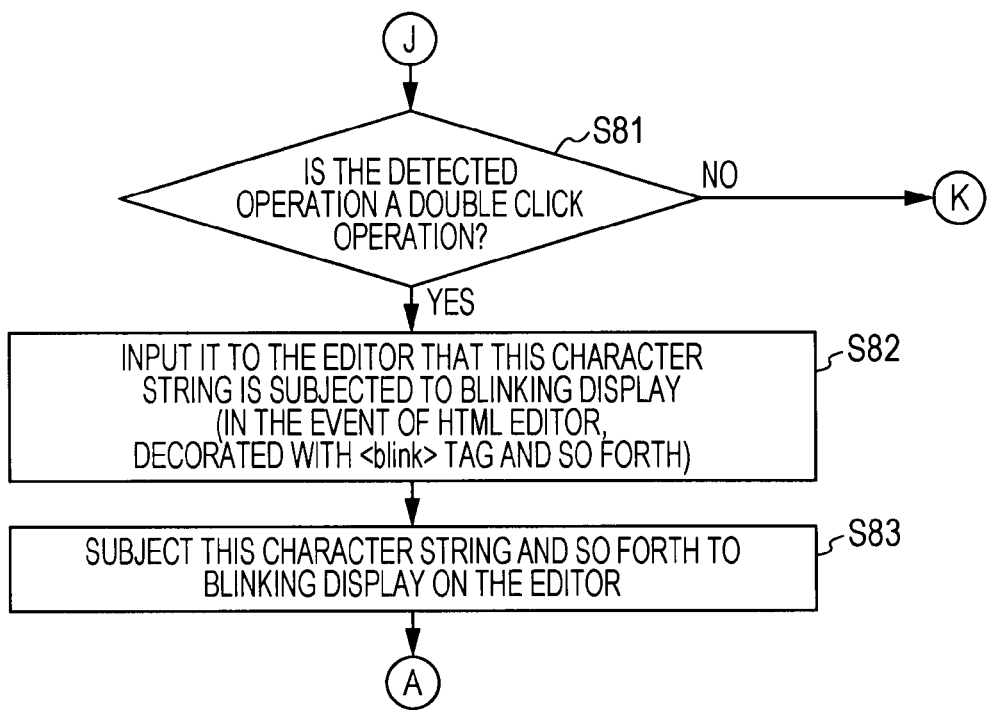
FIG. 31 is a flowchart illustrating a processing flow when the personal digital assistant according to the present embodiment displays the selected character string by blinking in response to a double click operation on the specified area in the object edging decoration mode at the time of the document creation and editing mode.

Also, upon proceeding to processing in step S81 in FIG. 31 after determination is made in step S71 that the gesture operation is not the Z-shaped flick operation in the horizontal direction, the control and computing unit 13 determines whether or not the gesture operation detected on the specified area is the double click operation set to the correlation table in the above-described FIG. 4. In the event that determination is made in the determination processing in step S81 that the detected gesture operation is the double click operation, the control and computing unit 13 advances the processing to step S82, and in the event that determination is made that the detected gesture operation is not the double click operation, advances the processing to step S91 in FIG. 32.

Upon proceeding to step S82 after determination is made in step S81 that the gesture operation is the double click operation, the control and computing unit 13 inputs it to the editor that this selected character string 52 is displayed with blinking. As an example, in the event of an HTML editor, the control and computing unit 13 decorates the selected character string 52 using the tag of <blink>.

Subsequently, as processing in step S83 the control and computing unit 13 controls the video signal processing unit 20 via the editor to display the selected character string 52 to be displayed with blinking on the screen of the display 21 as shown in the above-described FIG. 13.

After the processing in step S83, the control and computing unit 13 returns the processing to step S4 in FIG. 23.

Figure 32:
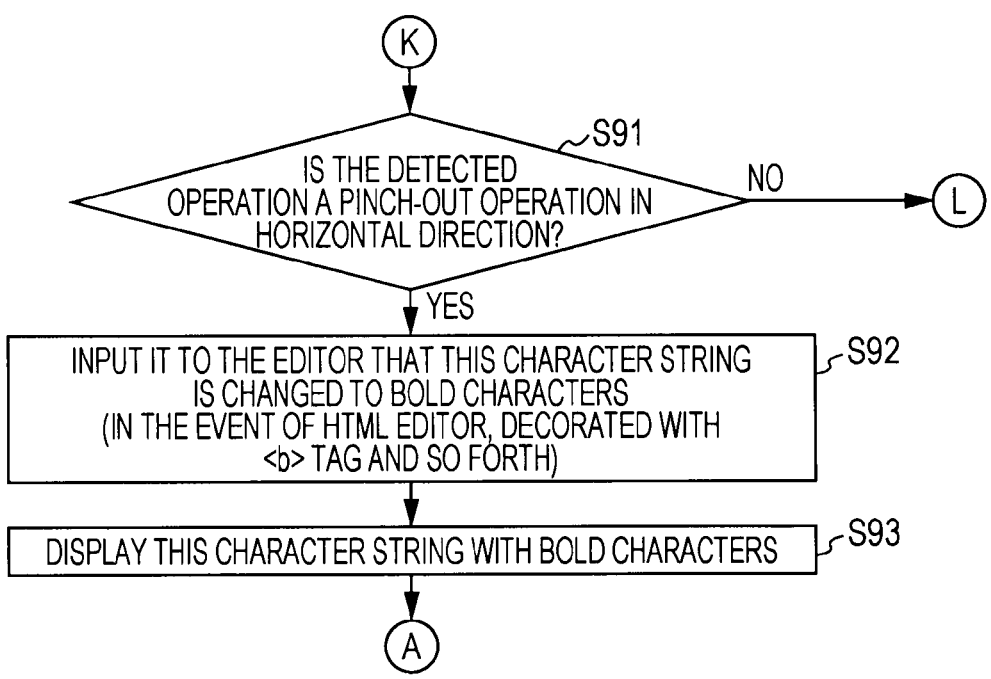
FIG. 32 is a flowchart illustrating a processing flow when the personal digital assistant according to the present embodiment displays the selected character string with bold characters in response to a pinch-in operation in the horizontal direction on the specified area in the object edging decoration mode at the time of the document creation and editing mode.

Also, upon proceeding to processing in step S91 in FIG. 32 after determination is made in step S81 that the gesture operation is not the double click operation, the control and computing unit 13 determines whether or not the gesture operation detected on the specified area is the pinch-out operation in the horizontal direction set to the correlation table in the above-described FIG. 4. In the event that determination is made in the determination processing in step S91 that the detected gesture operation is the pinch-out operation in the horizontal direction, the control and computing unit 13 advances the processing to step S92, and in the event that determination is made that the detected gesture operation is not the pinch-out operation in the horizontal direction, advances the processing to step S101 in FIG. 33.

Upon proceeding to step S92 after determination is made in step S91 that the gesture operation is the pinch-out operation in the horizontal direction, the control and computing unit 13 inputs it to the editor that this selected character string 52 is changed to bold characters. As an example, in the event of an HTML editor, the control and computing unit 13 decorates the selected character string 52 using the tag of <b>.

Subsequently, as processing in step S93 the control and computing unit 13 controls the video signal processing unit 20 via the editor to display the selected character string 52 displayed with bold characters on the screen of the display 21 as shown in the above-described FIG. 14.

After the processing in step S93, the control and computing unit 13 returns the processing to step S4 in FIG. 23.

Figure 33:
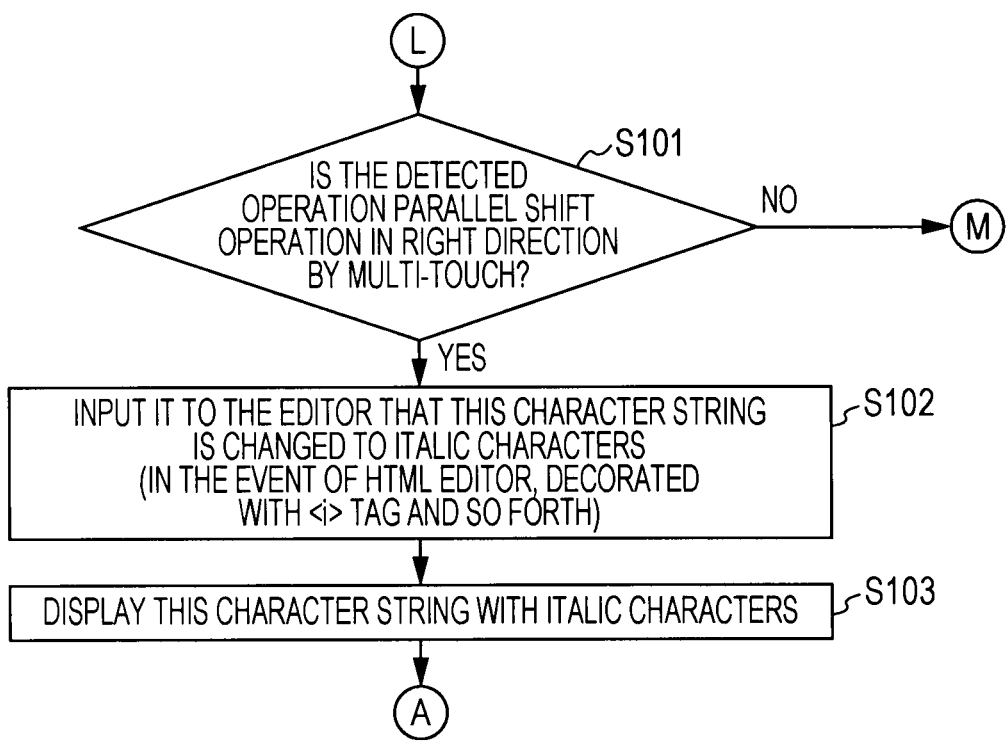
FIG. 33 is a flowchart illustrating a processing flow when the personal digital assistant according to the present embodiment displays the selected character string in italics in response to a parallel movement operation by multi-touch on the specified area in the object edging decoration mode at the time of the document creation and editing mode.

Also, upon proceeding to processing in step S101 in FIG. 33 after determination is made in step S91 that the gesture operation is not the pinch-out operation in the horizontal direction, the control and computing unit 13 determines whether or not the gesture operation detected on the specified area is the parallel movement operation in the right direction by multi-touch set to the correlation table in the above-described FIG. 4. In the event that determination is made in the determination processing in step S101 that the detected gesture operation is the parallel movement operation in the right direction by multi-touch, the control and computing unit 13 advances the processing to step S102, and in the event that determination is made that the detected gesture operation is not the parallel movement operation in the right direction by multi-touch, advances the processing to step S111 in FIG. 34.

Upon proceeding to step S102 after determination is made in step S101 that the gesture operation is the parallel movement operation in the right direction by multi-touch, the control and computing unit 13 inputs it to the editor that this selected character string 52 is changed to italics. As an example, in the event of an HTML editor, the control and computing unit 13 decorates the selected character string 52 using the tag of <i>.

Subsequently, as processing in step S103 the control and computing unit 13 controls the video signal processing unit 20 via the editor to display the selected character string 52 displayed with italics on the screen of the display 21 as shown in the above-described FIG. 15.

After the processing in step S103, the control and computing unit 13 returns the processing to step S4 in FIG. 23.

Figure 34:
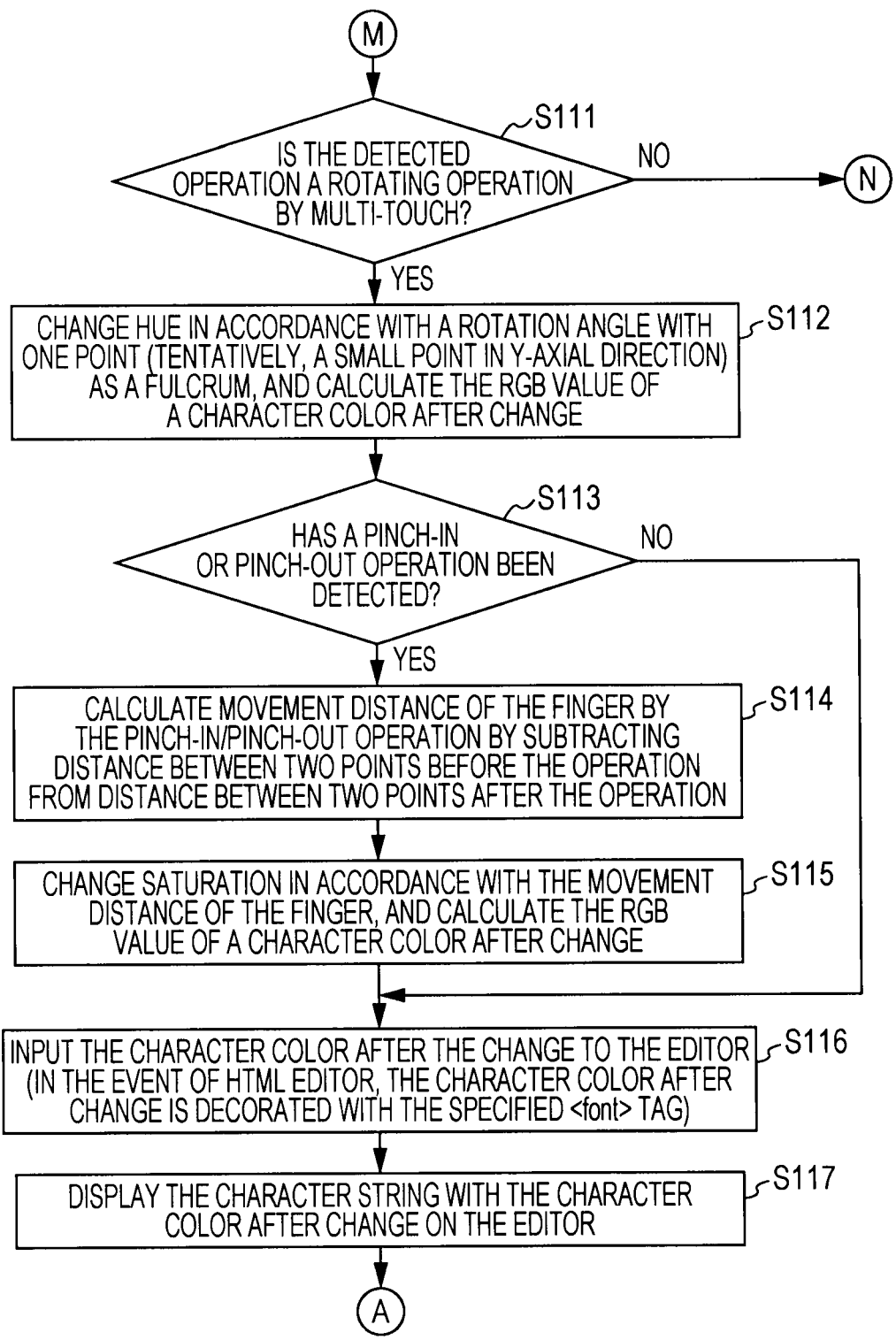
FIG. 34 is a flowchart illustrating a processing flow when the personal digital assistant according to the present embodiment changes the hue and saturation of the selected character string in response to a rotating operation by multi-touch and a pinch-in operation/pinch-out operation on the specified area in the object edging decoration mode at the time of the document creation and editing mode.

Also, upon proceeding to processing in step S111 in FIG. 34 after determination is made in step S101 that the gesture operation is not the parallel movement operation in the right direction by multi-touch, the control and computing unit 13 determines whether or not the gesture operation detected on the specified area is the rotating operation by multi-touch set to the correlation table in the above-described FIG. 4. In the event that determination is made in the determination processing in step S111 that the detected gesture operation is the rotating operation by multi-touch, the control and computing unit 13 advances the processing to step S112, and in the event that determination is made that the detected gesture operation is not the rotating operation by multi-touch, advances the processing to step S121 in FIG. 35.

Upon proceeding to processing in step S112 after determination is made in step S111 that the gesture operation is the rotating operation by multi-touch, with a circular region 60 representing the hue and saturation of the HSV space as described above, the control and computing unit 13 changes the hue of the selected character string 52 according to a rotation angle at the time of rotating the other finger with the one finger serving as the rotation center, and calculates the R, G, and B values after change thereof.

Next, as processing in step S113 the control and computing unit 13 determines whether or not the pinch-in operation or pinch-out operation has been detected on the specified area, advances the processing to step S114 in the event that the pinch-in operation or pinch-out operation has been detected, and advances the processing to step S116 in the event that neither of these has been detected.

Upon proceeding to processing in step S114 after determination is made in step S113 that the pinch-in operation or pinch-out operation has been detected, the control and computing unit 13 subtracts, from distance between two contact points on the touch panel by the two fingers after this pinch-in operation or pinch-out operation, distance between two contact points on the touch panel by the two fingers before the pinch-in operation or pinch-out operation, thereby calculating the movement distance of the two fingers by this pinch-in operation or pinch-out operation.

Next, the control and computing unit 13 advances the processing to step S115, changes the saturation of the selected character string 52 according to the movement distance of the two fingers, and calculates the R, G, and B values after change thereof. After the processing in step S115, the control and computing unit 13 advances the processing to step S116.

Upon proceeding to step S116, the control and computing unit 13 inputs the R, G, and B values (character color) of the selected character string 52 calculated in step S112 and step S115 to the editor. As an example, in the event of an HTML editor, the control and computing unit 13 decorates the selected character string 52 using the tag of <font> wherein the character color after change is specified.

Subsequently, as processing in step S117, the control and computing unit 13 controls the video signal processing unit 20 via the editor to display the selected character string 52 after the character color change on the screen of the display 21 as shown in the above-described FIG. 16.

After the processing in step S117, the control and computing unit 13 returns the processing to step S4 in FIG. 23.

Figure 35:
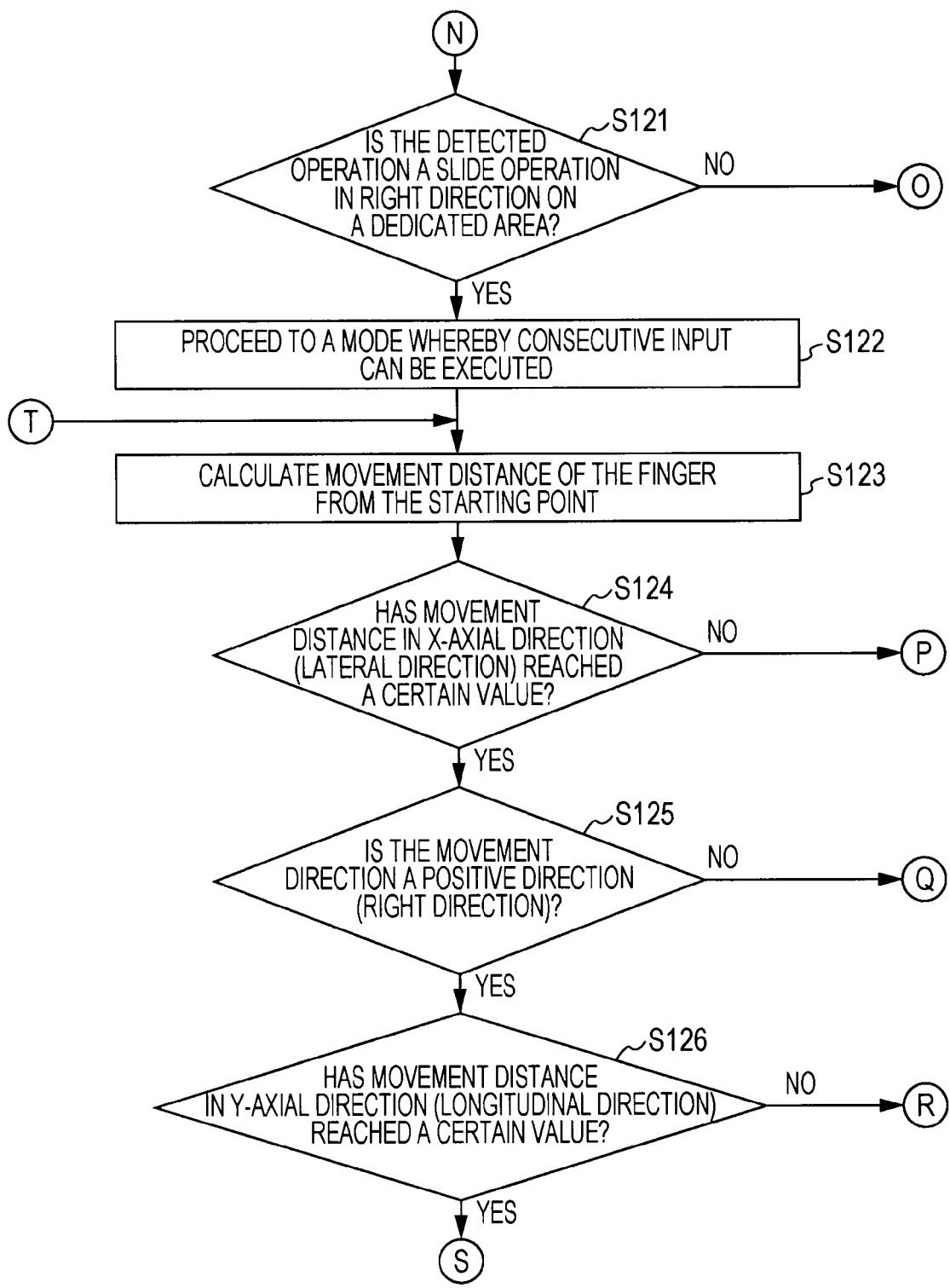
FIG. 35 is a flowchart illustrating a processing flow when the personal digital assistant according to the present embodiment detects the movement distance and movement direction of a gesture operation on the dedicated area in the object edging decoration mode at the time of the document creation and editing mode.

Also, upon proceeding to processing in step S121 in FIG. 35 after determination is made in step S111 that the gesture operation is not the rotating operation by multi-touch, the control and computing unit 13 determines whether or not the slide gesture operation in the right direction has been detected on the dedicated area 54. Upon detecting the slide gesture operation in the right direction on the dedicated area 54, the control and computing unit 13 advances the processing to step S122, and on the other hand, in the event that the slide gesture operation in the right direction has not been detected on the dedicated area 54, advances the processing to step S161 in FIG. 39.

Upon proceeding to processing in step S122 after detecting the slide gesture operation in the right direction on the dedicated area 54 in step S121, the control and computing unit 13 changes the operation mode to the object decoration editing mode whereby various types of editing and so forth based on the correlation table in the above-described FIG. 20 can be executed. After the processing in step S122, the control and computing unit 13 advances the processing to step S123.

Upon proceeding to the processing in step S123, the control and computing unit 13 calculates, at the time of a gesture operation wherein the user slides and moves a finger on the dedicated area 54, the movement distance of the finger from the starting point of the slide movement thereof, and advances the processing to the next step S124.

Upon proceeding to the processing in step S124, the control and computing unit 13 determines whether or not the movement distance of the slide movement of the finger on the dedicated area 54 has reached a certain value regarding the X-axial direction (lateral direction). In the event that determination is made in step S124 that the movement distance has not reached the certain value in the X-axial direction (lateral direction), the control and computing unit 13 advances the processing to step S133 in FIG. 36, and on the other hand, in the event that determination is made that the movement distance has reached the certain value in the X-axial direction (lateral direction), advances the processing to step S125.

Upon proceeding to the processing in step S125, the control and computing unit 13 determines whether or not the movement direction of the slide movement of the finger on the dedicated area 54 is a positive direction (right direction). In the event that determination is made in this step S125 that the movement direction is not the positive direction (right direction), the control and computing unit 13 advances the processing to step S141 in FIG. 37, and on the other hand, in the event that determination is made that the movement direction is not the positive direction (right direction), advances the processing to step S126.

Upon proceeding to the processing in step S126, the control and computing unit 13 determines whether or not the movement distance of the slide movement of the finger on the dedicated area 54 has reached a certain value regarding the Y-axial direction (longitudinal direction). In the event that determination is made in this step S126 that the movement distance has not reached the certain value in the Y-axial direction (longitudinal direction), the control and computing unit 13 advances the processing to step S131 in FIG. 36, and on the other hand, in the event that determination is made that the movement distance has not reached the certain value in the Y-axial direction (longitudinal direction), advances the processing to step S151 in FIG. 38.

Figure 36:
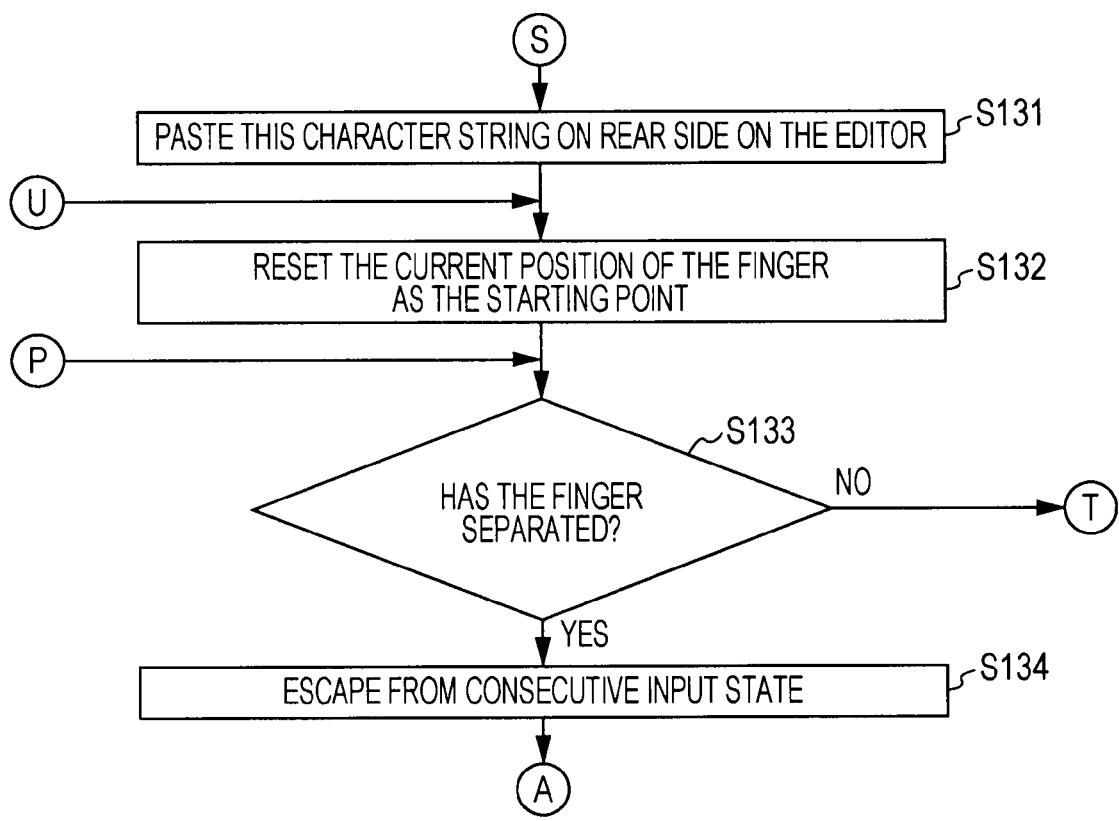
FIG. 36 is a flowchart illustrating a processing flow when the personal digital assistant according to the present embodiment copies and consecutively inputs the selected character string in response to a lateral direction (positive) operation on the dedicated area in the object edging decoration mode at the time of the document creation and editing mode.

Upon proceeding to the processing in step S131 in FIG. 36 from step S126, the control and computing unit 13 pastes, behind the selected character string 52, a character string copied from the selected character string 52 thereof using the editor.

As processing in step S132, the control and computing unit 13 resets the starting point to the current finger position, and then advances the processing to step S133.

Next, upon proceeding to the processing in step S133, the control and computing unit 13 determines whether or not the finger is separated from the dedicated area 54, and in the event that the finger is not separated, returns the processing to step S123 in FIG. 35, and on the other hand, in the event that determination is made that the finger is separated, as processing in step S134 escapes from the mode changed in step S122 to return to the previous mode, and then returns to the processing in step S4 in FIG. 23.

In this way, in the event that the processing proceeds to step S131 from step S126, determination is made in step S133 that the finger is not separated, returns to step S123, further determination is made in step S124 that the movement distance in the X-axial direction has reached the certain value, determination is made in step S125 that the movement direction is the positive direction, and determination is made in step S126 that the movement distance in the Y-axial direction has not reached the certain value, the control and computing unit 13 further pastes a character string copied from the selected character string behind the copied and pasted character string.

That is to say, the processing in step S123, step S124, step S125, step S126, step S131, and step S132 is arranged to be repeatable. In other words, in the event that a gesture operation has been performed such that the finger is slid and moved in the X-axial direction and also in the right direction on the dedicated area 54, and the movement distance at this time is equal to or greater than the certain value, and also less than the certain value in the Y-axial direction, the control and computing unit 13 copies and consecutively pastes the selected character string 52 behind the selected character string 52 by the number according to the movement distance of the finger. Thus, as shown in the above-described FIG. 22, a sentence where the selected character string 52 is consecutively input is displayed within the character display area 51 of the display screen 50.

Figure 37:
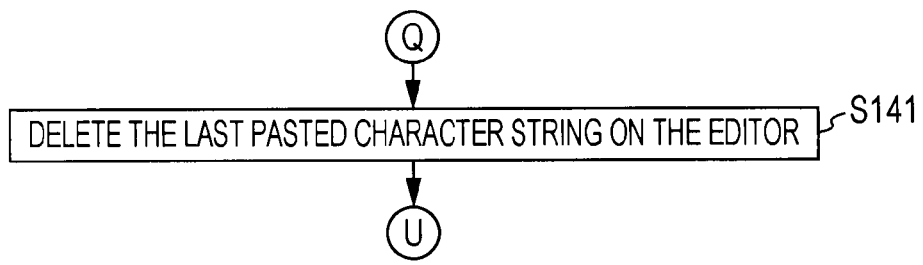
FIG. 37 is a flowchart illustrating a processing flow when the personal digital assistant according to the present embodiment deletes the last pasted character string in response to a lateral direction (negative) operation on the dedicated area in the object edging decoration mode at the time of the document creation and editing mode.

Also, in the event of determining in step S125 that the movement direction is not the positive direction (right direction), and proceeding to the processing in step S141 in FIG. 37, the control and computing unit 13 deletes the character string last pasted behind the selected character string 52.

Subsequently, the control and computing unit 13 advances the processing to step S132 in FIG. 36.

In this way, in the event that the processing proceeds to step S141 from step S125, determination is made in step S133 that the finger is not separated, returns to step S123, further determination is made in step S124 that the movement distance in the X-axial direction has reached the certain value, determination is made in S125 that the movement direction is not the positive direction (determined to be the negative direction), and the processing proceeds to step S141, the control and computing unit 13 further deletes the copied and pasted character string.

That is to say, the processing in step S123, step S124, step S125, step S141, and step S132 is arranged to be repeatable. In other words, in the event that a gesture operation has been performed such that the finger is slid and moved in the X-axial direction and also in the left direction on the dedicated area 54, the control and computing unit 13 deletes, when there are the copied and consecutively input selected character strings 52 behind the selected character string 52, the copied and consecutively input selected character strings 52 are deleted by a number according to the movement distance of the finger. Thus, previously consecutively input selected character strings 52 are successively deleted within the character display area 51 of the display screen 50.

Figure 38:
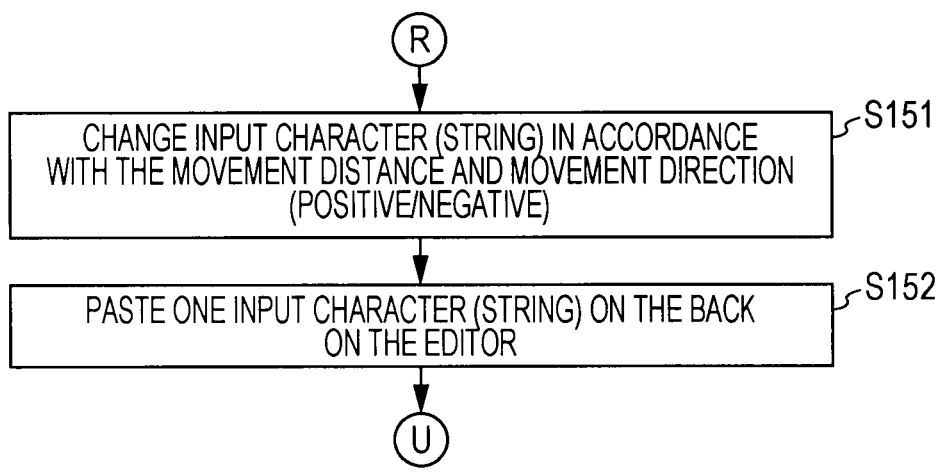
FIG. 38 is a flowchart illustrating a processing flow when the personal digital assistant according to the present embodiment changes a character to be input in response to the movement distance and movement direction of a gesture operation on the dedicated area in the object edging decoration mode at the time of the document creation and editing mode.

Also, in the event of determining in step S126 that the movement distance has reached the certain value in the Y-axial direction, and proceeding to the processing in step S151 in FIG. 38, the control and computing unit 13 changes the character string or the like to be pasted behind the selected character string 52 according to the character type at that time, and the movement distance and direction (positive direction or negative direction). Specifically, in the case of this step S151, the control and computing unit 13 changes the character string or the like to be pasted behind the selected character string 52 depending on whether the gesture operation as to the dedicated area 54 is, as shown in the correlation table in FIG. 20, any one of the vertical direction operation or upper-right direction operation in the event that the character type is alphabetic, the upper-right direction operation in the event that the character type is characters or symbols or the like, and the upper-right direction operation in the event that the character type is numeric.

Next, as processing in step S152 the control and computing unit 13 pastes the character string or the like changed according to the character type or the movement distance and direction behind the selected character string 52 using the editor.

Subsequently, the control and computing unit 13 advances the processing to step S132 in FIG. 36.

In this way, in the event that the processing proceeds to step S151 from step S126, determination is made in step S133 that the finger is not separated, returns to step S123, further determination is made in step S124 that the movement distance in the X-axial direction has reached the certain value, determination is made in S125 that the movement direction is not the positive direction, and determination is made in step S126 that the movement distance in the Y-axial direction has reached the certain value, the control and computing unit 13 further pastes the character string or the like changed according to the character type, or the movement distance and direction behind the changed and pasted character string or the like.

That is to say, the processing in step S123, step S124, step S125, step S126, step S151, step S152, and step S132 is arranged to be repeatable. In other words, in the event that a gesture operation has been performed such that the finger is slid and moved in the X-axial direction and also in the right direction on the dedicated area 54, and the movement distance at this time is equal to or greater than the certain value in the X-axial direction, and also equal to or greater than the certain value in the Y-axial direction, and further, the character type at this time and the gesture operation are set to the correlation table in FIG. 20, the control and computing unit 13 consecutively pastes the character string or the like changed according to the character type, and the movement distance or direction of the gesture operation behind the selected character string 52. Thus, a sentence where the changed character string or the like are consecutively input, or the like is displayed within the character display area 51 of the display screen 50.

Note that, describing in a more specific manner with reference to the example in FIG. 20, for example, in the event that the character type is alphabetic, and the gesture operation is the vertical operation, the control and computing unit 13 consecutively pastes character strings changed to capital characters or small characters according to the movement in the vertical direction of the gesture operation. Also, for example, in the event that the character type is characters or symbols or the like, and the gesture operation is the upper-right direction operation, the control and computing unit 13 consecutively pastes character strings where the sizes of the characters or symbols or the like have been changed (increased) according to the movement in the upper-right direction of the gesture operation. Also, for example, in the event that the character type is symbolic, and the gesture operation is the vertical direction operation, the control and computing unit 13 consecutively pastes symbols while changing the symbols themselves according to the movement in the vertical direction of the gesture operation. Also, for example, in the event that the character type is alphabetic, and the gesture operation is the upper-right direction operation, the control and computing unit 13 consecutively pastes alphabetic characters while changing the alphabetic characters in the alphabetic order according to the movement in the upper-right direction of the gesture operation. Also, for example, in the event that the character type is numeric, and the gesture operation is the upper-right direction operation, the control and computing unit 13 consecutively pastes numeric characters while changing the numeric characters in the ascending order according to the movement in the upper-right direction of the gesture operation.

Figure 39:
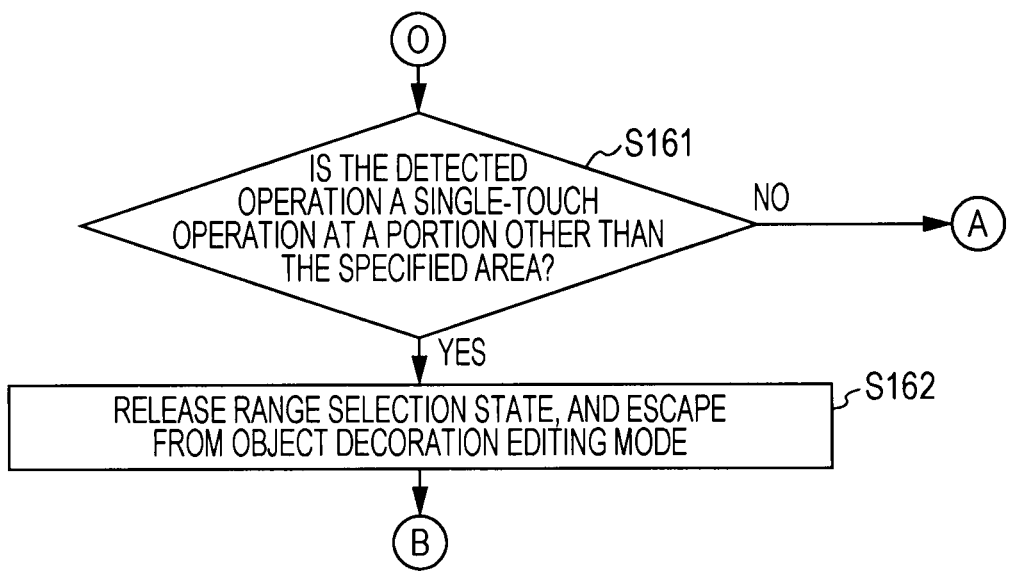
FIG. 39 is a flowchart illustrating a processing flow when the personal digital assistant according to the present embodiment releases the range selection of a character string and returns to the normal document creation and editing mode in response to a single-touch operation on an area other than the specified area and the dedicated area in the object edging decoration mode at the time of the document creation and editing mode.

Also, in step S121 in FIG. 35, the slide gesture operation in the right direction has not been detected on the dedicated area, and accordingly, in the event of proceeding to the processing in step S161 in FIG. 39, the control and computing unit 13 determines whether or not the single touch operation as to an area other than the specified area nor the dedicated area has been detected. In the event that determination is made in step S161 that the single touch operation has not been detected, the control and computing unit 13 returns the processing to step S4 in FIG. 23. On the other hand, in the event that the single touch operation has been detected, the control and computing unit 13 advances the processing to step S162.

Upon proceeding to the processing in step S162, the control and computing unit 13 releases the range selection state of the selected character string 52, and also returns the operation mode of this terminal from the object decoration editing mode to the normal sentence creation and editing mode.

After the processing in step S162, the control and computing unit 13 returns the processing to step S2 in FIG. 23.

[Decoration Editing Control Operation Example as to Selected Object at Time of Image Editing]

The personal digital assistant according to the present embodiment enables the user's desired selected object on the display screen to be subjected to decoration according to the user's operations or editing or the like as to the touch panel, for example, by cooperating with an image editor.

Hereafter, description will be made regarding operation at the time of taking an image portion that the user has selected out of images displayed on the display as the selected object, and subjecting the selected object thereof to the user's desired decoration, editing, or the like in the event that the personal digital assistant according to the present embodiment is in the image editing mode by an image editor being activated, with reference to FIG. 40 through FIG. 53.

Figure 40:
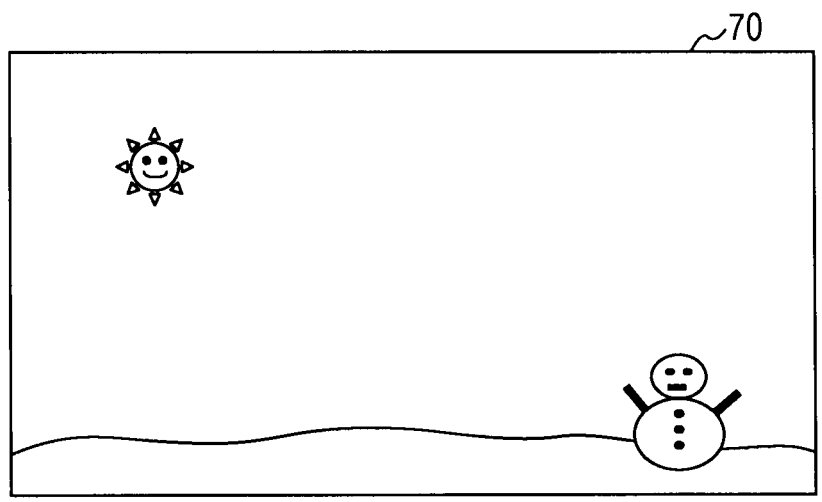
FIG. 40 is a diagram giving an example wherein the personal digital assistant according to the present embodiment is in an image editing mode, an image is displayed on the image display area of the display screen, and the image thereof is in an editable state.

In the event that the personal digital assistant according to the present embodiment is in the image editing mode, as shown in FIG. 40, let us say that an image is displayed on the image display area 70 of the display screen 50, and the image is in an editable state by the image editor. Note that this image may be any kind of image such as an image where the actual world or the like is taken by a digital camera, an image generated by computer graphics software or the like, an image making up a screen generated by browser software or the like.

Figure 41:
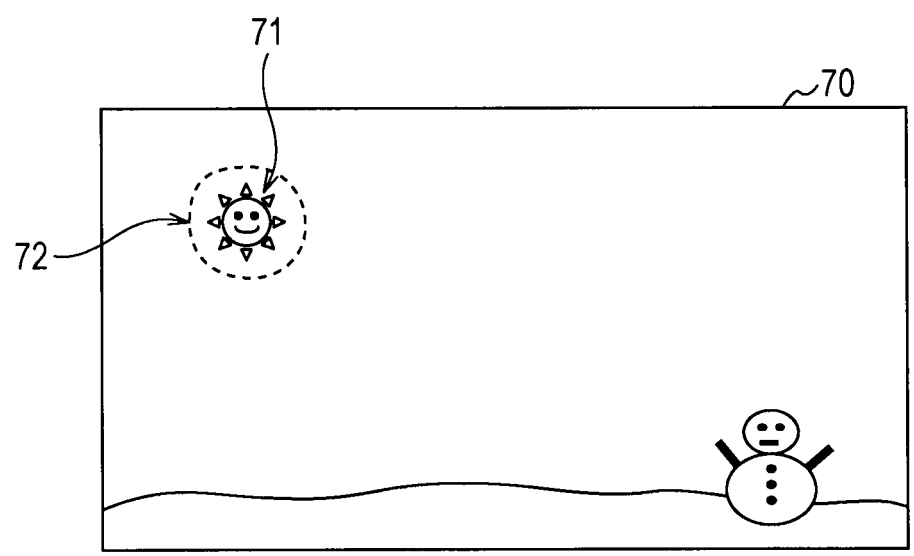
FIG. 41 is a diagram illustrating a state in which the user has selected a desired image part from an image on the image display area of the display screen at the personal digital assistant according to the present embodiment, whereby this desired image part has been taken as a selected image part.

With the present embodiment, in a state in which an image such as FIG. 40 is displayed, for example, as shown in FIG. 41, let us say that the user has performed a gesture operation for moving a finger in a state in contact on the touch panel so as to surround a desired image part 71 out this image.

At this time, the personal digital assistant according to the present embodiment takes an area surrounded with the movement path of the finger as a range selection area 72 by the user, and the image part 71 (hereafter, referred to as selected image part 71 as appropriate) within the range selection area 72 thereof is recognized as the selected object. Also, the personal digital assistant at this time changes the operation mode of the own terminal to the object decoration editing mode according to the present embodiment in the image editing mode.

The personal digital assistant which has changed to the object decoration editing mode at the time of this image editing mode sets the area of the selected image part 72 and an adjacent area thereof as a specified area. Note that, of this specified area, the adjacent area may be a predetermined area having a fixed size with the area of the selected image part 72 as the center, an area in the place and with the size determined by this terminal, or an area in the place and with the size arbitrarily determined by the user. Also, the personal digital assistant at this time correlates a gesture operation as to the touch panel on the specified area with decoration content such as shown in the correlation table in FIG. 42, for example.

Specifically, the correlation table shown in FIG. 42 represents, in the object decoration editing mode at the time of this image editing mode, correlation between a gesture operation that the personal digital assistant according to the present embodiment can detect in the specified area, a gesture operation that the personal digital assistant according to the present embodiment can detect as a gesture operation beginning from the specified area, and decoration content to be subjected as to the selected object (selected image part 72) when these gesture operations are performed. Note that this correlation table in FIG. 42 may be loaded to the RAM of the memory unit 14 by activation of the information processing control program according to the present embodiment for example, may be prepared on the rewritable ROM of the memory unit 14 separately from the information processing control program, or may be prepared in a server or the like on a predetermined network on the Internet and obtained by the personal digital assistant according to the present embodiment as appropriate for example.

With this correlation table shown in FIG. 42, "PINCH-IN OPERATION" is a gesture operation wherein in a state in which, with the specified area, two fingers are in contact with on the touch panel, and the two fingers are moved in a direction where distance between the two fingers is narrowed down. In the event that this pinch-in operation has been detected on the specified area after transition has been made to the object decoration editing mode, the personal digital assistant according to the present embodiment reduces the size of the selected image part 72 by a reduction ratio corresponding to the movement distance of the two fingers according to this pinch-in operation.

Note that the movement distance of the two fingers by the pinch-in operation can be obtained by subtracting the distance between the two contact points on the touch panel before the pinch-in operation from the distance between the two contact points on the touch panel after the pinch-in operation. Also, the reduction ratio of the selected image part 71 can be calculated as a value for decreasing the size of the original selected image part 71 by a percentage proportional to the movement distance of the two fingers according to the pinch-in operation.

Subsequently, the personal digital assistant according to the present embodiment causes the image editor to reduce the size of the selected image part 71 using the reduction ratio, and to paste on the image display area 70 so as to match the center position of a reduced selected image part 71a thereof, and the center of the position where the original selected image part 70 was displayed. Thus, the image displayed within the image display area 70 as shown in FIG. 41 becomes an image obtained by reducing the selected image part 71 (71a) using the reduction ratio according to the movement distance of the two fingers by the pinch-in operation as shown in FIG. 43.

Note that in the event that the display image on the image display area 70 is an image actually taken by a digital camera for example instead of an image wherein a background image and each image object are configured as layer configurations and are synthesized, such as a synthetic image by computer graphics software for example, at the time of pasting the reduced selected image part 71a on the image display area 70, it is desirable to interpolate the background image around the selected image part 71a thereof. Specifically, the original selected image part 71 and this reduced selected image part 71 differs in size, and accordingly, upon the reduced selected image part 71a being pasted on the position where the original selected image part 71 is displayed without change, there may be generated an area including no image around the reduced selected image part 71a due to size difference of these. Accordingly, at the time of pasting the reduced selected image part 71a on the image display area 70, in the event that an area including no image occurs around the reduced selected image part 71a, it is desirable to dispose an image interpolated based on a peripheral image regarding the area thereof.

Also, with this correlation table shown in FIG. 42, "PINCH-OUT OPERATION" is a gesture operation wherein in a state in which, with the specified area, two fingers are in contact with on the touch panel, and the two fingers are moved in a direction where distance between the two fingers is widened. In the event that this pinch-out operation has been detected on the specified area after transition has been made to the object decoration editing mode, the personal digital assistant according to the present embodiment increases the size of the selected image part 72 by a scale of enlargement corresponding to the movement distance of the two fingers according to this pinch-out operation.

Note that the movement distance of the two fingers by the pinch-out operation can be obtained by subtracting the distance between the two contact points on the touch panel before the pinch-out operation from the distance between the two contact points on the touch panel after the pinch-out operation. Also, the scale of enlargement of the selected image part 71 can be calculated as a value for increasing the size of the original selected image part 71 by a percentage proportional to the movement distance of the two fingers according to the pinch-out operation.

Figure 44:
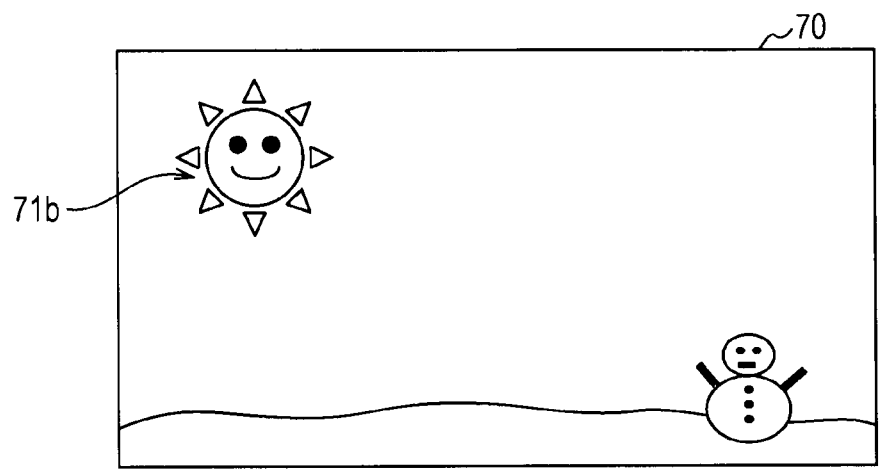
FIG. 44 is a diagram illustrating a state in which, in the object edging decoration mode at the time of the image editing mode, a pinch-out operation has been performed on the specified area, whereby the selected image part within the image display area has been displayed with enlargement.

Subsequently, the personal digital assistant according to the present embodiment causes the image editor to enlarge the size of the selected image part 71 using the scale of enlargement, and to paste on the image display area 70 so as to match the center position of an enlarged selected image part 71b thereof, and the center of the position where the original selected image part 70 was displayed. Thus, the image displayed within the image display area 70 as shown in FIG. 41 becomes an image obtained by enlarging the selected image part 71 (71b) using the scale of enlargement according to the movement distance of the two fingers by the pinch-out operation as shown in FIG. 44.

Also, with this correlation table shown in FIG. 42, "DRAG OPERATION" is taken as a gesture operation wherein in a state in which one finger is in contact with on the touch panel, and the finger is moved in the user's desired direction by the user's desired distance, and then this finger is stopped on or separated from the touch panel at the user's desired position. In the event that after transition has been made to the object decoration editing mode, this drag operation has been detected on the specified area such that the user's finger starts contact within the specified area and the finger thereof moves to the user's desired position, the personal digital assistant according to the present embodiment copies the selected image part 71 and pastes on the position where the finger has been stopped or separated by the drag operation.

Figure 45:
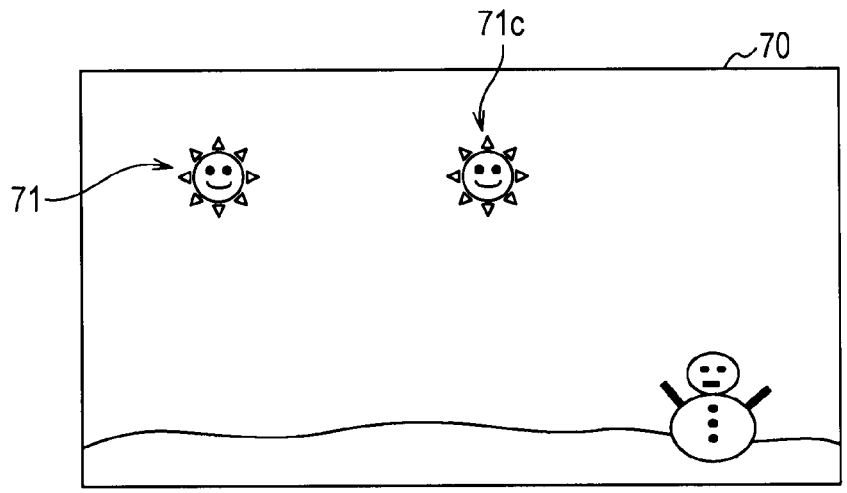
FIG. 45 is a diagram illustrating a state in which, in the object edging decoration mode at the time of the image editing mode, a drag operation has been performed on the specified area, whereby the selected image part within the image display area has been displayed with copy.

Thus, the image displayed within the image display area 70 as shown in FIG. 41 becomes, as shown in FIG. 45, an image made up of the original selected image part 71, and the selected image part 71c copied on the position after the drag operation. Note that in the event that the drag operation has been performed, the selected image part 71 may be moved to the position after the drag operation instead of pasting the copied selected image part 71c, as shown in the example in FIG. 45. In the event of moving the selected image part 71 in this way, it is desirable to dispose a background image or the like on the original area where this selected image part 71 was displayed, for example, using interpolation or the like.

Also, with this correlation table shown in FIG. 42, "ROTATING OPERATION BY MULTI-TOUCH AND PINCH-IN OPERATION/PINCH-OUT OPERATION" is taken as a gesture operation combined, in a state in which two fingers are in contact with on the touch panel, from an operation such that one finger is taken as the rotation center, and the other finger is rotated and moved, and an operation such that distance between the one finger serving as the rotation center and the other finger which rotates and moves is changed. In the event that the rotating operation by multi-touch has been detected on the specified area after transition has been made to the object decoration editing mode, the personal digital assistant according to the present embodiment sets the hue of the selected image part 71 to a value according to the rotation angle of the rotating operation. Also, in the event that the pinch-in operation or pinch-out operation has been detected along with the detection of the rotating operation, the personal digital assistant according to the present embodiment sets the saturation of the selected image part 71 according to the movement distance of the two fingers by the pinch-in operation or pinch-out operation.

Figure 46:
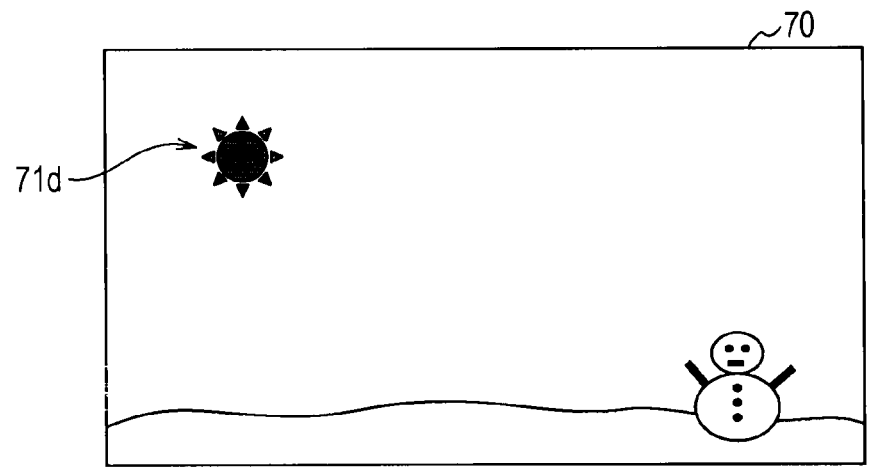
FIG. 46 is a diagram illustrating a state in which, in the object edging decoration mode at the time of the image editing mode, a rotating operation by multi-touch and a pinch-in operation/pinch-out operation have been performed on the specified area, whereby the hue and saturation of the selected image part within the image display area have been changed.

Thus, the image displayed within the image display area 70 as shown in FIG. 41 is, as shown in FIG. 46, an image where the selected image part 71 alone is set to the hue according to the rotation angle by the rotating operation, and also set to the saturation according to the movement distance of the two fingers by the pinch-in or pinch-out operation. Note that, with this example, the hue according to the rotation angle, and the saturation according to the movement distance of the two fingers can be obtained, in the same way as described above in FIG. 17 through FIG. 19, using the circular region 60 representing the hue and saturation in the HSV space.

With the correlation table in FIG. 42, "SINGLE-TOUCH OPERATION AT A PORTION OTHER THAN THE SPECIFIED AREA" is taken as a gesture operation such that, with an area other than the specified area, one finger is in contact with on the touch panel only for a short time, and immediately separated therefrom, for example. In the event that the single touch operation has been detected on an area other than the specified area after transition has been made to the object decoration editing mode, the personal digital assistant according to the present embodiment releases the range selection of the selected image part 71, and also returns the operation mode of this terminal from the object decoration editing mode to the normal image editing mode.

[Processing Flow at Time of Image Editing Execution by Information Processing Control Program According to Present Embodiment]

Hereafter, description will be made regarding a flowchart at the time of the personal digital assistant according to the present embodiment executing the information processing control program to perform processing such as decoration or editing or the like of a selected image part, as described above. The information processing control program according to the present embodiment may be prepared at the time of factory shipment of the personal digital assistant, or may be separately obtained via the radio communication, external input/output terminal, or various types of storage medium such as external memory, disc-form recording medium, and so forth.

FIG. 47 through FIG. 51 illustrate a processing flow at the time of the control and computing unit 13 of the personal digital assistant according to the present embodiment executing the information processing control program according to the present embodiment. Note that the information processing control program in this case may be activated according to instructions from the user, or may automatically be activated according to activation of an image editor.

Figure 47:
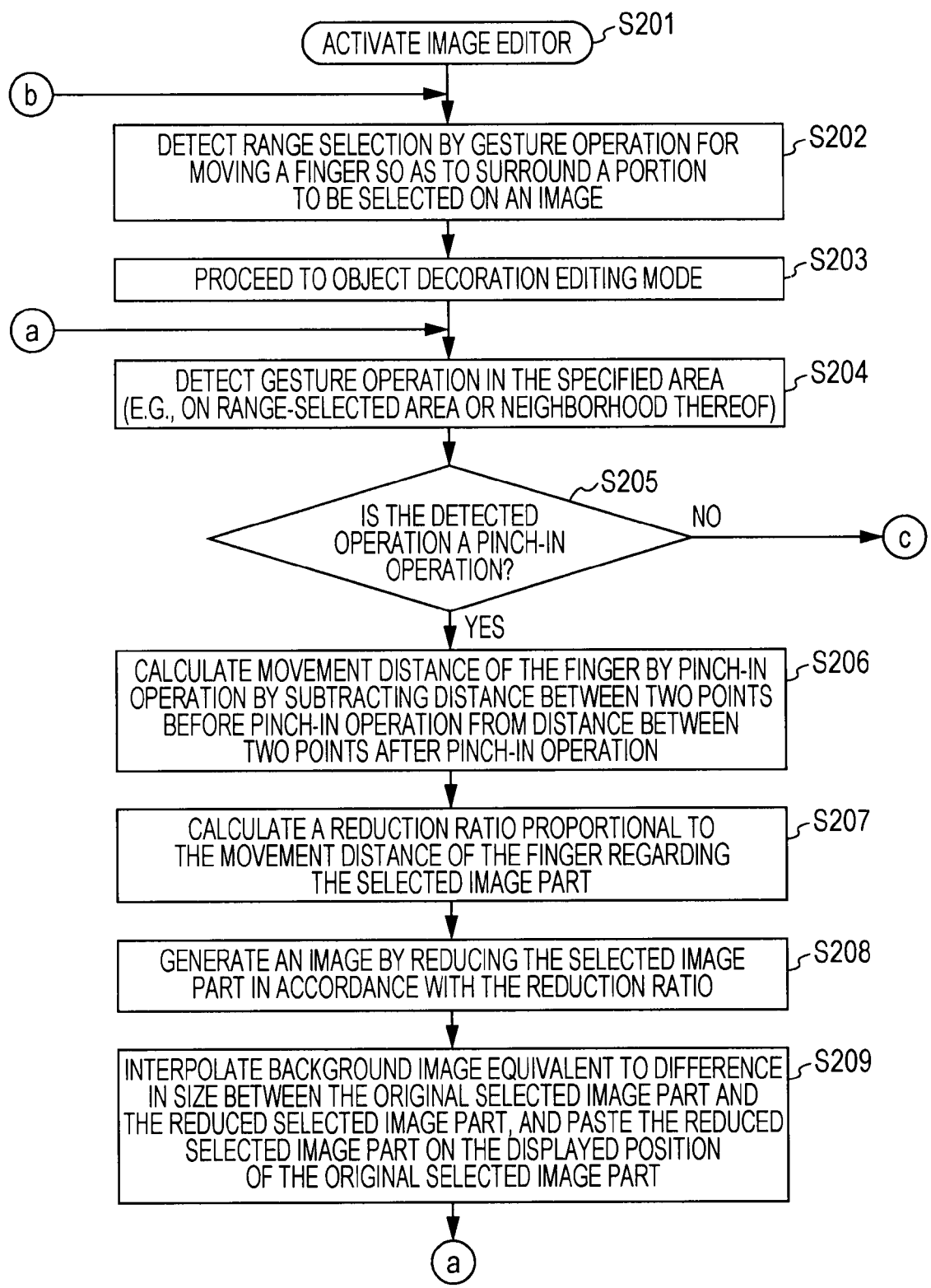
FIG. 47 is a flowchart illustrating a processing flow when the personal digital assistant according to the present embodiment displays the selected image part with reduction in response to a pinch-in operation on the specified area in the object edging decoration mode at the time of the image editing mode.

With the flowchart in FIG. 47, let us say that as step S201 the personal digital assistant according to the present embodiment has already activated the above-described image editor, and is in the image editing mode.

In the event that the image editing mode has been set, as step S202 upon detecting that a user's desired area within an image on the image display area 70 has been selected as shown in the above-described FIG. 41 by range selection through a gesture operation such as surrounding the desired image part 71 on the touch panel 30, the control and computing unit 13 advances the processing to processing in step S203.

Upon proceeding to the processing in step S203, the control and computing unit 13 changes the operation mode of this terminal to the object decoration editing mode in the image editing mode.

Upon proceeding to the object decoration editing mode, the control and computing unit 13 sets the selected image part 71 according to the range selection, and an adjacent area thereof on the touch panel 30 as the above-described specified area. The control and computing unit 13 then sets the specified area on the touch panel 30 as an area for detecting each gesture operation described in the correlation table in the above-described FIG. 42, and becomes an input waiting state of a gesture operation as to this specified area by the user.

Next, upon detecting a gesture operation on the specified area, as processing in step S205 the control and computing unit 13 determines whether or not the gesture operation thereof is the pinch-in operation set to the correlation table in the above-described FIG. 42. In the event that determination is made in the determination processing in step S205 that the gesture operation is the pinch-in operation, the control and computing unit 13 advances the processing to step S206, and in the event that determination is made that the gesture operation is not the pinch-in operation, advances the processing to step S211 in FIG. 48.

Upon proceeding to step S206 after determination is made in step S205 that the gesture operation is the pinch-in operation, the control and computing unit 13 subtracts distance between two contact points on the touch panel by two fingers before this pinch-in operation from distance between the two contact points on the touch panel by the two fingers after this pinch-in operation, thereby calculating the movement distance of the two fingers by this pinch-in operation.

Next, the control and computing unit 13 advances the processing to step S207, and calculates a reduction ratio proportional to the movement distance of the two fingers by the pinch-in operation.

Further, as processing in step S208, the control and computing unit 13 generates a selected image part 71a obtained by reducing the selected image part 71 according to the reduction ratio through the image editor.

Subsequently, as processing in step S209 the control and computing unit 13 displays the selected image part 71a after the reduction on the image display area 70 through the image editor. Note that, at this time, in the event that interpolation of a background image and so forth is necessary as described above, the control and computing unit 13 also performs this interpolation processing.

After the processing in step S209, the control and computing unit 13 returns the processing to step S204.

Also, upon proceeding to processing in step S211 in FIG. 48 after determination is made in step S205 that the gesture operation is not the pinch-in operation, the control and computing unit 13 determines whether or not the gesture operation detected on the specified area is the pinch-out operation set to the correlation table in the above-described FIG. 42. In the event that determination is made in the determination processing in step S211 that the detected gesture operation is the pinch-out operation, the control and computing unit 13 advances the processing to step S212, and in the event that determination is made that the detected gesture operation is not the pinch-out operation, advances the processing to step S221 in FIG. 49.

Upon proceeding to step S212 after determination is made that the detected gesture is the pinch-out operation in step S211, the control and computing unit 13 subtracts distance between two contact points on the touch panel by two fingers before this pinch-out operation from distance between the two contact points on the touch panel by the two fingers after this pinch-out operation, thereby calculating the movement distance of the two fingers by this pinch-out operation.

Next, the control and computing unit 13 advances the processing to step S213, and calculates a scale of enlargement proportional to the movement distance of the two fingers by the pinch-out operation.

Further, as processing in step S214, the control and computing unit 13 generates a selected image part 71b obtained by enlarging the selected image part 71 according to the scale of enlargement through the image editor.

Subsequently, as processing in step S215 the control and computing unit 13 displays the selected image part 71b after the enlargement on the image display area 70 through the image editor.

After the processing in step S214, the control and computing unit 13 returns the processing to step S204 in FIG. 47.

Also, upon proceeding to processing in step S221 in FIG. 49 after determination is made in step S211 that the gesture operation is not the pinch-out operation, the control and computing unit 13 determines whether or not the gesture operation detected on the specified area is the drag operation set to the correlation table in the above-described FIG. 42. In the event that determination is made in the determination processing in step S221 that the detected gesture operation is the drag operation, the control and computing unit 13 advances the processing to step S222, and in the event that determination is made that the detected gesture operation is not the drag operation, advances the processing to step S231 in FIG. 50.

Upon proceeding to processing in step S222 after determination is made in step S221 that the gesture operation is the drag operation, the control and computing unit 13 copies (or moves) the selected image part 71c to the position where the finger after this drag operation has been stopped or separated.

After this processing in step S222, the control and computing unit 13 returns the processing to step S204 in FIG. 47.

Also, upon proceeding to processing in step S231 in FIG. 50 after determination is made in step S221 that the gesture operation is not the drag operation, the control and computing unit 13 determines whether or not the gesture operation detected on the specified area is the rotating operation by multi-touch set to the correlation table in the above-described FIG. 42. In the event that determination is made in the determination processing in step S231 that the detected gesture operation is the rotating operation by multi-touch, the control and computing unit 13 advances the processing to step S232, and in the event that determination is made that the detected gesture operation is not the rotating operation by multi-touch, advances the processing to step S241 in FIG. 51.

Upon proceeding to processing in step S232 after determination is made in step S231 that the gesture operation is the rotating operation by multi-touch, with the circular region 60 representing the hue and saturation of the HSV space as described above, the control and computing unit 13 changes the hue of the selected image part 71 according to a rotation angle at the time of rotating the other finger with the one finger serving as the rotation center, and calculates the R, G, and B values after change thereof.

Next, as processing in step S233 the control and computing unit 13 determines whether or not the pinch-in operation or pinch-out operation has been detected on the specified area, advances the processing to step S234 in the event that the pinch-in operation or pinch-out operation has been detected, and advances the processing to step S236 in the event that neither of these has been detected.

Upon proceeding to processing in step S234 after determination is made in step S233 that the pinch-in operation or pinch-out operation has been detected, the control and computing unit 13 subtracts, from distance between two contact points on the touch panel by the two fingers after this pinch-in operation or pinch-out operation, distance between two contact points on the touch panel by the two fingers before the pinch-in operation or pinch-out operation, thereby calculating the movement distance of the two fingers by this pinch-in operation or pinch-out operation.

Next, the control and computing unit 13 advances the processing to step S235, changes the saturation of the selected image part 71 according to the movement distance of the two fingers, and calculates the R, G, and B values after change thereof. After the processing in step S235, the control and computing unit 13 advances the processing to step S236.

Upon proceeding to step S236, the control and computing unit 13 changes the hue and saturation of the selected image part 71 by the R, G, and B values calculated in step S232 and step S235, and displays a selected image part 71d after the change thereof on the image display area 70, through the image editor.

After the processing in step S236, the control and computing unit 13 returns the processing to step S204 in FIG. 47.

Also, upon proceeding to processing in step S241 in FIG. 51 after determination is made in step S231 that the gesture operation is not the rotating operation by multi-touch, the control and computing unit 13 determines whether or not the single touch operation as to an area other than the specified area nor the dedicated area has been detected. In the event that determination is made in step S241 that the single touch operation has not been detected, the control and computing unit 13 returns the processing to step S204 in FIG. 47. On the other hand, in the event that the single touch operation has been detected, the control and computing unit 13 advances the processing to step S242.

Upon proceeding to the processing in step S242, the control and computing unit 13 releases the range selection state of the selected image part 71, and also returns the operation mode of this terminal from the object decoration editing mode to the normal image editing mode.

After the processing in step S242, the control and computing unit 13 returns the processing to step S202 in FIG. 47.

[Another Example of Correlation Table Between Gesture Operations and Decoration Editing Contents at Time of Image Editing]

With the personal digital assistant according to the present embodiment, a correlation table between gesture operations and decoration editing contents used in the object decoration editing mode at the time of the image editing mode may be a table as shown in FIG. 52, for example.

Specifically, the example in FIG. 52 is an example given regarding a table conforming to the above-described correlation table in FIG. 4 as a correlation table at the time of the object decoration editing mode in the image editing mode. It goes without saying that this correlation table example is merely an example, and the present disclosure is not restricted to this example.

With the correlation table shown in FIG. 52, "PINCH-IN OPERATION IN VERTICAL DIRECTION" is a gesture operation wherein in a state in which two fingers are in contact with on the touch panel, the two fingers are moved so that one finger approaches from above on the image display area 70, and the other finger approaches from below, thereby narrowing down distance between the two fingers. In the event that this pinch-in operation in the vertical direction has been detected on the specified area, the personal digital assistant according to the present embodiment reduces the selected image part 71 by a reduction ratio corresponding to the movement distance of the two fingers.

With the correlation table shown in FIG. 52, "PINCH-OUT OPERATION IN VERTICAL DIRECTION" is a gesture operation wherein in a state in which two fingers are in contact with on the touch panel, the two fingers are moved so that one finger separates upward on the image display area 70, and the other finger separates downward, thereby widening distance between the two fingers. In the event that this pinch-out operation in the vertical direction has been detected on the specified area, the personal digital assistant according to the present embodiment enlarges the selected image part 71 by a scale of enlargement corresponding to the movement distance of the two fingers.

With the correlation table shown in FIG. 52, "DRAG OPERATION" is the same as the above-described drag operation in FIG. 42.

With the correlation table in FIG. 52, "FLICK OPERATION" is a gesture operation wherein one finger is in contact with on the touch panel, and then the finger thereof is flicked toward the user's desired direction. In the event that the flick operation has been detected on the specified area, the personal digital assistant according to the present embodiment scrolls the selected image part 71 to the direction where the finger was flicked at the time of the flick operation within the image display area 70.

With the correlation table in FIG. 52, "BOTH-WAY FLICK OPERATION" is a gesture operation wherein after one finger is in contact with on the touch panel, the finger is moved in the user's desired direction, and then the finger is flicked in the opposite direction of the movement direction thereof. In the event that the both-way flick operation has been detected on the specified area, the personal digital assistant according to the present embodiment scrolls the selected image part 71 to the direction where the finger was moved and flicked at the time of the both-way flick operation within the image display area 70.

With the correlation table in FIG. 52, "DOUBLE CLICK OPERATION" is a gesture operation wherein after one finger is in contact with on the touch panel over a short period of time, an operation for separating the finger is repeated twice. In the event that the double click operation has been detected on the specified area, the personal digital assistant according to the present embodiment displays the selected image part 71 with blinking.

With the correlation table in FIG. 52, "PINCH-OUT OPERATION IN HORIZONTAL DIRECTION" is a gesture operation wherein in a state in which two fingers are in contact with on the touch panel, the two fingers are moved so that one finger is separated in the right direction on the image display area 70, and the other finger is separated in the left direction, thereby widening distance between the two fingers. In the event that the pinch-out operation in the horizontal direction has been detected on the specified area, the personal digital assistant according to the present embodiment blurs the selected image part 71 based on a value according to the movement distance of the two fingers.

With the correlation table shown in FIG. 52, "PINCH-IN OPERATION IN HORIZONTAL DIRECTION" is a gesture operation wherein in a state in which two fingers are in contact with on the touch panel, the two fingers are moved so that one finger approaches from the right direction on the image display area 70, and the other finger approaches from the left direction, thereby narrowing down distance between the two fingers. In the event that this pinch-in operation in the horizontal direction has been detected on the specified area, the personal digital assistant according to the present embodiment enhances the outline of the selected image part 71 based on a value according to the movement distance of the two fingers.

With the correlation table shown in FIG. 52, "PARALLEL SHIFT OPERATION IN RIGHT DIRECTION BY MULTI-TOUCH" is a gesture operation wherein in a state in which two fingers are in contact with on the touch panel, the two fingers are moved in the right direction within the image display area 70 while maintaining generally the interval between the two fingers. In the event that the parallel shift operation in the right direction by multi-touch has been detected on the specified area, the personal digital assistant according to the present embodiment inclines the selected image part 71 right obliquely.

With the correlation table shown in FIG. 52, "PARALLEL SHIFT OPERATION IN LEFT DIRECTION BY MULTI-TOUCH" is a gesture operation wherein in a state in which two fingers are in contact with on the touch panel, the two fingers are moved in the left direction within the image display area 70 while maintaining generally the interval between the two fingers. In the event that the parallel shift operation in the left direction by multi-touch has been detected on the specified area, the personal digital assistant according to the present embodiment inclines the selected image part 71 left obliquely.

With the correlation table shown in FIG. 52, "ROTATING OPERATION BY MULTI-TOUCH AND PINCH-IN OPERATION/PINCH-OUT OPERATION" is the same as the above-described rotating operation by multi-touch and the pinch-in operation/pinch-out operation in FIG. 42. Note that decoration and editing contents by the rotating operation by multi-touch and the pinch-in operation/pinch-out operation may be rotating the selected image part 71 according to the rotating operation by multi-touch, for example. Also, in the event that the pinch-in operation/pinch-out operation has been performed along with the rotating operation by multi-touch, there may be decoration and editing contents such that the selected image part 71 is rotated according to the rotating operation, and also the selected image part 71 is reduced/enlarged according to the pinch-in operation/pinch-out operation.

With the correlation table shown in FIG. 52, "SINGLE-TOUCH OPERATION AT A PORTION OTHER THAN THE SPECIFIED AREA" is the same as the above-described single touch operation in FIG. 42.

Alternatively, with the personal digital assistant according to the present embodiment, in accordance with the above-described example in FIG. 20, in response to a gesture operation as to the dedicated area, the user is also allowed to consecutively paste, while copying the selected image part, copied selected image part.

[General Overview]

As described above, the personal digital assistant according to the present embodiment includes a display unit having a screen; a touch panel unit capable of detecting a gesture operation by a user as to a touch detection surface; a correlation table control unit configured to generate or store a correlation table in which a plurality of information processes that can be subjected as to an object displayed on the screen of the display unit, and a plurality of gesture operations are correlated respectively; and a processing control unit configured to subject, at the time of a desired object being selected by a user on the screen of the display unit, and one of the plurality of gesture operations being detected, the selected object to an information process correlated with the detected gesture operation thereof, and to display the selected object on the screen.

The personal digital assistant according to the present embodiment includes a detection area control unit configured to set, at the time of a desired object being selected by a user on the screen of the display unit, a plurality of gesture operations correlated with the correlation table regarding each information process that can be subjected as to this selected object to a gesture operation that can be detected in a predetermined detection area on the touch detection surface of the touch panel unit, and the processing control unit subjects, at the time of one of the plurality of gesture operations being detected at the touch detection surface, the selected object to an information process correlated with the detected gesture operation thereof, and displays the selected object on the screen.

Here, with the personal digital assistant according to the present embodiment, the touch detection surface of the touch panel unit is made up of a transparent touch screen which is disposed so as to cover generally the entire surface of the screen of the display unit.

Also, with the personal digital assistant according to the present embodiment, the detection area control unit may set the predetermined detection area to an area generally correlated with the display area of the selected object on the screen of a display unit.

Also, with the personal digital assistant according to the present embodiment, an arrangement may be made wherein the correlation table control unit generates or stores a correlation table in which a size change process for changing the size of the object, and a gesture operation for changing distance between two touch points on the touch detection surface are correlated, and the processing control unit changes, at the time of a gesture operation for changing distance between the two touch points on the touch detection surface, the size of the selected object according to change of distance between the two touch points, and displays the selected object on the screen.

Also, with the personal digital assistant according to the present embodiment, an arrangement may be made wherein the correlation table control unit generates or stores a correlation table in which a process for moving the object on the screen, and a gesture operation for moving a touch point on the touch detection surface are correlated, and the processing control unit moves and displays, at the time of a gesture operation for moving the touch point being detected on the touch detection surface, the selected object on the screen according to the movement of the touch point.

Also, with the personal digital assistant according to the present embodiment, an arrangement may be made wherein the correlation table control unit generates or stores a correlation table in which a process for blinking the object on the screen, and a gesture operation for repeating a touch on the touch detection surface over a short period of time are correlated, and the processing control unit blinks and displays, at the time of a gesture operation for repeating a touch over the short period of time being detected on the touch detection surface, the selected object on the screen.

Also, with the personal digital assistant according to the present embodiment, an arrangement may be made wherein the correlation table control unit generates or stores a correlation table in which a process for obliquely inclining the object on the screen, and a gesture operation for moving two touch points on the touch detection surface in parallel are correlated, and the processing control unit obliquely inclines and displays, at the time of a gesture operation for moving the touch points in parallel on the touch detection surface, the selected object on the screen.

Also, with the personal digital assistant according to the present embodiment, an arrangement may be made wherein the correlation table control unit generates or stores a correlation table in which a hue changing process for changing the hue of the object, and a gesture operation for rotating two touch points on the touch detection surface are correlated, and also a saturation changing process for changing the saturation of the object, and a gesture operation for changing distance between two points on the touch detection surface are correlated, and the processing control unit changes, at the time of a gesture for rotating the two touch points being detected on the touch detection surface, the hue of the selected object according to the rotations of the two touch points, and changes, at the time of a gesture operation for changing distance between the two points being detected on the touch detection surface, the saturation of the selected object according to the change of the distance between the two points.

Also, with the personal digital assistant according to the present embodiment, an arrangement may be made wherein the detection area control unit sets, at the time of a predetermined gesture operation being detected on the predetermined detection area, a plurality of gesture operations separately correlated with the correlation table as each information process that can be subjected as to the selected object to a gesture operation that can be detected on another detection area different from a predetermined detection area on the touch detection surface of the touch panel unit, and the processing control unit subjects, at the time of one of the gesture operations being detected on the other detection area, the selected object to an information process correlated with the detected gesture operation thereof, and displays the selected object on the screen.

Also, with the personal digital assistant according to the present embodiment, the correlation table control unit may generate or store a correlation table in which a decoration process that can be subjected as to a character serving as the object, and the plurality of gesture operations are correlated.

Also, with the personal digital assistant according to the present embodiment, the correlation table control unit may generate or store a correlation table in which a decoration process that can be subjected as to an image part serving as the object, and the plurality of gesture operations are correlated.

Further, embodiments of the present disclosure include an information processing control method. Specifically, an information processing control method according to the present embodiment is an information processing control method in a device including a display unit having a screen, and a touch panel unit capable of detecting a gesture operation by a user as to a touch detection surface, the method including a process in which a correlation table control unit configured to generate or store a correlation table in which a plurality of information processes that can be subjected as to an object displayed on the screen of the display unit, and a plurality of gesture operations are correlated respectively; and a process in which a processing control unit configured to subject, at the time of a desired object being selected by a user on the screen of the display unit, and any of the plurality of gesture operations being detected, the selected object to an information process correlated with the detected gesture operation thereof, and to display the selected object on the screen.

Also, embodiments of the present disclosure include an information processing control program. Specifically, an information processing control program according to the present embodiment is an information processing control program that can be executed at an information terminal including a display unit having a screen, and a touch panel unit capable of detecting a gesture operation by a user as to a touch detection surface, the program causing a computer of the information terminal to serve as a correlation table control unit configured to generate or store a correlation table in which a plurality of information processes that can be subjected as to an object displayed on the screen of the display unit, and a plurality of gesture operations are correlated respectively, and a processing control unit configured to subject, at the time of a desired object being selected by a user on the screen of the display unit, and any of the plurality of gesture operations being detected, the selected object to an information process correlated with the detected gesture operation thereof, and to display the selected object on the screen.

Also, the present embodiment also includes a recording medium. Specifically, a recording medium according to the present embodiment is configured to record an information processing control program that can be executed at an information terminal including a display unit having a screen, and a touch panel unit capable of detecting a gesture operation by a user as to a touch detection surface. Specifically, a recording medium according to the present embodiment records an information processing control program causing a computer of the information terminal to serve as a correlation table control unit configured to generate or store a correlation table in which a plurality of information processes that can be subjected as to an object displayed on the screen of the display unit, and a plurality of gesture operations are correlated respectively, and a processing control unit configured to subject, at the time of a desired object being selected by a user on the screen of the display unit, and any of the plurality of gesture operations being detected, the selected object to an information process correlated with the detected gesture operation thereof, and to display the selected object on the screen.

According to the present embodiment, an information processing control device including a touch panel on a display screen uses the correlation table in which a gesture operation and each decoration content or editing content are correlated to subject a user's desired selected object on the screen to decoration or editing or the like according to the user's gesture operation, thereby enabling the user's work to be reduced, and enabling the user's burden to be markedly reduced. In other words, with the present embodiment, parameters relating to decoration or parameters relating to editing to be subjected as to the selected object can be changed according to the movement direction, movement speed, movement amount (movement distance), movement path, or the like of a finger at the time of a gesture operation as appropriate, whereby the selected object can be subjected to more intuitive decoration or editing in accordance with the user's intention, and the user's effort and time at the time of performing such decoration or editing or the like can be markedly reduced as compared to the related art.

Note that the personal digital assistant according to the present embodiment may be applied to, in addition to high-performance portable telephone terminals, tablet terminals, or slate PCs, not only portable terminals, for example, such as so-called PDAs (Personal Digital Assistants), notebook-sized personal computers, portable game machines, portable navigation terminals, and so forth, but also various stationary electronic devices including a touch panel.

Also, the description of the above embodiment is an example of the present disclosure. Accordingly, the present disclosure is not restricted to the above-described embodiment, and various modifications can be made according to a design or the like without departing from the technical idea relating to the present disclosure.

Further, it is apparent that one skilled in the art can conceive various modifications, combinations, and other embodiments due to a design or other elements within the scope of the Claims of the present disclosure or equivalent to the Claims.

The invention claimed is:

1. An information processing device comprising:
a display;
a touch panel that detects a gesture operation;
a memory that stores a correlation between each of a plurality of effects that can be applied to an object displayed on the display and one of a plurality of gesture operations; and
a processor that applies one of the plurality of effects that corresponds to the detected gesture operation to an object displayed on the display, and controls the display to display the object to which the one of the plurality effects is applied, wherein
the memory stores a correlation between an effect of copying, consecutively pasting and changing a case of a character and a gesture operation defined by a movement of a touch input on the touch panel in the horizontal and vertical directions, and
the effect of copying, consecutively pasting and changing the case of the character includes
copying and consecutively pasting the character according to the movement of the touch input in the horizontal direction;
controlling the consecutively pasted characters to be capital case while the movement distance vertically upward is equal to or greater than a predetermined value; and
controlling the consecutively pasted characters to be lower case when the movement distance vertically downward is equal to or greater than a predetermined value.

2. The information processing device of claim 1, wherein the correlation stored in the memory is a table correlating each of the plurality of effects to one of the plurality of gesture operations.

3. The information processing device of claim 1, wherein the processor generates the correlation between each of the plurality of effects and one of the plurality of gesture operations.

4. The information processing device of claim 1, wherein the touch panel detects an input selecting the object and the processor sets a predetermined area on the touch panel on which the gesture operation may be detected based on the input selecting the object.

5. The information processing device of claim 1, wherein the memory stores a correlation between a size change effect for changing a size of the object and a pinch gesture operation defined by a change in distance between two touch points on the touch panel, and the processor controls the display to change a size of the object based on the change in distance between the two touch points on the touch panel.

6. The information processing device of claim 1, wherein the memory stores a correlation between a movement effect for moving the object and a drag gesture operation defined by a movement of a touch input on the touch panel in a direction, and the processor controls the display to move the object in the direction corresponding to the movement of the touch input on the touch panel.

7. The information processing device of claim 1, wherein the memory stores a correlation between a justifying effect for left or right justifying a character string and a drag gesture operation defined by a movement of a touch input on the touch panel in a right or left horizontal direction, and the processor controls the display to display the character string left or right justified based on the movement of the touch input in the left or right horizontal direction.

8. The information processing device of claim 1, wherein the memory stores a correlation between a scrolling operation for scrolling a character string and a flick gesture operation defined by a movement of a touch input on the touch panel in a direction, and the processor controls the display to scroll the character string in a direction corresponding to the movement of the touch input.

9. The information processing device of claim 1, wherein the memory stores a correlation between a blinking effect for causing the object to blink and a double click operation defined by detecting two individual touch inputs on the display within a predetermined time period, and the processor controls the display to cause the object to blink upon detecting the double click operation.

10. The information processing device of claim 1, wherein the memory stores a correlation between a bold character effect of bolding characters in a character string and a pinch out gesture defined by an increase in distance between two touch inputs on the touch panel in a horizontal direction, and the processor controls the display to display the character string with bold characters upon detecting the pinch out gesture.

11. The information processing device of claim 1, wherein the memory stores a correlation between an italicize character effect of italicizing characters in a character string and a parallel shift operation defined by parallel movement of two touch inputs on the touch panel in a horizontal direction, and the processor controls the display to display the character string with italicized characters upon detecting the parallel shift operation.

12. The information processing device of claim 1, wherein the memory stores a correlation between a hue and saturation changing effect for changing a hue and a saturation of an object and a rotation gesture operation defined by rotating two touch inputs on the touch panel, and the processor controls the display to change a hue of the object based on an amount of rotation of the two touch inputs and change a saturation of the object based on a change in distance between the two touch inputs.

13. The information processing device of claim 1, wherein the memory stores a correlation between a copy effect for copying a character string and a horizontal drag gesture defined by movement of a touch input on the touch panel in a right horizontal direction, and the processor controls the display to display a duplicate of the character string next to the character string upon detecting the horizontal drag gesture.

14. The information processing device of claim 1, wherein the memory stores a correlation between a deletion effect for deleting a character string and a horizontal drag gesture defined by movement of a touch input on the touch panel in a left horizontal direction, and the processor controls the display to delete the character string upon detecting the horizontal drag gesture.

15. The information processing device of claim 1, wherein the memory stores a correlation between an effect of changing a case of characters in a character string and a vertical direction gesture defined by movement of a touch input in an upper vertical direction, and the processor controls the display to change the case of the characters upon detecting the vertical direction gesture.

16. The information processing device of claim 1, wherein the memory stores a correlation between an effect of changing a size of characters in a character string and vertical direction gesture defined by movement of a touch input in an upper or lower vertical direction, and the processor controls the display to change the size of the characters proportional to the vertical direction gesture.

17. The information processing device of claim 1, wherein the memory stores a correlation between an effect of changing symbols in a string of symbols and a vertical direction gesture defined by movement of a touch input in an upper vertical direction, and the processor controls the display to change symbols in the string of symbols upon detecting the vertical direction gesture.

18. A method performed by an information processing apparatus, the method comprising:
  storing, in a memory of the information processing apparatus, a correlation between each of a plurality of effects applied to an object displayed on a display and one of a plurality of gesture operations;
  detecting, by a touch panel of the information processing apparatus, a gesture operation;
  applying, by a processor of the information processing apparatus, one of the plurality of effects that corresponds to the detected gesture operation to an object displayed on the display; and
  controlling, by the processor, the display to display the object to which the one of the plurality effects is applied, wherein
  the memory stores a correlation between an effect of copying, consecutively pasting and changing a case of a character and a gesture operation defined by a movement of a touch input on the touch panel in the horizontal and vertical directions, and
  the effect of copying, consecutively pasting and changing the case of the character includes
    copying and consecutively pasting the character according to the movement of the touch input in the horizontal direction;
    controlling the consecutively pasted characters to be capital case while the movement distance vertically upward is equal to or greater than a predetermined value; and
    controlling the consecutively pasted characters to be lower case when the movement distance vertically downward is equal to or greater than a predetermined value.

19. A non-transitory computer-readable medium including computer-program instructions, which when executed by an information processing apparatus, cause the information processing apparatus to perform a method comprising:
  storing, in a memory, a correlation between each of a plurality of effects applied to an object displayed on a display and one of a plurality of gesture operations;
  detecting a gesture operation at a touch panel of the information processing apparatus;
  applying one of the plurality of effects that corresponds to the detected gesture operation to an object displayed on the display; and
  controlling the display to display the object to which the one of the plurality effects is applied, wherein
  the memory stores a correlation between an effect of copying, consecutively pasting and changing a case of a character and a gesture operation defined by a movement of a touch input on the touch panel in the horizontal and vertical directions, and
  the effect of copying, consecutively pasting and changing the case of the character includes
    copying and consecutively pasting the character according to the movement of the touch input in the horizontal direction;
    controlling the consecutively pasted characters to be capital case while the movement distance vertically upward is equal to or greater than a predetermined value; and
    controlling the consecutively pasted characters to be lower case when the movement distance vertically downward is equal to or greater than a predetermined value.

* * * * *